US012743007B2

(12) United States Patent
Ishiwaka et al.

(10) Patent No.: US 12,743,007 B2
(45) Date of Patent: Sep. 22, 2026

(54) IMAGING SYSTEM

(71) Applicant: SoftBank Corp., Tokyo (JP)

(72) Inventors: Yuko Ishiwaka, Tokyo (JP); Gaku Yasui, Tokyo (JP); Tomohiro Yoshida, Tokyo (JP); Tadayuki Tone, Tokyo (JP); Tadaaki Ito, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 0 days.

(21) Appl. No.: 19/129,353

(22) PCT Filed: Aug. 28, 2023

(86) PCT No.: PCT/JP2023/031050

§ 371 (c)(1),
(2) Date: May 13, 2025

(87) PCT Pub. No.: WO2024/105963

PCT Pub. Date: May 23, 2024

(65) Prior Publication Data

US 2026/0010059 A1 Jan. 8, 2026

(30) Foreign Application Priority Data

Nov. 17, 2022 (JP) ................................ 2022-184441

(51) Int. Cl.
*G03B 17/56* (2021.01)
*G03B 35/00* (2021.01)
*H04N 23/50* (2023.01)

(52) U.S. Cl.
CPC ............ *G03B 17/56* (2013.01); *G03B 35/00* (2013.01)

(58) Field of Classification Search
CPC .............. H04N 23/50–56; G03B 17/08; G03B 2215/00–0592; G01J 3/52–528; G06T 7/80; G06T 7/85
(Continued)

(56) References Cited

U.S. PATENT DOCUMENTS 5,418,546 A * 5/1995 Nakagakiuchi ...... H04N 5/7416 345/32
11,568,568 B1 * 1/2023 El Dokor ................ G06T 7/593
(Continued)

FOREIGN PATENT DOCUMENTS

CN 113405660 A * 9/2021 ............ G01J 3/0297
JP 3227152 U 8/2020
(Continued)

OTHER PUBLICATIONS

International Search Report and Written Opinion mailed on Oct. 31, 2023, received for PCT Application PCT/JP2023/031050, filed on Aug. 28, 2023, 9 pages including English Translation.
(Continued)

*Primary Examiner* — Anthony J Daniels
(74) *Attorney, Agent, or Firm* — XSENSUS LLP

(57) ABSTRACT

An imaging system equipped with a subject device includes a plate group constituted of multiple plates arranged at a position opposing a light source for imaging; and a supporting member that supports the plate group. The plate group is constituted of plates arranged in a planar manner, and includes at least one of a rotating plate that is a plate rotatable around one side as a rotation axis, and the supporting member axially supports one side corresponding to the rotation axis of the rotating plate.

20 Claims, 42 Drawing Sheets

(58) Field of Classification Search
USPC ..................................................... 348/207.99
See application file for complete search history.

(56) References Cited

U.S. PATENT DOCUMENTS

| | | | | |
|---|---|---|---|---|
| 2019/0340440 | A1 | 11/2019 | Atwater et al. | |
| 2020/0128234 | A1 | 4/2020 | Várszegi et al. | |
| 2020/0337274 | A1 | 10/2020 | Howe et al. | |
| 2022/0284627 | A1* | 9/2022 | Johnson ............... | H04N 17/002 |

FOREIGN PATENT DOCUMENTS

| | | | |
|---|---|---|---|
| WO | 2018/061925 | A1 | 4/2018 |
| WO | 2019/045091 | A1 | 3/2019 |

OTHER PUBLICATIONS

Decision to Grant a Patent mailed on Aug. 20, 2024, received for JP Application 2022-184441, 5 pages including English Translation.
Extended European Search Report issued Jan. 15, 2026 in corresponding European Patent Application No. 23891123.4, 9 pages.
Anonymous: "WELLMAKING 79.5×59.5 inch Photography Light Diffuser with 360 Degree Rotatable Frame and 7-10 feet Height Adjustable Support Stand with Casters, for Photo Video Shooting, Translucent,Silver Black : Amazon.com. au: Electronics", May 14, 2022 (May 14, 2022), pp. 1-4, XP093344908, Retrieved from the Internet: URL:https://www.amazon.com.au/WELLMAKING-Manual-WR1520P-Movable-Diffusion/dp/B0B19WVC7L.

* cited by examiner

FIG.1

ATTENUATION OF COLOR UNDERWATER

·APPROXIMATE EXPRESSION FOR LIGHT ATTENUATION IN UNDERWATER ENVIRONMENT $$L_i(x) = L_s \exp(-C_i x)$$

x DISTANCE FROM LIGHT SOURCE $L_i(x)$ INTENSITY OF LIGHT $L_s$ INTENSITY OF LIGHT OF LIGHT SOURCE $C_i$ ATTENUATION COEFFICIENT (i = R, G, B)

(RED: 0.400, GREEN: 0.039, BLUE: 0.035)

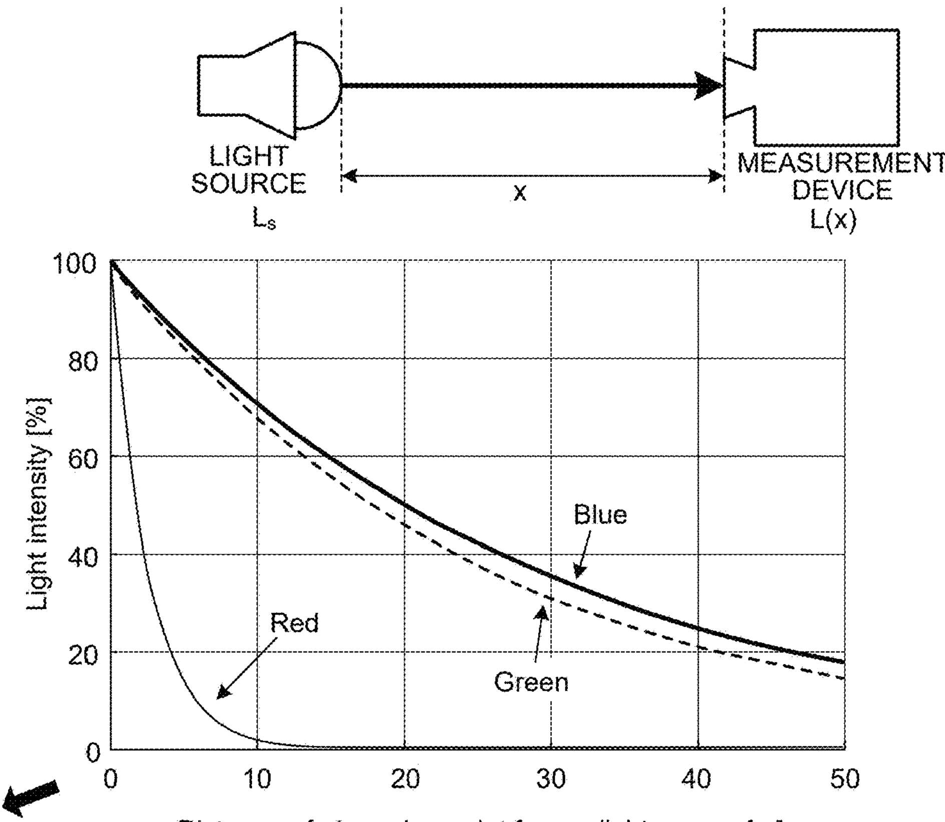

LIGHT OF LONG WAVELENGTH (RED) ATTENUATES PARTICULARLY EASILY

Distance of observing point from a light source [m]

REFERENCE SOURCE: KYUSHU INSTITUTE OF TECHNOLOGY YASU (2016)

WHITE LIGHT (RGB VALUE)
LUMINANCE VALUE
300
225
150
75
0
1 m
2 m
3 m
4 m
5 m
DISTANCE z
BLUE FILTER (RGB VALUE)
LUMINANCE VALUE
300
225
150
75
0
1 m
2 m
3 m
4 m
5 m
DISTANCE z
RED FILTER (RGB VALUE)
LUMINANCE VALUE
200
150
100
50
0
1 m
2 m
3 m
4 m
5 m
DISTANCE z
PURPLE FILTER (RGB VALUE)
LUMINANCE VALUE
300
225
150
75
0
1 m
2 m
3 m
4 m
5 m
DISTANCE z 40-1 (40)
41-1 (41)
41-1 (41)
20
34
30
41-2 (41)
41-2 (41)
40-2 (40)
10

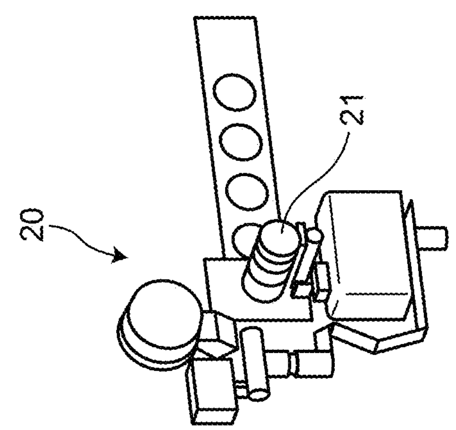
FIG.6
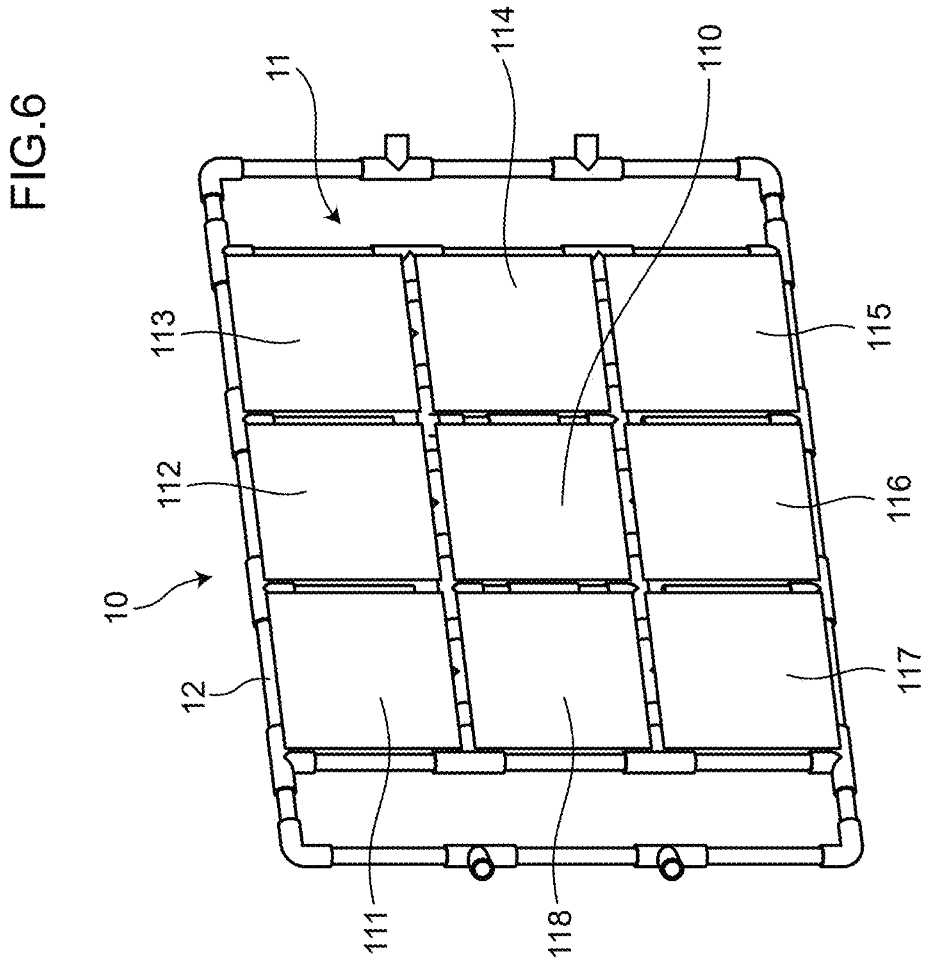

FIG.24
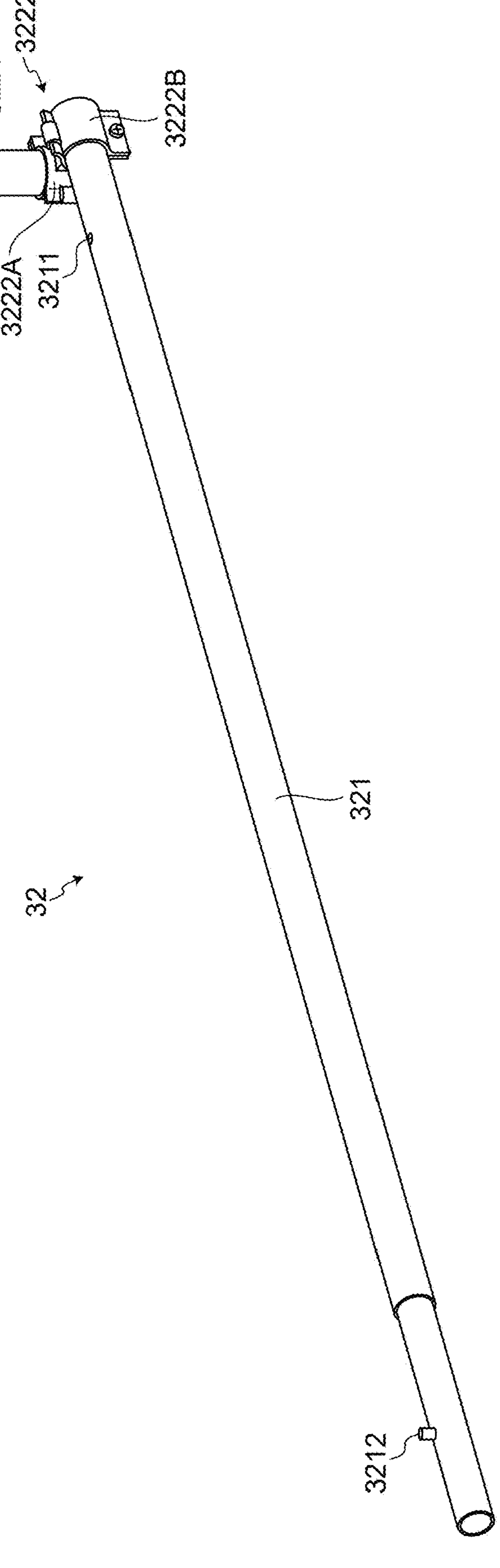
3222
3221
3222B
322
3222A
3211
321
32
3212

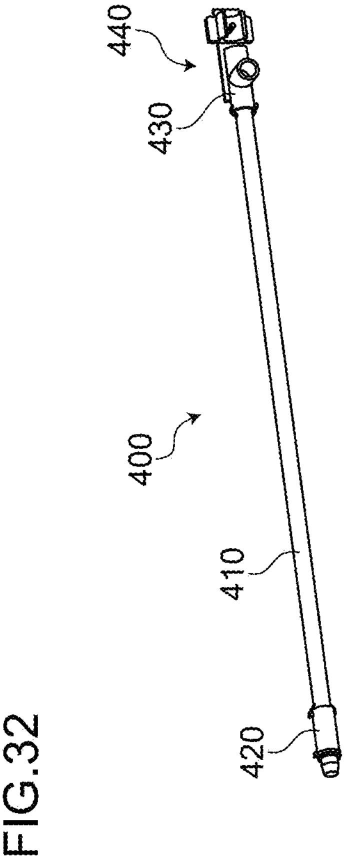
FIG.32
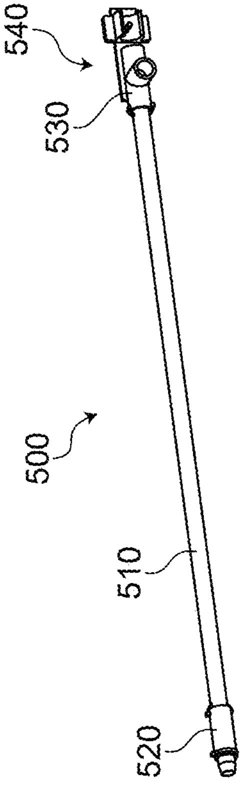

400
540
500

411
421
460
420
422
450
412
410

544
545
543
542
541
540
530
531
550
511
510

542
543
544
545
540
532
541
530
531
550
511
510

510
511
550
531
530
5414
570
560
5412
540
541
546
542
543
544

510
511
550
531
570
5414
530
560
5412
540
541
542
543
546

510
500
530
420
400
541
540
543
544
542
546
410

IMAGING SYSTEM

CROSS-REFERENCE TO RELATED APPLICATIONS

This application is a national stage application, pursuant to 35 U.S.C. § 371, of International Patent Application No. PCT/JP2023/031050, filed Aug. 28, 2023, which claims priority to Japanese Patent Application No. 2022-184441, filed Nov. 17, 2022, the entire contents of each are incorporated herein by reference.

FIELD

The present invention relates to a imaging system.

BACKGROUND

Conventionally, an image recognition technology for identifying an object appearing in an image (a still image or a moving image) has been known. For example, to improve fish farming technology, a technique of estimating the number of fish (hereinafter, also referred to as "fish count") in a fish tank by capturing an image of fish in the fish tank using a camera and analyzing the captured image has been known.

CITATION LIST

Patent Literature

Patent Literature 1: International Publication Pamphlet No. WO 2019/045091

SUMMARY

Technical Problem

There has been a demand for a technique that enables accurate estimation of information about an object underwater from an image.

The present application has been achieved in view of the above circumstances, and it is an object to provide an imaging system that is capable of accurately estimating information about an object underwater from an image.

Solution to Problem

An imaging system equipped with a subject device includes a plate group constituted of multiple plates arranged at a position opposing a light source for imaging; and a supporting member that supports the plate group. The plate group is constituted of plates arranged in a planar manner, and includes at least one of a rotating plate that is a plate rotatable around one side as a rotation axis, and the supporting member axially supports one side corresponding to the rotation axis of the rotating plate.

Advantageous Effects of Invention

According to one aspect of an embodiment, an effect of enabling accurate estimation of information about an object under water from an image is achieved.

BRIEF DESCRIPTION OF DRAWINGS

FIG. 1 is a diagram for explaining about an attenuation rate of color underwater.

FIG. 6 is a perspective view illustrating a positional relationship between a subject device and an imaging device according to the embodiment.

FIG. 10 is a perspective view of an essential part illustrating the joint portion between the supporting member and the rotating plate after being connected by the first rod-shaped member according to the embodiment.

FIG. 24 is a perspective view illustrating a sixth rod-shaped member constituting the first joint member according to the first embodiment.

FIG. 27 is a perspective view of an essential part illustrating a joint portion between the imaging device before being joined and the sixth rod-shaped member according to the embodiment.

FIG. 32 is a perspective view illustrating two pieces of the eighth rod-shaped member before being joined by a joint mechanism according to the embodiment.

DESCRIPTION OF EMBODIMENTS

Figure 2:
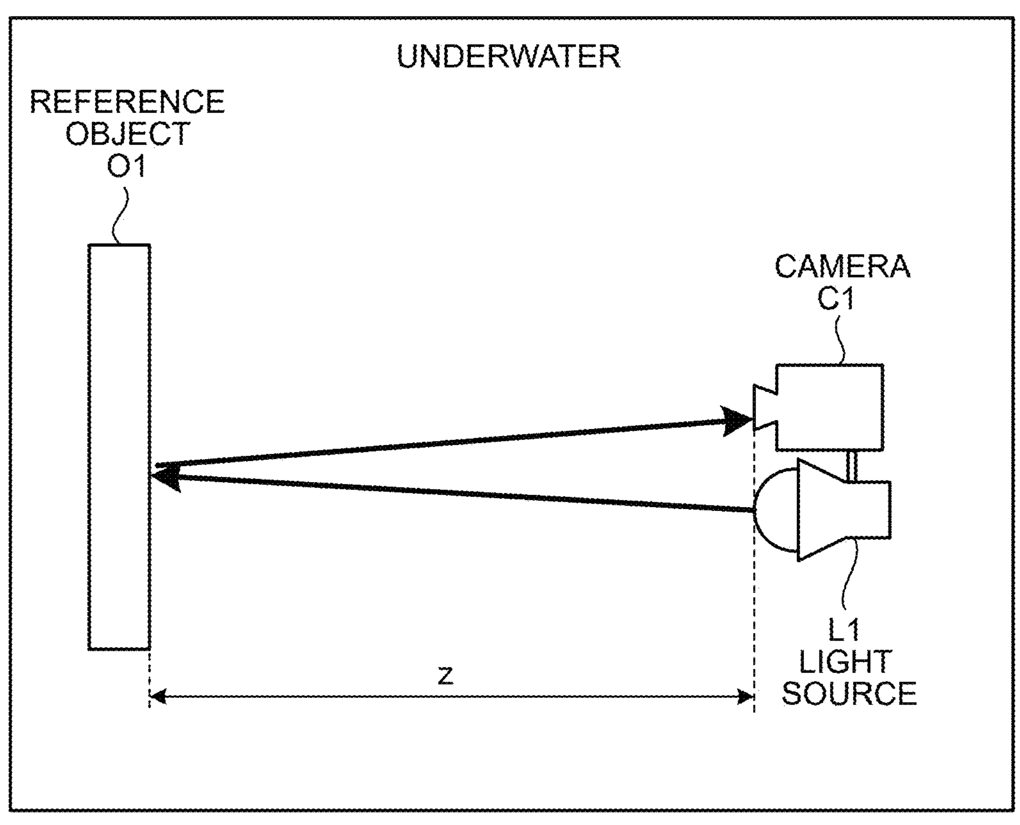
FIG. 2 is a diagram for explaining about an overview of a method of acquiring reference information according to an embodiment.

Hereinafter, forms (hereinafter, referred to as "embodiments") for implementing an imaging system according to the present application will be explained in detail with reference to the drawings. These embodiments are not intended to limit the imaging system according to the present application. Moreover, in the following embodiments, like reference symbols are assigned to like components, and duplicate explanations will be omitted.

EMBODIMENT

1. Introduction

In recent years, fish farming has attracted attention as a means of addressing the global food problem. To supply high quality fish through fish farming, it is important to accurately determine the number of fish (fish count) and the size of fish, which are closely related to feeding (feeding to fish).

However, in the unusual underwater environment of a fish farm, it can be difficult to apply land-based IT technologies. Therefore, traditionally, fish have been manually scooped up with a net to count the number (fish count) and measure the size of fish, and the number of fish has then been counted by visual inspection. However, this method has the problems of causing a significant physical stress on the fish and lacking accuracy.

Therefore, in recent years, a method that uses computer vision to automatically detect the fish count and size of fish from an image of a school of fish in a fish tank has been gaining attention. A specific example includes a method that trains a machine learning model for image recognition to estimate the fish count and the size of fish from an image. However, to accurately estimate the fish count and the size of fish from an image using a machine learning model, it is necessary to train the machine learning model with a large amount of high-quality training data. For example, as the training data for a machine learning model, a set of an image capturing underwater fish, such as a school of fish in a fish tank, and ground truth data indicating a position and the size of each fish in the image is used. In this case, the high quality of training data means accuracy of the ground truth data indicating the position and the size of the fish in the image.

It is generally known that light propagating underwater is attenuated due to scattering and absorption by water and, therefore, does not reach far distances. For example, it is known that in visible light (wavelengths around 380 nm to 780 nm), there is an absorption band, particularly in a red to orange region, in which energy is absorbed. Therefore, it is known that red light is almost 100% lost at a water depth of 10 m. Moreover, it is known that even blue light is absorbed its energy of about 50% at a water depth of 20 m. Because red components are lost rapidly underwater as described, water appears blue.

FIG. 1 is a diagram for explaining about an attenuation rate of color underwater. A graph in FIG. 1 illustrates a relationship between intensity of light corresponding to wavelengths of red, green, and blue (hereinafter, also referred to as "red light, green light, and blue light") underwater and a distance from a measuring device to measure the intensity of light to a light source. As illustrated in FIG. 1, it can be seen that the intensity of light all decreases in red light, green light, and blue light as the distance from the measuring device to the light source increases. Furthermore, from the graph in FIG. 1, it is evident that red light (light of a long wavelength) is particularly prone to attenuation compared to green light and blue light.

As described above, because light propagating underwater attenuates easily, images of underwater objects are generally less visually clear compared to images of objects captured in the air. Therefore, it is more difficult to estimate a position and a size of an object in an image from an image capturing the underwater object than to recognize a position and a size of an object in an image from an image of the object captured in the air.

Particularly, it is significantly difficult to accurately estimate a depth position of an object in an image from an image capturing the underwater object (or a distance from an imaging device to the object underwater). Consequently, it is difficult to assign high quality ground truth data regarding the position and size of an object in an image to the image capturing the underwater object. Therefore, obtaining high-quality training data is difficult.

Therefore, there is a demand for a technique that can accurately recognize a depth position of underwater fish in an image for a distance from the imaging device to fish underwater). For example, a method can be considered in which another sensor outside the imaging device is used to detect the depth position of fish underwater and supplement position information in a depth direction. However, most techniques that are useful in the air cannot be used underwater. For example, the light of a light detection and ranging (LiDAR) sensor hardly propagates underwater compared to in the air. Moreover, while an ultrasonic sensor is suitable for detecting a school of fish (also referred to as "fish school") underwater, its resolution is too low to count the number of fish accurately.

In contrast, an information processing apparatus (not illustrated) according to an embodiment acquires reference information that indicates a relationship between a luminance value in an object region in which a reference object is captured (hereinafter, also referred to as "reference luminance value") and a distance from an imaging device when the image is captured to the reference object (hereinafter, also referred to as "reference distance") in an image capturing an object mimicking a surface of a body of fish (hereinafter, also referred to as "reference object") that is located underwater. Moreover, the information processing apparatus acquires an image of fish underwater (hereinafter, also referred to as "object image"). The information processing apparatus estimates a distance from the imaging device to fish when the object image is captured (hereinafter, also referred to as "object distance") based on comparison between a luminance value (hereinafter, also referred to as "object luminance value") in a region in which the fish is imaged (hereinafter, also referred to as "object region") and the acquired reference information. Specifically, the information processing apparatus identifies the reference distance corresponding to the reference luminance value same as the object luminance value based on the reference information, and estimates the identified reference distance as the target distance.

Thus, the information processing apparatus can estimate the distance from the imaging device to the fish underwater accurately. Moreover, because the information processing apparatus can estimate the distance from the imaging device to the fish underwater accurately, it is possible to assign high quality ground truth data relating to a position and a size of the fish in an image, for example, to the image of the fish underwater. That is, the information processing apparatus can obtain high quality training data to which the high quality ground truth data is assigned. Furthermore, because the information processing apparatus can obtain the high quality training data, it is possible to improve training accuracy of a machine learning model for image recognition for estimating information relating to fish underwater from an image, for example, by using the high quality training data. Therefore, the information processing apparatus can accurately estimate information regarding fish underwater from an image.

In the above description, a case in which the target image is an image capturing fish underwater has been explained, but an imaging target of the object image (hereinafter, also referred to as "object") is not limited to fish underwater. For example, the object may be another living organism besides fish. In this case, the reference object is replaced with an object that mimics the surface of the body of another living organism other than fish instead of an object that mimics the surface of the body of fish. Furthermore, the object is not limited to living organisms. For example, the object may be a non-living object. In this case, the reference object is replaced with an object that mimics the surface of an object other than living organisms instead of the object that mimics the surface of the body of a living organism.

2. Overview of Method for Acquiring Reference Information

FIG. 2 is a diagram for explaining about an overview of a method of acquiring reference information according to an embodiment. FIG. 2 illustrates arrangement of a reference object O1, a camera C1 (an example of an imaging device), and a light source L1 positioned underwater, such as in a fish tank. The light source L1 irradiates light to the reference object O1 underwater. The camera C1 images an image (reference image) of the reference object O1 underwater to which light of the light source L1 is irradiated. When a distance from the camera C1 to the reference object O1 at the time of capturing of the reference image is z, the camera C1 images the reference object O1 underwater to which light from the light source L1 is irradiated while changing the value of z.

Moreover, it is generally known that the reflectivity of light from a surface of fish varies depending on a type of fish scale. Therefore, the surface of the reference object O1 is covered with scales (a scale model or actual fish scales) of fish corresponding to a type of fish to be a target. The surface of the reference object O1 may be covered with a material, such as a mimic skin (aurora scale skin), a color chart, and a checkerboard, instead of a scale model or actual scales. Moreover, the body of most fish have a laterally flattened body shape, Therefore, reflection of light from the surface of fish is considered to be similar to reflection of light from a surface of a flat object. Accordingly, the example in FIG. 2 illustrates that the reference object O1 is in a flat shape (also referred to as "planar shape), and a view of the reference object O1 in a flat shape as seen from the side. In FIG. 2, a direction in which the camera C1 faces the reference object O1 coincides with a normal direction of the reference object O1. That is, a surface of the reference object O1 is positioned directly in front of the camera C1.

Moreover, in FIG. 2, the light source 11 is arranged at a lower part of a casing of the camera C1. The light L1 may be arranged at an upper part of the casing of the camera C1. Moreover, the light source L1 is arranged such that a direction in which the light source L1 irradiates light coincides with the direction in which the camera C1 faces the reference object O1.

Furthermore, it is generally known that colors of light preferred (or colors of light disliked) by fish vary depending on fish species. Therefore, the light L1 irradiates light of a wavelength corresponding to a color according to a fish species to be a target. Specifically, the light source L1 may be a light with color filter of various types, such as red, green, and blue.

Figure 3:
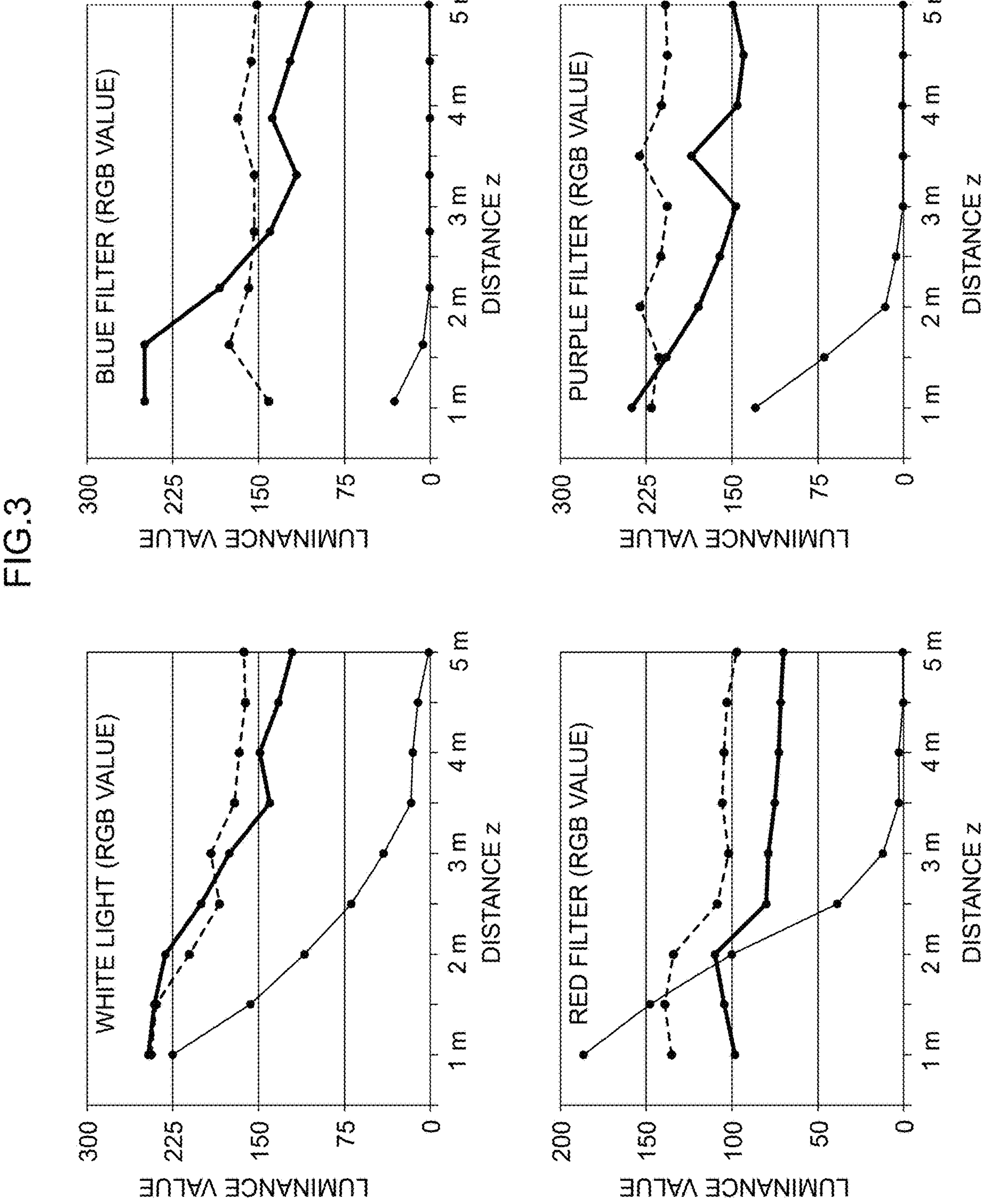
FIG. 3 is a diagram illustrating an example of the reference information according to the embodiment.

FIG. 3 is a diagram illustrating an example of the reference information according to the embodiment. FIG. 3 illustrates four kinds of reference information acquired when a white lamp (white light), a red-filtered lamp (red light), a blue-filtered lamp (blue light), and a purple-filtered lamp (purple light) are respectively used as the light source 11 illustrated in FIG. 2.

Moreover, respective graphs in FIG. 3 correspond to the respective reference information acquired by the method illustrated in FIG. 2. The horizontal axis of the graph represents the distance (z) from the camera C1 to the underwater reference object O1 when the reference image is captured. The vertical axis of the graph represents the luminance value of the reference image. More specifically, a solid line in the graph represents the luminance value of R (red), a broken line represents the luminance value of G (green), and a bold line represents the luminance value of B (blue). From the respective graphs in FIG. 3, for example, the information processing apparatus can estimate that the object distance from the imaging device to fish at the time of capturing the object image is equal to or larger than 3 meters (m) when the luminance value of R of the object luminance value in the object region in which the fish has been captured is close to zero in the target image. Moreover, the information processing apparatus can estimate the object distance, for example, based on a comparison with a luminance value of R (red) indicated by the solid line in the graph of the red-filtered lamp (red light) when the object distance from the imaging device to fish at the time of capturing the object image is 1 m to 2 m.

3. Configuration of Imaging System

An overview of a configuration of an imaging system 1 according to the embodiment will be explained using FIG. 4 and FIG. 5. The imaging system 1 according to the embodiment is an imaging system used to acquire the reference information described above.

Figure 4:
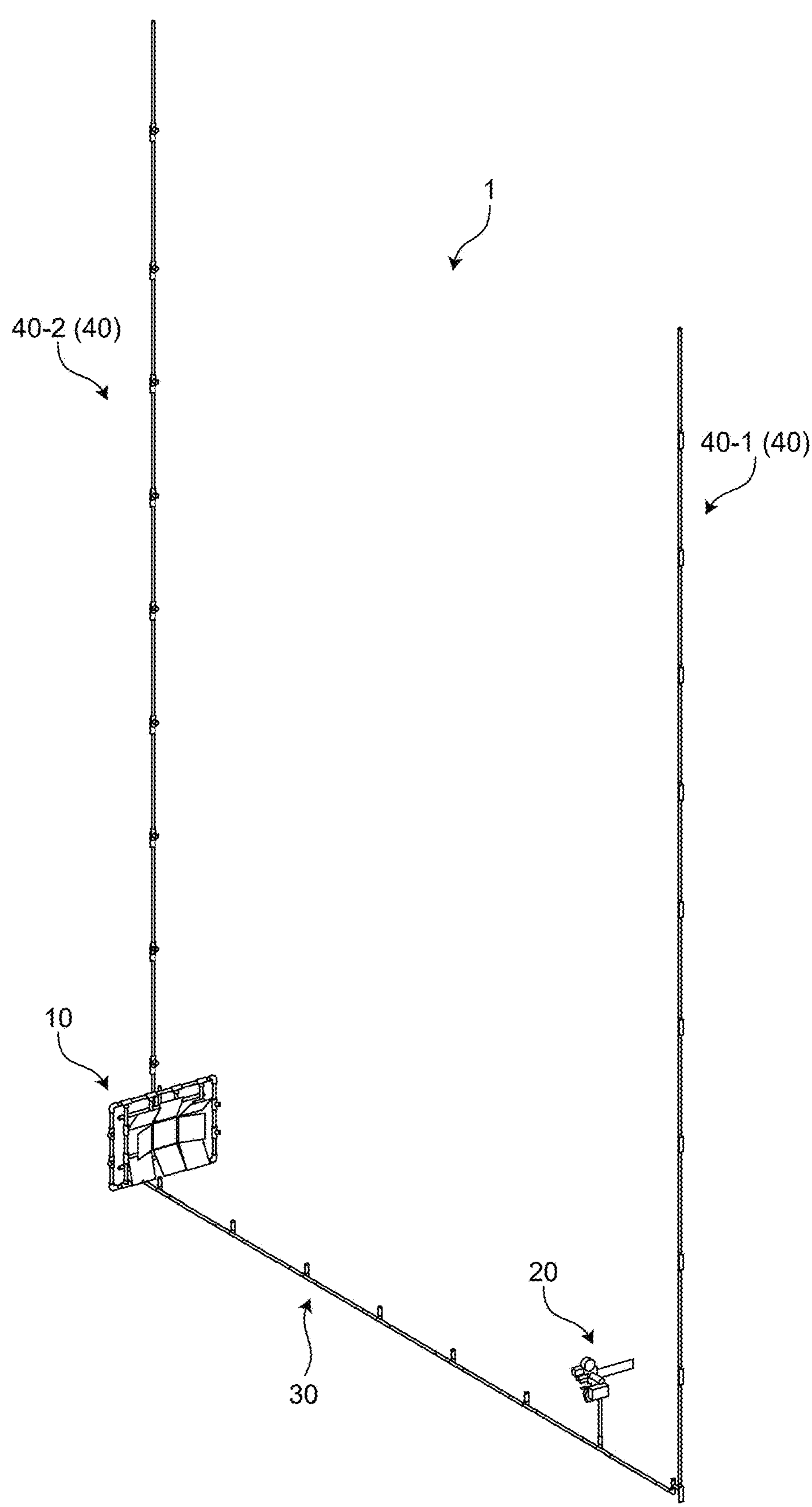
FIG. 4 is a perspective view illustrating a configuration example of an imaging system according to the embodiment.

FIG. 4 is a perspective view illustrating a configuration example of the imaging system 1 according to the embodiment. As illustrated in FIG. 4, the imaging system 1 includes a subject device 10, an imaging device 20, a first joint member 30, and second joining members 40-1 to 40-2. In the following explanation, when it is not necessary to distinguish the second joining members 40-1 and 40-2 from each other, these are collectively referred to as a second joint member 40 by omitting the portion after the hyphen in the reference numerals.

As illustrated in FIG. 4, the first joint member 30 is a long rod-shaped device. The subject device 10 is connected to one end of the first joint member 30. The imaging device 20 is connected between one end and the other end of the first joint member 30. The first joint member 30 is used to maintain a constant distance between the subject device 10 and the imaging device 20, In the imaging system 1, a portion including the subject device 10, the imaging device 20, and the first joint member 30 is used by being submerged in water, such as the sea in which a fish cage is installed. Specifically, the portion including the subject device 10, the imaging device 20, and the first joint member 30 in the imaging system 1 is submerged to a certain depth in water in a state in which a longitudinal direction of the first joint member 30 is parallel to the water surface.

As illustrated in FIG. 4, the second joint member 40 is a long rod-shaped device. The second joint member 40-1 and the second joint member 40-2 have the same configuration. The second joint member 40 is used to submerge the portion including the subject device 10, the imaging device 20, and the first joint member 30 to a certain depth in water. The second joint member 40 is joined with the first joint member 30 such that a longitudinal direction of the second joint member 40 and the longitudinal direction of the first joint member 30 are perpendicular to each other. The second joint member 40 is joined with one end or the other end of the first joint member 30 at predetermined intervals between one end and the other end. The second joint member 40-1 is joined to an end on a side to which the imaging device 20 is connected (the opposite end to an end to which the subject device 10 is connected) out of two ends of the first joint member 30 at predetermined intervals between one end and the other end. The second joint member 40-2 is joined to the end on which the subject device 10 is connected out of two ends of the first joint member 30 at predetermined intervals between one end and the other end.

Figure 5:
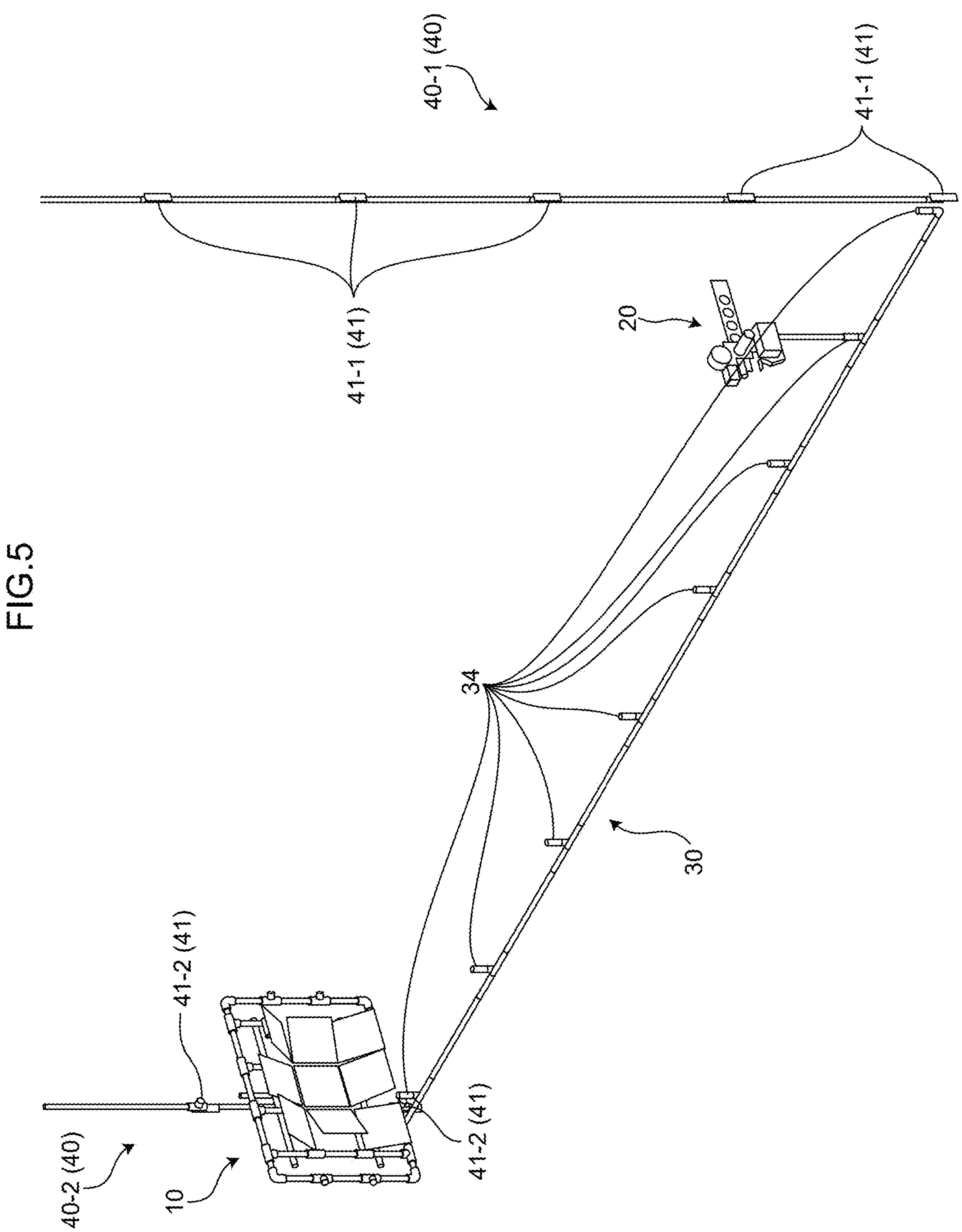
FIG. 5 is a perspective view illustrating a lower portion of the imaging system according to the embodiment.

FIG. 5 is a perspective view illustrating a lower portion of the imaging system 1 according to the embodiment. The lower portion of the imaging system 1 represents a portion including the subject device 10, the imaging device 20, and the first joint member 30 in the imaging system 1.

The subject device 10 is a device corresponding to the reference object O1 illustrated in FIG. 2. The subject device 10 is a subject to be imaged (subject) by the imaging device 20. The subject device 10 is arranged at a position opposing the imaging device 20. In FIG. 2, for simplicity, a case in which the reference object O1 is a single plate-shaped object has been explained, but the subject device 10 illustrated in FIG. 4 includes, instead of a single plate-shaped object, a group of plates that are nine plate-shaped members (hereinafter, also referred to as "plates") arranged in a 3×3 grid, Out of respective surfaces of the nine plates constituting the plate group, a surface on the side facing the light source is covered with scales of a specific kind of fish, a model of fish scales, or with mimic skin, a color chart, or a checkerboard. Furthermore, out of the respective surfaces of the nine plates constituting the plate group, a surface on the side facing the light source reflects light irradiated from the light source.

Although a case in which the subject device 10 includes a plate group 11, which is constituted of nine plates arranged in a 3×3 grid, will be explained in the present embodiment, the number of plates included in the plate group 11 is not limited to nine, Specifically, the subject device 10 includes the plate group including a fixed plate and at least one rotating plate. For example, the subject device 10 may include a plate group constituted of $N^2$ pieces of plates arranged in an N×N grid (N is a positive integer equal to or greater than 2). Moreover, the $N^2$ pieces of the plates included in the plate group are each removable. For example, the subject device 10 may include a plate group including any number of plates from 2 to $N^2$.

The imaging device 20 is a device corresponding to the camera C1 illustrated in FIG. 2. The imaging device 20 includes a light source. The light source included in the imaging device 20 corresponds to the light source L2 illustrated in FIG. 2. The light source included in the imaging device 20 irradiates light to the subject device 10 underwater. The imaging device 20 captures an image of the subject device 10 underwater to which light of the light source is irradiated. Specifically, the imaging device 20 captures an image (reference image) of the plate group underwater to which light from the light source is irradiated.

The imaging device 20 captures of an image (reference image) of the subject device 10 at respective distances obtained by varying the distance from the imaging device 20 to the subject device 10 at predetermined intervals.

The first joint member 30 joins the subject device 10 and the imaging device 20. The first joint member 30 has the subject device 10 connected there to at its one end, and has first connecting members 34 connectable with the imaging device 20 at predetermined intervals between one end and the other end. The first joint member 30 is formed by connecting rod-shaped members having the length corresponding to the predetermined interval. The length corresponding to the predetermined interval maybe, for example 1 m. The respective rod-shaped members forming the first joint member 30 haves the first connecting member 34. The subject device 10 is connected to the first connecting member 34 positioned closest to one end of the first joint member 30. The imaging device 20 is connected to either one of the first connecting members 34 that is different from the first connecting member 34 to which the subject device 10 is connected, out of the multiple connecting members 34 between one end and the other end of the first joint member 30.

The second joint member 40 joins with one end or the other end of the first joint member 30 at predetermined intervals between one end and the other end. The second joint member 40 has second connecting members 41 connectable with the first joint member 30 at predetermined intervals between one end and the other end. The second joint member 40-1 has second connecting members 41-1 at predetermined intervals between one end and the other end. The second joint member 40-2 has a second connecting members 41-2 at predetermined intervals between one end and the other end. The second connecting member 41-1 and the second connecting member 41-2 have the same configuration. In the following explanation, when it is not necessary to distinguish between the second connecting members 41-1 and 41-2, these are collectively referred to as second connecting member 41 by omitting the portion after the hyphen in the reference numerals. The second joint member 40 is formed by connecting rod-shaped members having the length corresponding to the predetermined interval. The length corresponding to the predetermined interval maybe, for example 1 m. The respective rod-shaped members forming the second joint member 40 have the second connecting member 41.

In the following embodiment, as an example of a supporting member 12, a hard polyvinyl chloride pipe (hereinafter, referred to as "PVC pipe") will be explained with reference to the drawings. The supporting member 12 is not limited to the PVC pipe, and may be any member as long as it has a rod shape. For example, not limited to a pipe, the supporting member 12 may have any form as long as it is relatively long compared to its diameter. For example, the supporting member 12 does not need to be hollow, and may have an elongated cylindrical shape (for example, a round bar) or an elongated prismatic shape (for example, a square bar). Furthermore, a material of the supporting member 12 is not limited to hard polyvinyl chloride. For example, the material of the supporting member 12 may be a synthetic resin other than hard polyvinyl chloride, concrete, or wood. The material of the supporting member 12 may also be metal. For example, the material of the supporting member 12 may be steel, stainless steel, aluminum, or copper. Moreover, the material of each plate included in the plate group 11 may be the same material as that of the supporting member 12.

FIG. 6 is a perspective view illustrating a positional relationship between the subject device 10 and the imaging device 20 according to the embodiment. The subject device 10 includes the plate group 11 that are multiple plates arranged at a position opposing a light source 21 for imaging, and the supporting member 12 that supports the plate group 11. The plate group 11 is multiple plates arranged in a planar manner. The respective plates included in the plate group 11 have a square shape of the same size. For example, the plate group 11 is arranged in a grid pattern. FIG. 6 illustrates the plate group 11, which are nine plates 110 to 118 arranged in a 3×3 grid.

As illustrated in FIG. 6, the plate group 11 included in the subject device 10 is arranged at a position opposing the imaging device 20 that includes the light source 21 for imaging. Specifically, a direction in which the imaging device 20 faces the plate group 11 coincides with a normal direction of the plate 110 positioned in the center of the plate group 11. Moreover, the light source 21 is installed such that a direction in which the light source 21 irradiates light and a direction in which the imaging device 20 faces the plate group 11 coincide with each other.

In the plate group 11 illustrated in FIG. 6, the plate 110 positioned in the center of the plate group 11 is a plate with its surface fixed in one direction (hereinafter, referred to as "fixed plate"). The fixed plate 110 corresponds to the reference object O1 illustrated in FIG. 2. The fixed plate 110 is positioned right in front of the imaging device 20. That is, the fixed plate 110 has a surface that is positioned right in front when viewed from the imaging device 20. Moreover, an incident direction of light irradiated to the fixed plate 110 from the light source 21 coincides with a normal direction of the fixed plate 110. Furthermore, in the plate group 11, the plates 111 to 118 that are arranged around the plate 110 in the center are plates rotatable around one side as a rotation axis (hereinafter, also referred to as "rotating plate"). The subject device 10 illustrated in FIG. 6 are in a state in which the rotating plates 111 to 118 included in the plate group 11 are all directed to the same direction as the fixed plate 110.

Figure 7:
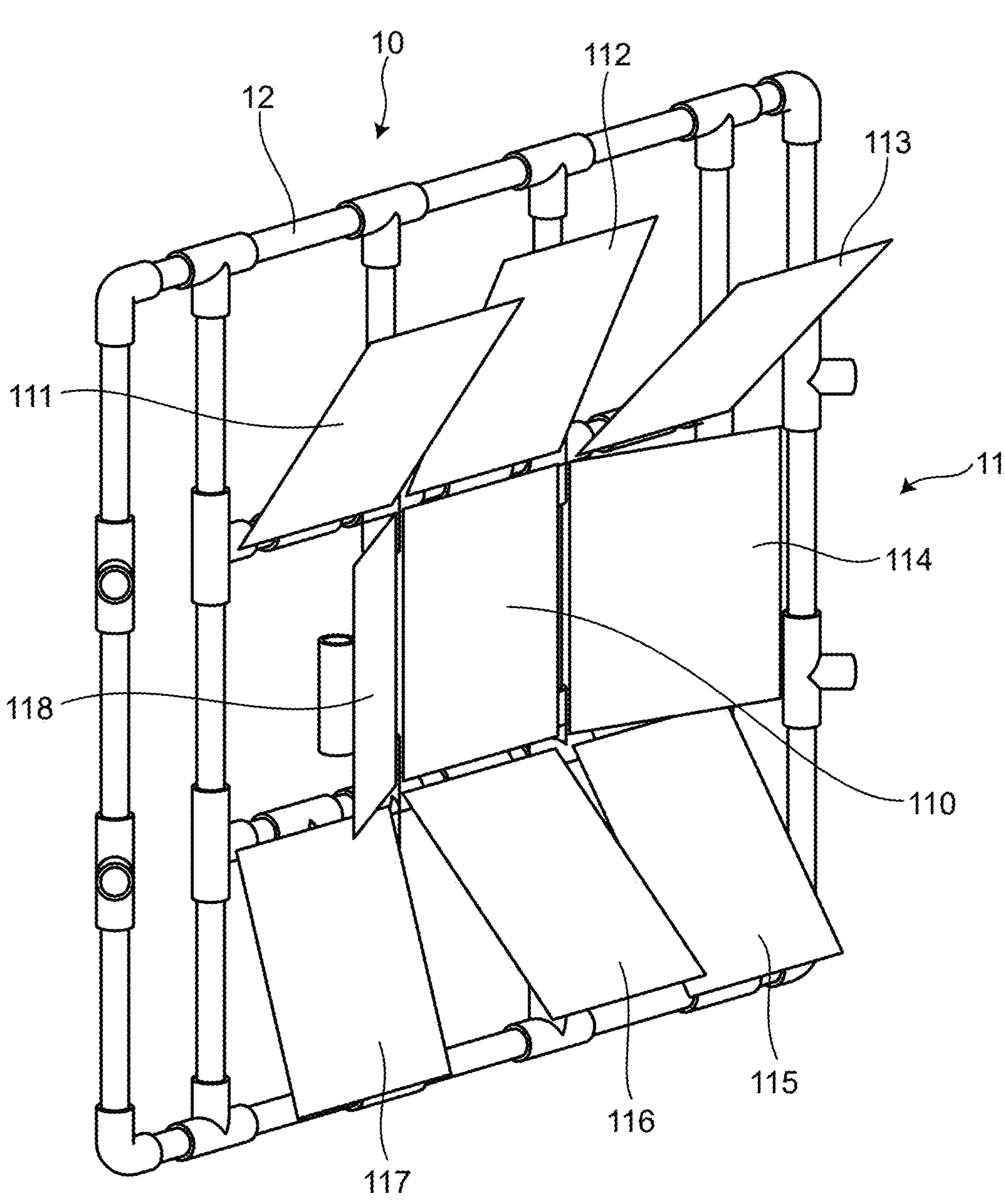
FIG. 7 is a perspective view illustrating the subject device according to the embodiment.

The subject device 10 according to the embodiment will be explained in detail using FIG. 7 to FIG. 17. FIG. 7 is a perspective view illustrating the subject device 10 according to the embodiment. FIG. 7 illustrates the subject device 10 as seen from a direction in which the imaging device 20 is positioned. The subject device 10 illustrated in FIG. 7 differs from that in FIG. 6 in a point in which the respective rotating plates 111 to 118 included in the plate group 11 are directed to a direction different from the fixed plate 110. In FIG. 7, each of the rotating plates 111 to 118 is inclined with respect to the fixed plate 110. In other words, each of the rotating plates 111 to 118 has a surface having an angle different from a surface positioned right in front of the imaging device 20. That is, the respective rotating plates 111 to 118 have a surface having a different angle respectively from the incident direction of light irradiated from the light source 21.

Moreover, generally, a reflectivity of light varies depending on an angle of a surface to which the light is incident. For example, when the body of fish is oriented to the side with respect to the incident direction of light irradiated from the light source 21 included in the imaging device 20, the reflectivity of light from a surface of the fish is to be the highest. As described, the imaging system 1 can acquire the reference information of each plate having a surface at a different angle with respect to an incident direction of light irradiated from the light source 21 by using the plate group 11 that is multiple plates having surfaces having each different angle with respect to the incident direction of the light irradiated from the light source 21 when acquiring the reference information. Thus, the information processing apparatus can estimate the target distance from the imaging device 20 to fish accurately even when the body of the fish is oriented in a direction other than directly sideways, based on the reference information acquired from the rotating plates 111 to 118. Therefore, the imaging system 1 can accurately estimate information regarding an object underwater from an image.

Figure 8:
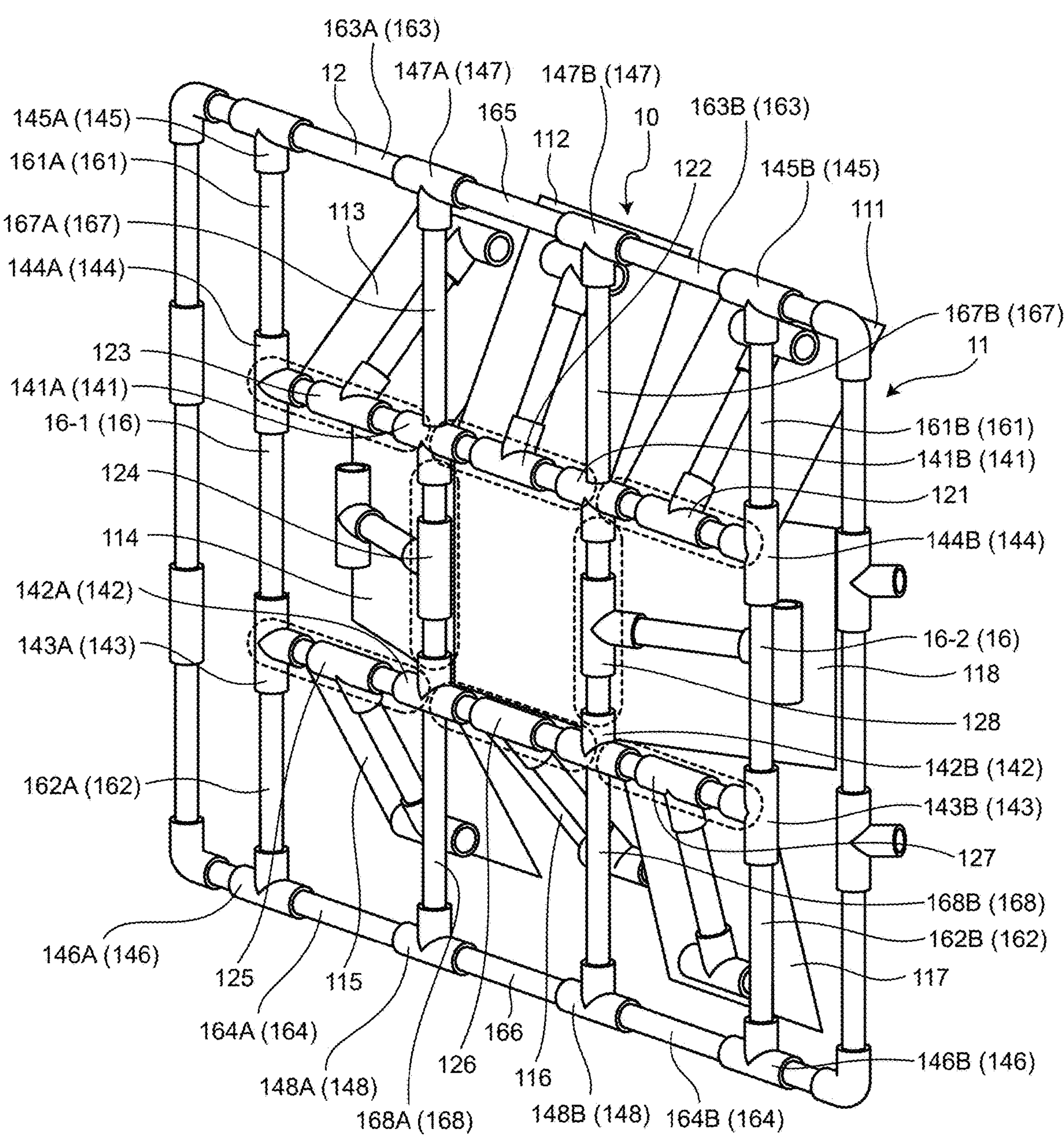
FIG. 8 is a perspective view illustrating the subject device according to the embodiment.

FIG. 8 is a perspective view illustrating the subject device according to the embodiment. FIG. 8 illustrates the subject device 10 as seen from a direction opposite to FIG. 7. FIG. 8 illustrates joint portions 121 to 128 between the respective rotating plates 111 to 118 and the supporting member 12. The respective joint portions 121 to 128 correspond to respective rotation axes of the rotating plates 111 to 118. Specifically, the subject device 10 further includes a first rod-shaped member to join the supporting member 12 and each of the rotating plates 111 to 118. The first rod-shaped member is positioned at each of two ends of the joint portions 121 to 128, and join the supporting member 12 and each of the rotating plates 111 to 118. Thus, the supporting member 12 axially supports one side of each of the rotating plates 111 to 118 corresponding to the respective rotation axes. The structure of the joint portions between the supporting member 12 and the rotating plates 111 to 118 will be explained in detail later with reference to FIGS. 9 and 10.

Moreover, one side corresponding to the respective rotation axes of the rotating plates 111 to 118 is a side close to the center of the rotating plates 111 out of respective sides of the rotating plates 111 to 118. For example, out of the respective sides of the rotating plates 111, 113, 115, and 117, it is one side out of two sides that are close to the fixed plate 110 positioned in the center of the plate group 11. Moreover, one side corresponding to the respective rotation axes of the rotating plates 112, 114, 116, and 118 is a side that coincides with four sides of the fixed plates 110 positioned in the center of the plate group 11.

Furthermore, the supporting member 12 has a joint that joins a second rod-shape member and the rod-shaped member. An outer diameter of the second rod-shaped member is the same as an outer diameter of the first rod-shaped member. A length of the second rod-shaped member is shorter than a length of one side of the respective plates included in the plate group 11 by a predetermined length. A length of the first rod-shaped member is shorter than that of the second rod-shaped member. In the following, when it is not necessary to distinguish between the first rod-shaped member and the second rod-shaped member, they may be simply referred to as rod-shaped member. The joint is a tubular member used to join between the rod-shaped members, and is a T-shaped member in which another tube is formed on a central side surface of a tube in a longitudinal direction. An inner diameter of the joint is formed to match the outer diameters of the first rod-shaped member and the second rod-shaped member. The joint and the rod-shaped member and the rod-shaped member are formed such that the center axis of either tube of the joint and the center axis of the rod-shaped member are coaxial when the rod-shaped member is press-fitted into either tube of the joint.

As illustrated in FIG. 8, the supporting member 12 has a joint 141B that joins the joint portion 121, the joint portion 122, and the joint portion 128. To one end of the tube of the joint 141B in the longitudinal direction, the first rod-shaped member positioned at one end of the joint portion 121 is press-fitted in, To the other end of the tube of the joint 141B in the longitudinal direction, the first rod-shaped member positioned at one end of the joint portion 122 is press-fitted in. To the tube of the joint 141B in a transverse direction, the first rod-shaped member positioned at one end of the joint portion 128 is press-fitted in.

Furthermore, the supporting member 12 has a joint 141A that joins the joint portion 122, the joint portion 123, and the joint portion 124. To one end of the tube of the joint 141A in the in the longitudinal direction, the first rod-shaped member positioned on the other side to the end on the side to which the joint 1418 is press-fitted in out of the first rod-shaped members positioned at both ends of the joint portion 122 is press-fitted in. To the other end of joint 141A in a longitudinal direction, the first rod-shaped member positioned at one end of the joint portion 123 is press-fitted in. To the tube of the joint 141A in the transverse direction, the first rod-shaped member positioned at one end of the joint portion 124 is press-fitted in.

Furthermore, the supporting member 12 has a joint 142A that joins the joint portion 124, the joint portion 125, and the joint portion 126. To the tube of the joint 142A in the transverse direction, the first rod-shaped member positioned at an end on the other side to the end on the side to which the joint 141A is press-fitted in out of the first rod-shaped members positioned at both ends of the joint portion 124 is press-fitted in. To one end of the tube of the joint 142A in a longitudinal direction, the first rod-shaped member positioned at one end of the joint portion 125 is press-fitted in. To the other end of the tube of the joint 142A in the longitudinal direction, the first rod-shaped member positioned at one end of the joint portion 126 is press-fitted in.

Furthermore, the supporting member 12 has a joint 142B that joins the joint portion 126, the joint portion 127, and the joint portion 128. To one end of the tube of the joint 142B in the longitudinal direction, the first rod-shaped member positioned at an end on the other side to the end on the side press-fitted into the joint 142A out of the first rod-shaped members positioned at both ends of the joint portion 126 is press-fitted in. To the other end of the tube of the joint 142B in a longitudinal direction, the first rod-shaped member positioned at one end of the joint portion 127 is press-fitted in. To the tube of the joint 142B in the transverse direction, the first rod-shaped member positioned at an end on the opposite side to the end press-fitted into the joint 141B out of the first rod-shaped members positioned at both ends of the joint portion 128 is press-fitted in.

Furthermore, the supporting member 12 has a joint 143B that joins the joint portion 127, a second rod-shaped member 162B, and a second rod-shaped member 16-2. To the tube of the joint 143B in the transverse direction, the first rod-shaped member positioned at an end on the opposite side to the end press-fitted into the joint 141B out of the first rod-shaped members positioned at both ends of the joint portion 127 is press-fitted in. To one end of the tube of the joint 143B in the longitudinal direction, one end of the second rod-shaped member 162B is press-fitted in. To the other end of the tube of the joint 143B in the longitudinal direction, one end of the second rod-shaped member 16-2 is press-fitted in.

Furthermore, the supporting member 12 has a joint 144B that joins the joint portion 121, the second rod-shaped member 16-2, and a second rod-shaped member 161B. To the tube of the joint 144B in the transverse direction, the first rod-shaped member positioned at an end on the opposite side to the end press-fitted into the joint 141B out of the first rod-shaped members positioned at both ends of the joint portion 121 is press-fitted in. To one end of the tube of the joint 144B in the longitudinal direction, an end on the opposite side to the end press-fitted into the joint 143B is press-fitted in out of both ends of the second rod-shaped member 16-2. To the other end of the tube of the joint 144B in a longitudinal direction, one end of the second rod-shaped member 161B is press-fitted in.

Furthermore, the supporting member 12 has a joint 145B that joins the second rod-shaped member 161B and a second rod-shaped member 163B. To the tube of the joint 145B in the transverse direction, an end on the opposite side to the end press-fitted into the joint 144B is press-fitted in out of both ends of the second rod-shaped member 161B. To one end of the tube of the joint 145B in the longitudinal direction, an end of the second rod-shaped member 163B is press-fitted in.

Furthermore, the supporting member 12 has a joint 146B that joins the second rod-shaped member 162B and a second rod-shaped member 164B. To the tube of the joint 146B in the transverse direction, an end on the opposite side to the end press-fitted into the joint 143B is press-fitted in, out of both ends of the second rod-shaped member 162B. To one end of the tube of the joint 146B in the longitudinal direction, one end of the second rod-shaped member 164B is press-fitted in.

Furthermore, the supporting member 12 has a joint 147B that joins the second rod-shaped member 163B, a second rod-shaped member 165, and a second rod-shaped member 167B. To one end of the tube of the joint 147B in the longitudinal direction, an end on the opposite side to the end press-fitted into the joint 145B is press-fitted in out of both ends of the second rod-shaped member 163B. To one end of the tube of the joint 147B in the longitudinal direction, an end on the opposite side to the end press-fitted into the joint 145B is press-fitted in out of both ends of the second rod-shaped member 163B. To the other end of the tube of the joint 147B in the longitudinal direction, one end of the second rod-shaped member 165 is press-fitted in. To the tube of the joint 147B in the transverse direction, one end of the second rod-shaped member 167B is press-fitted in. The other end of the second rod-shaped member 167B is press-fitted in so as to be in contact with a position on the opposite side to the tube in the transverse direction in the joint 141B.

Furthermore, the supporting member 12 has a joint 148B that joins the second rod-shaped member 164B, a second rod-shaped member 166, and a second rod-shaped member 168B. To one end of the tube of the joint 148B in the longitudinal direction, an end on the opposite side to the end press-fitted into the joint 146B is press-fitted in out of both ends of the second rod-shaped member 164B. To the other end of the tube of the joint 148B in the longitudinal direction, one end of the second rod-shaped member 166 is press-fitted in. To the tube of the joint 148B in the transverse direction, one end of the second rod-shaped member 168B is press-fitted in. The other end of the second rod-shaped member 168B is press-fitted in so as to be in contact with a position on the opposite side to the tube in the transverse direction in the joint 142B.

Furthermore, the supporting member 12 has a joint 143A that joins the joint portion 125, a second rod-shaped member 162A, and a second rod-shaped member 16-1. To the tube of the joint 143A in the transverse direction, the first rod-shaped member positioned at an end on the opposite side to the end press-fitted into the joint 142A out of the first rod-shaped members positioned at both ends of the joint portion 125 is press-fitted in. To one end of the tube of the joint 143A in the longitudinal direction, one end of the second rod-shaped member 162A is press-fitted in. To the other end of the tube of the joint 143A in a longitudinal direction, one end of the second rod-shaped member 16-1 is press-fitted in.

Furthermore, the supporting member 12 has a joint 144A that joins the joint portion 123, the second rod-shaped member 16-1, and a second rod-shaped member 161A, To the tube of the joint 144A in the transverse direction, the first rod-shaped member positioned at an end on the opposite side to the end press-fitted into the joint 141A out of the first rod-shaped members positioned at both ends of the joint portion 123 is press-fitted in. To one end of the tube of the joint 144A in the longitudinal direction, an end on the opposite side to the end press-fitted into the joint 143A out of the both ends of the second rod-shaped member 16-1 is press-fitted in. To the other end of the tube of the joint 144A in a longitudinal direction, one end of the second rod-shaped member 161A is press-fitted in.

Furthermore, the supporting member 12 has a joint 145A that joins the second rod-shaped member 161A and a second rod-shaped member 163A. To the tube of the joint 145A in the transverse direction, an end on the opposite side to the end press-fitted into the joint 144A out of the first rod-shaped members positioned at both ends of the second rod-shaped member 161A is press-fitted in. To one end of the tube of the joint 143A in the longitudinal direction, one end of the second rod-shaped member 162A is press-fitted in. To one end of the tube of the joint 145A in a longitudinal direction, one end of the second rod-shaped member 163A is press-fitted in.

Furthermore, the supporting member 12 has a joint 146A that joins the second rod-shaped member 162A and a second rod-shaped member 164A. To the tube of the joint 146A in the transverse direction, an end on the opposite side to the end press-fitted into the joint 143A out of both ends of the second rod-shaped member 162A is press-fitted in. To one end of the tube of the joint 146A in the longitudinal direction, one end of the second rod-shaped member 164A is press-fitted in.

Furthermore, the supporting member 12 has a joint 147A that joins the second rod-shaped member 163A, the second rod-shaped member 165, and a second rod-shaped member 167A. To one end of the tube of the joint 147A in the longitudinal direction, an end on the opposite side to the end press-fitted into the joint 145A out of both ends of the second rod-shaped member 163A is press-fitted in. To the other end of the tube of the joint 147A in the longitudinal direction, an end on the opposite side to the end press-fitted into the joint 147B out of both ends of the second rod-shaped member 165 is press-fitted in. To the tube of the joint 147A in the transverse direction, one end of the second rod-shaped member 167A is press-fitted in. The other end of the second rod-shaped member 167A is press-fitted in so as to be in contact with a position on the opposite side to the tube of in the transverse direction in the joint 141A.

Furthermore, the supporting member 12 has a joint 148A that joins the second rod-shaped member 164A, the second rod-shaped member 166, and a second rod-shaped member 168A. To one end of the tube of the joint 148A in the longitudinal direction, an end on the opposite side to the end press-fitted into the joint 146A out of both ends of the second rod-shaped member 164A is press-fitted in. To the other end of the tube of the joint 148A in the longitudinal direction, an end on the opposite side to the end press-fitted into the joint 148B out of both ends of the second rod-shaped member 166 is press-fitted in, To the tube of the joint 148A in the transverse direction, one end of the second rod-shaped member 168A is press-fitted in. The other end of the second rod-shaped member 168A is press-fitted in so as to be in contact with a position on the opposite side to the tube of in the transverse direction in the joint 142A.

Figure 9:
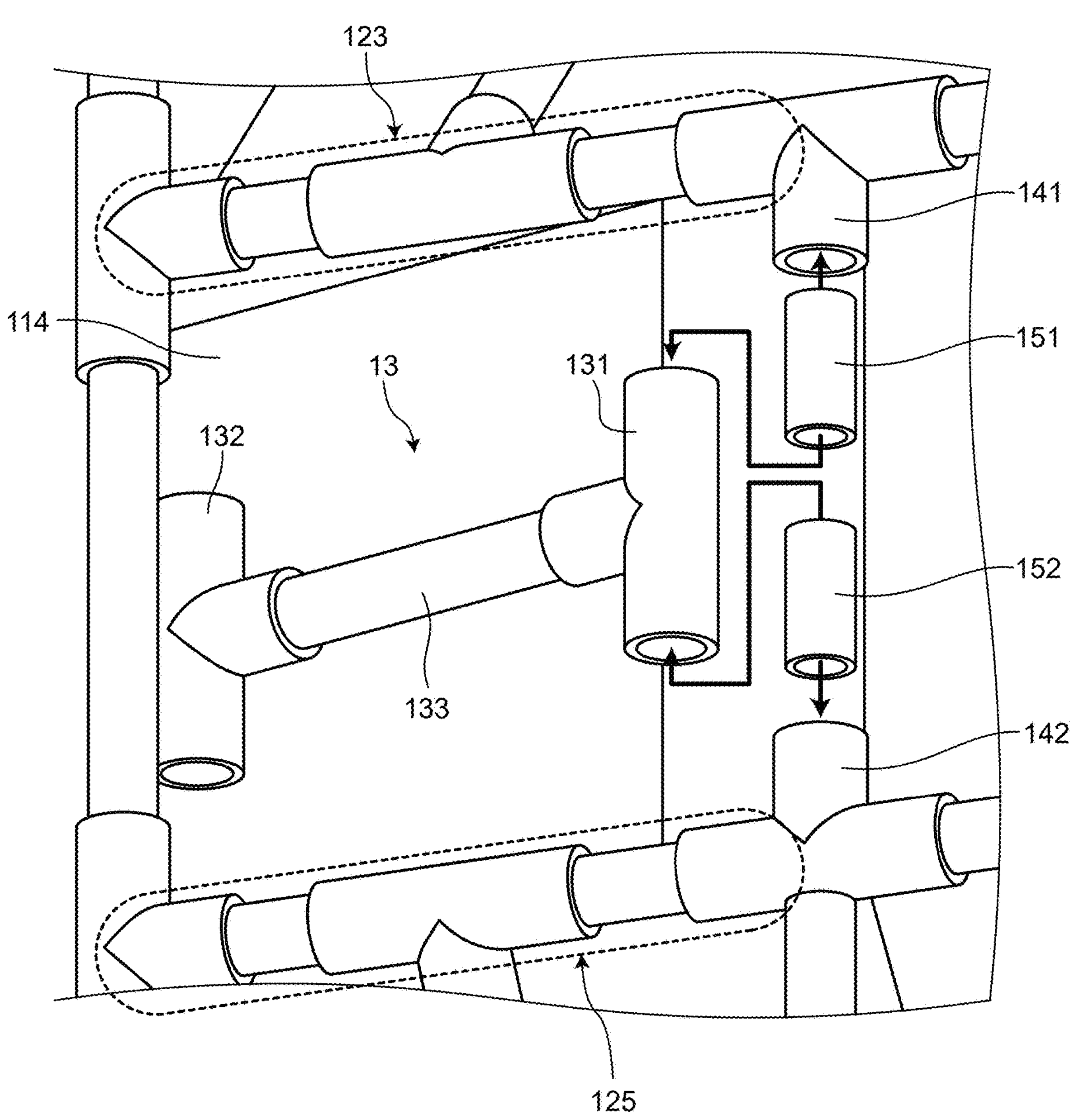
FIG. 9 is a perspective view of an essential part illustrating a joint portion between a supporting member and a rotating plate before being joined by a first rod-shaped member according to the embodiment.

FIG. 9 is a perspective view of an essential part illustrating the joint portion 124 between the supporting member 12 and the rotating plate 114 before being joined by first rod-shaped members 151 to 152 according to the embodiment. In FIG. 9, the joint portion 124 between the supporting member 12 and the rotating plate 114 is explained as an example, but the structures of the joint portions 121 to 123 and 125 to 128 between the supporting member 12 and the other rotating plates 111 to 113 and 115 to 118 are the same as that of the joint portion 124.

As illustrated in FIG. 9, the supporting member 12 has tubes of a joint 141 and a joint 142 in the transverse direction at a position along the rotation axis of the rotating plate 114. As described, the supporting member 12 includes a first tube at a position along the rotation axis of the rotating plate 114. Moreover, the rotating plate 114 has an I-shaped member 13. The I-shaped member 13 is held on a surface opposite to a surface facing the light source 21 out of the respective surfaces of the rotating plate 114. The I-shaped member 13 includes a joint 131, a third rod-shaped member 133, and a joint 132. One end of the third rod-shaped member 133 is press-fitted into a tube in the transverse direction of the joint 131. The other end of the third rod-shaped member 133 is press-fitted into a tube in the transverse direction of the joint 132. A tube in the longitudinal direction of the joint 131 is fixed along one side corresponding to the rotation axis of the rotating plate 114. As described, the rotating plate 114 includes a second tube fixed along on side corresponding to the rotation axis of the rotating plate 114. The tube in the longitudinal direction of the joint 132 and the third rod-shaped member 133 are also fixed to the rotating plate 114. The I-shaped member 13 is fixed to the rotating plate 114, for example, using a cable tie, Velcro (registered trademark), or an adhesive that maintains adhesion underwater.

Moreover, as illustrated in FIG. 9, the first rod-shaped member 151 is configured such that one end of the first rod-shaped member 151 is press-fitted into the tube in the transverse direction of the joint 141, and the other end of the first rod-shaped member 151 is press-fitted into the tube in the longitudinal direction of the joint 131. Furthermore, the first rod-shaped member 152 is configured such that one end of the first rod-shaped member 152 is press-fitted into the tube in the transverse direction of the joint 142, and the other end of the first rod-shaped member 152 is press-fitted into the other end of the tube in the longitudinal direction of the joint 131. The other end of the tube in the longitudinal direction of the joint 131 represents an end on the opposite side to the end press-fitted into the first rod-shaped member 151 out of both ends of the tube in the longitudinal direction of the joint 131. As described, the first rod-shaped members 151 to 152 join the supporting member 12 and the rotating plate 114 as one end of the first rod-shaped members 151 to 152 is press-fitted into the first tube the tube in the transverse direction of the joint 141 and the joint 142 in FIG. 9) and the other end of the first rod-shaped members 151 to 152 is press-fitted into the second tube (the both ends of the tube in the longitudinal direction of the joint 131 in FIG. 9).

Figure 10:
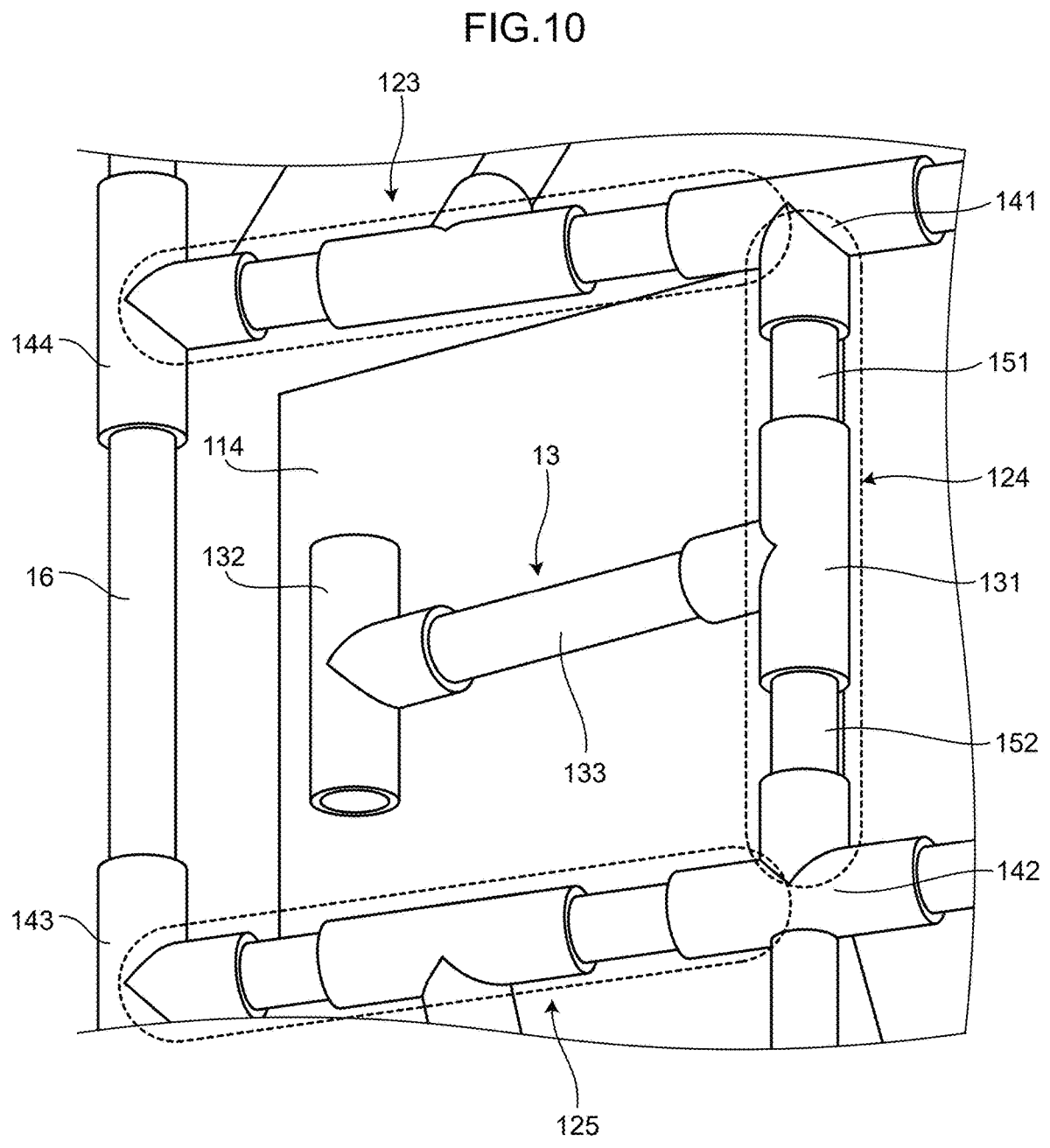

FIG. 10 is a perspective view of an essential part illustrating the joint portion 124 between the supporting member 12 and the rotating plate 114 after being connected by the first rod-shaped members 151 to 152 according to the embodiment. In FIG. 10, the joint portion 124 between the supporting member 12 and the rotating plate 114 is explained as an example similarly to FIG. 9, but the structure of the joint portions 121 to 123 and 125 to 128 between the supporting member 12 and the other rotating plates 111 to 113 and 115 to 118 is the same as that of the joint portion 124.

Figure 11:
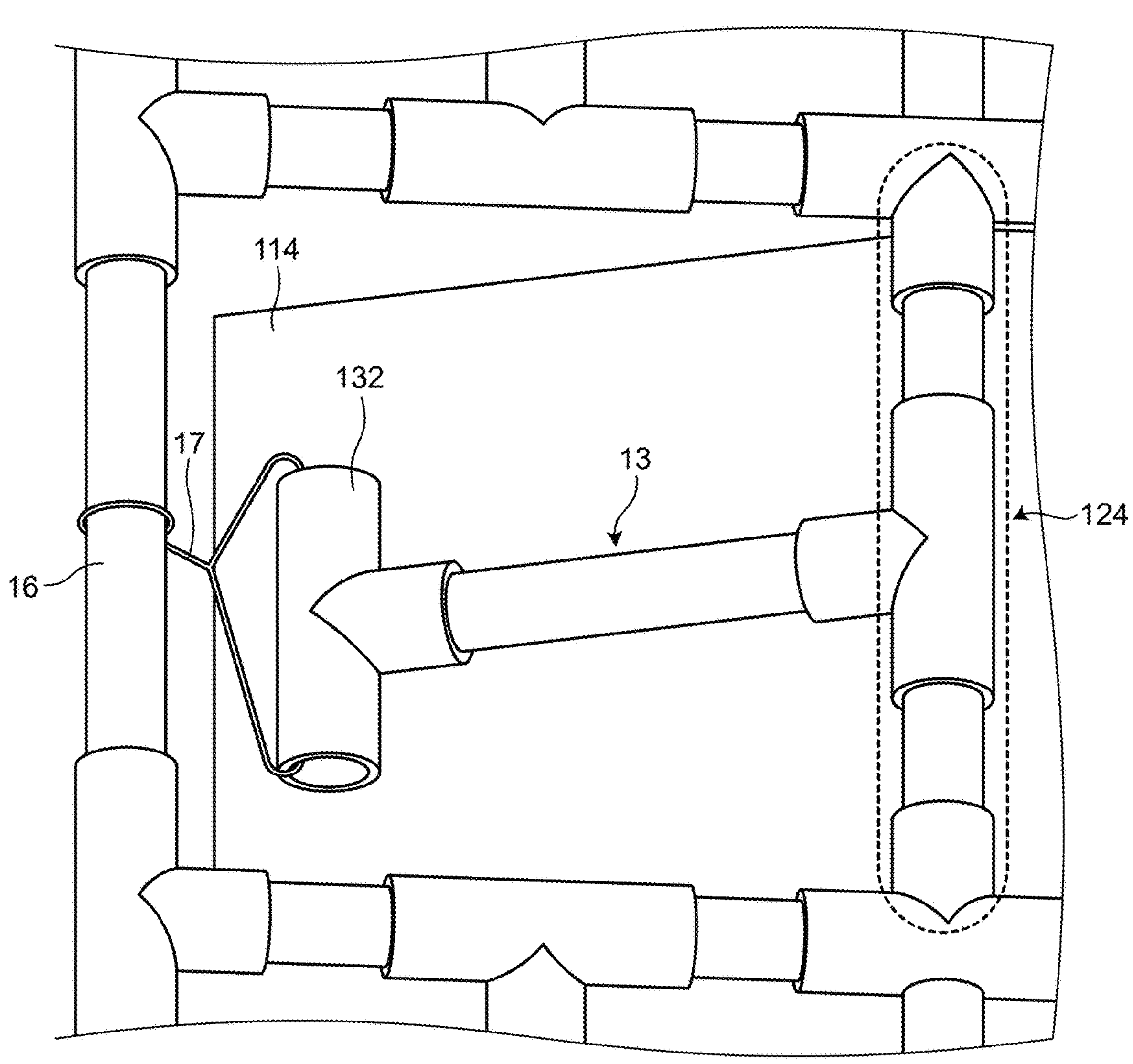
FIG. 11 is a perspective view of an essential part illustrating a restricting member that restricts a rotating range of the rotating plate according to the embodiment.
Figure 12:
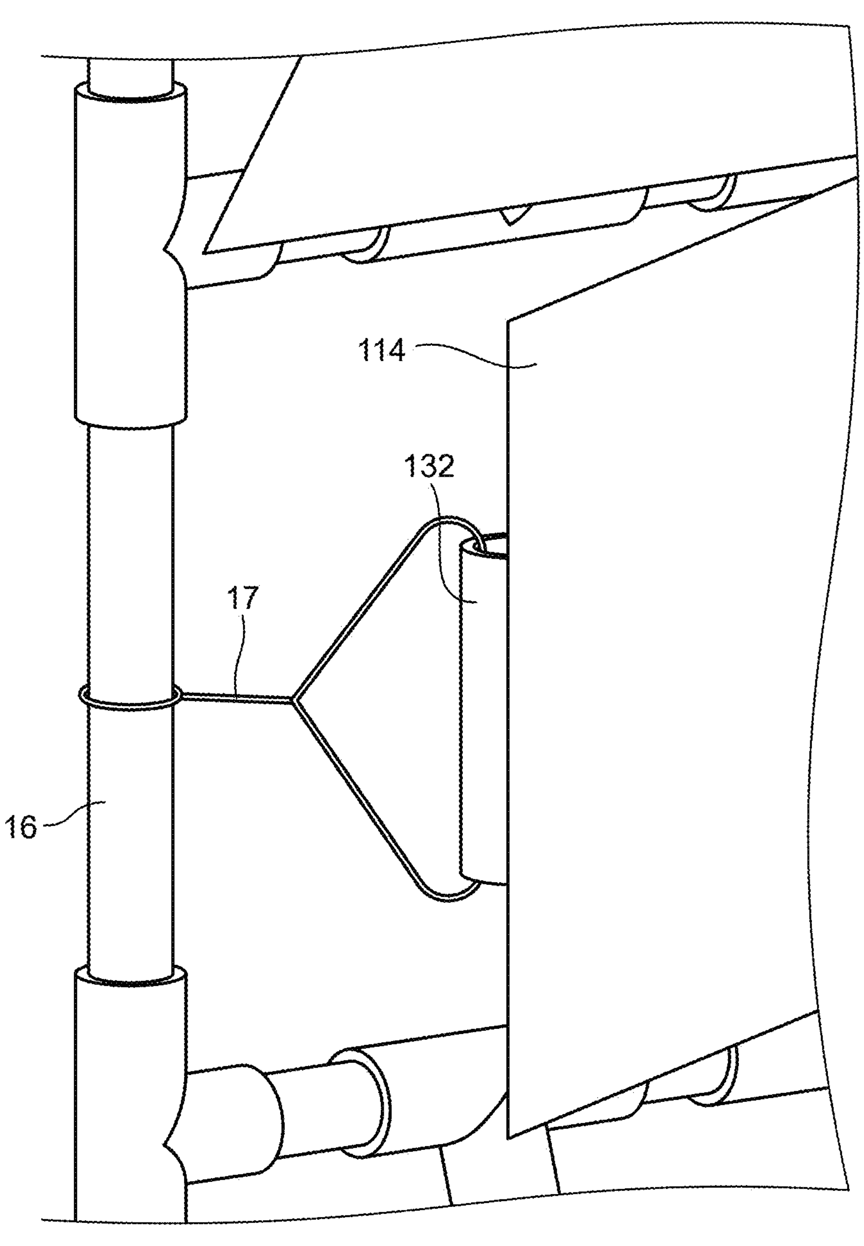
FIG. 12 is a perspective view of an essential part illustrating the restricting member that restricts the rotating range of the rotating plate according to the embodiment.
Figure 13:
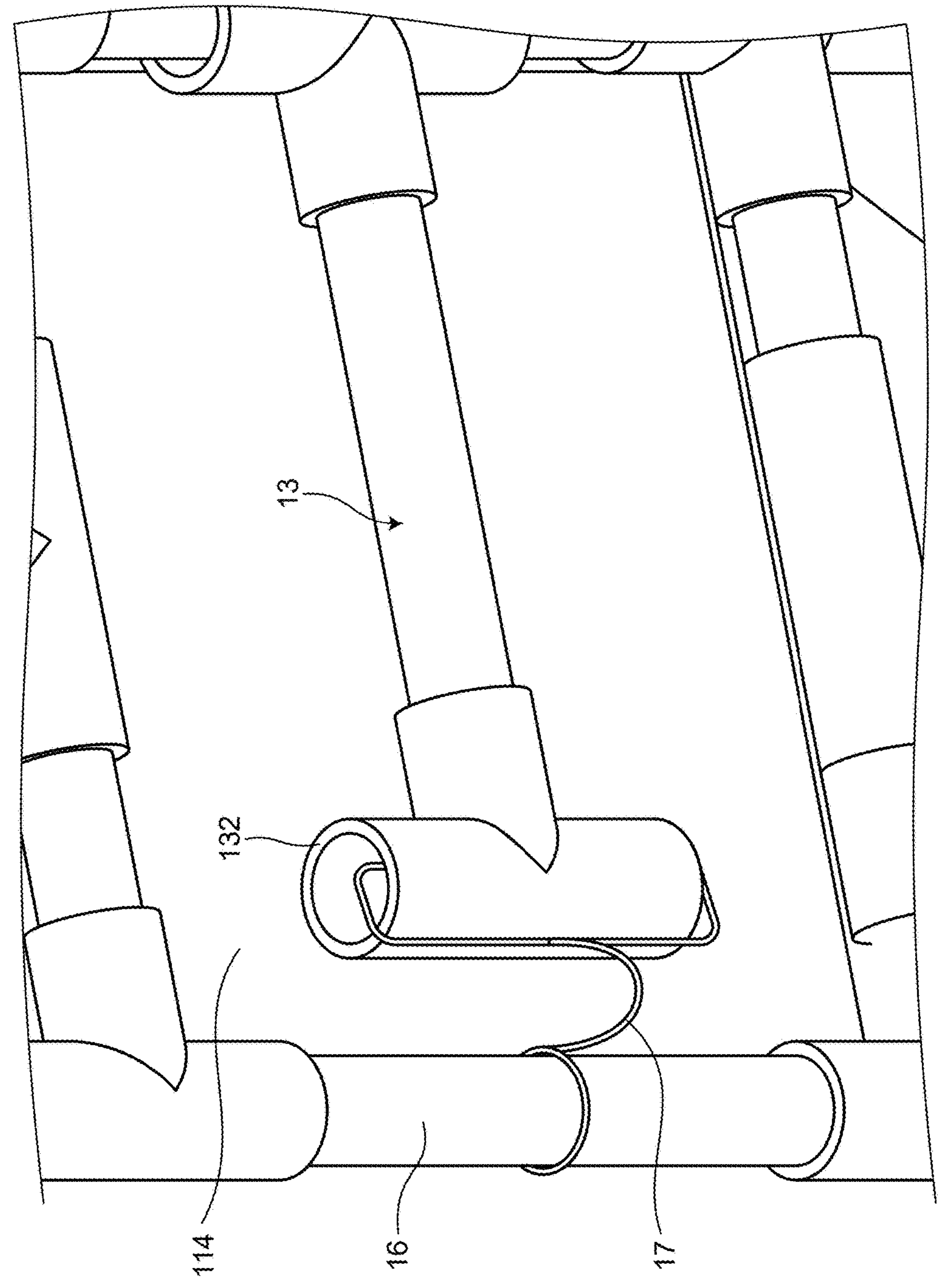
FIG. 13 is a perspective view of an essential part illustrating the restricting member that restricts the rotating range of the rotating plate according to the embodiment.

FIG. 11 to FIG. 13 are perspective views of an essential part illustrating a restricting member 17 that restricts a rotating range of the rotating plate 114 according to the embodiment. The subject device 10 further includes a restricting member that restricts respective rotation ranges of the rotation plates 111 to 118. In FIG. 11 to FIG. 13, the restricting member 17 that restricts the rotation range of the rotating plate 114 is explained as an example, but the structure of a restricting member that restricts the rotation ranges of the other rotating plates 111 to 113 and 115 to 118 is the same. As illustrated in FIG. 11, the restricting member 17 is a string-shaped member that connects a second rod-shaped member 16 and the tube in the longitudinal direction of the joint 132. For example, a material of the restricting member 17 may be a chemical fiber such as synthetic fiber and regenerated fiber, or a natural fiber such as plant fiber and animal fiber. Moreover, the length of the string of the restricting member 17 is changed according to a desired rotation angle. A state in which the string of the restricting member 17 is taut corresponds to the maximum rotation angle of the rotating plate. FIG. 12 illustrates the restricting member 17 from the opposite direction of FIG. 11. FIG. 13 illustrates the restricting member 17 when the rotating plate 114 is in a closed state.

To reduce water resistance, the subject device 10 is submerged in water with each plate in a closed state (the state illustrated in FIG. 6). On the other hand, in the imaging system 1, by equipping the subject device 10 with the restricting member, the rotation angle of the rotating plate can be maintained to a desired angle (for example, 10 degrees, 30 degrees, 60 degrees, and the like) just by lightly pushing each plate after the subject device 10 is submerged in water.

In FIG. 11 to FIG. 13, a case in which the restricting member 17 is a string-shaped member has been explained, but the restricting member 17 is not limited to a string-shaped member. For example, the restricting member 17 is not limited to a string-shaped member but may be a belt-shaped member having a certain width. The material of the restricting member 17 is also not limited to fibers and may be made of, for example, metal (wire or the like). Furthermore, the restricting member 17 is not limited to connecting the second rod-shaped member 16 and the joint 132. For example, the restricting member 17 may be a stopper that fixes the rotating plate at a certain angle.

Figure 14:
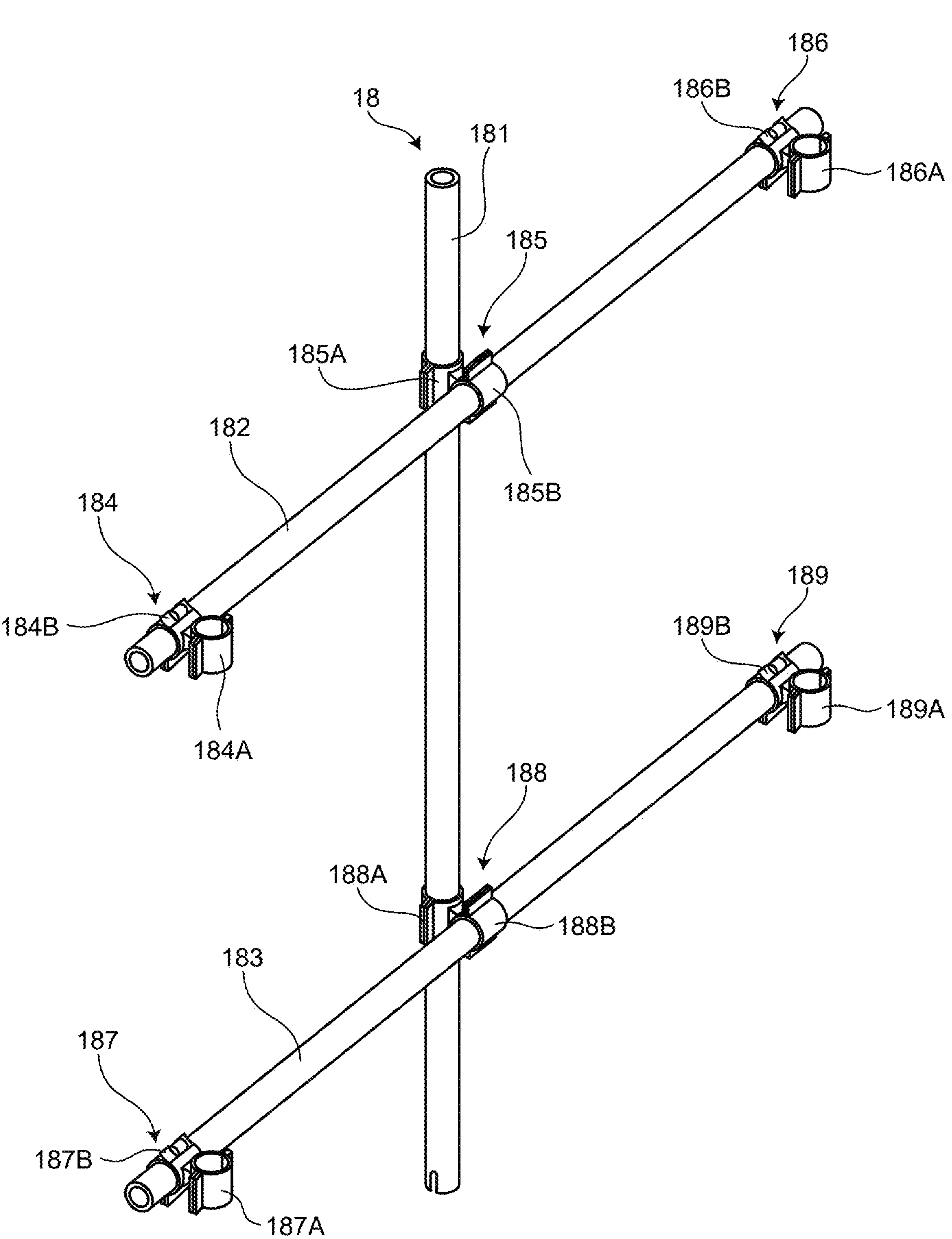
FIG. 14 is a perspective view illustrating a reinforcing member for reinforcing the subject device according to the embodiment.
Figure 15:
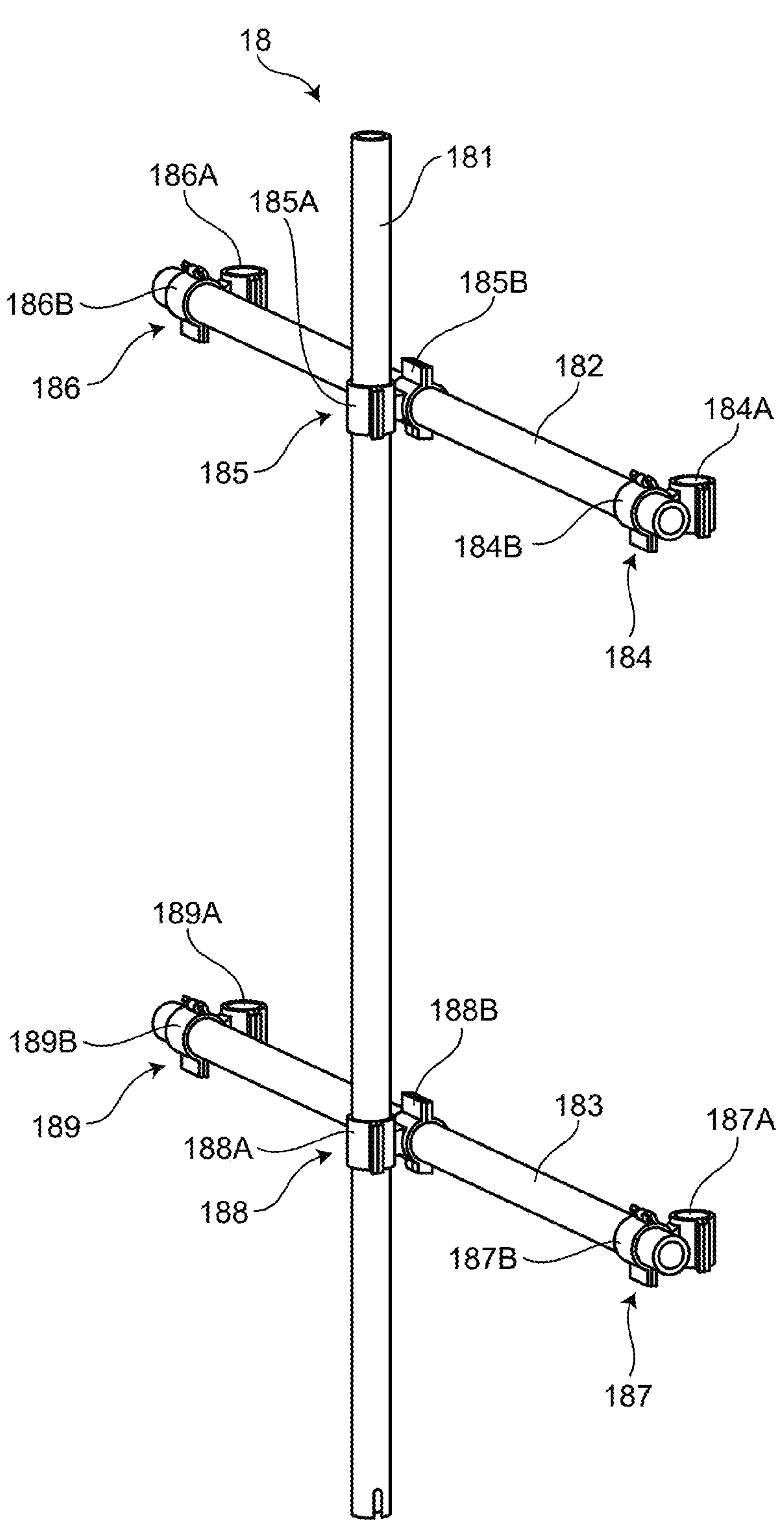
FIG. 15 is a perspective view illustrating the reinforcing member for reinforcing the subject device according to the embodiment.

FIG. 14 to FIG. 15 are perspective view illustrating a reinforcing member 18 that reinforces the subject device 10 according to the embodiment, FIG. 15 illustrates the subject device 10 from the opposite direction of FIG. 14. As illustrated in FIG. 14 and FIG. 15, the reinforcing member 18 includes fourth rod-shaped members 181 to 183 and fixing members 184 to 189. The fourth rod-shaped member 182 is fixed at a predetermined distance from one end of the fourth rod-shaped member 181 by the fixing member 185 such that a longitudinal direction of the fourth rod-shaped member 181 and a longitudinal direction of the fourth rod-shaped member 182 are perpendicular to each other. The fourth rod-shaped member 183 is fixed at a predetermined distance from the other end of the fourth rod-shaped member 181 by the fixing member 185 such that a longitudinal direction of the fourth rod-shaped member 181 and a longitudinal direction of the fourth rod-shaped member 183 are perpendicular to each other.

Figure 16:
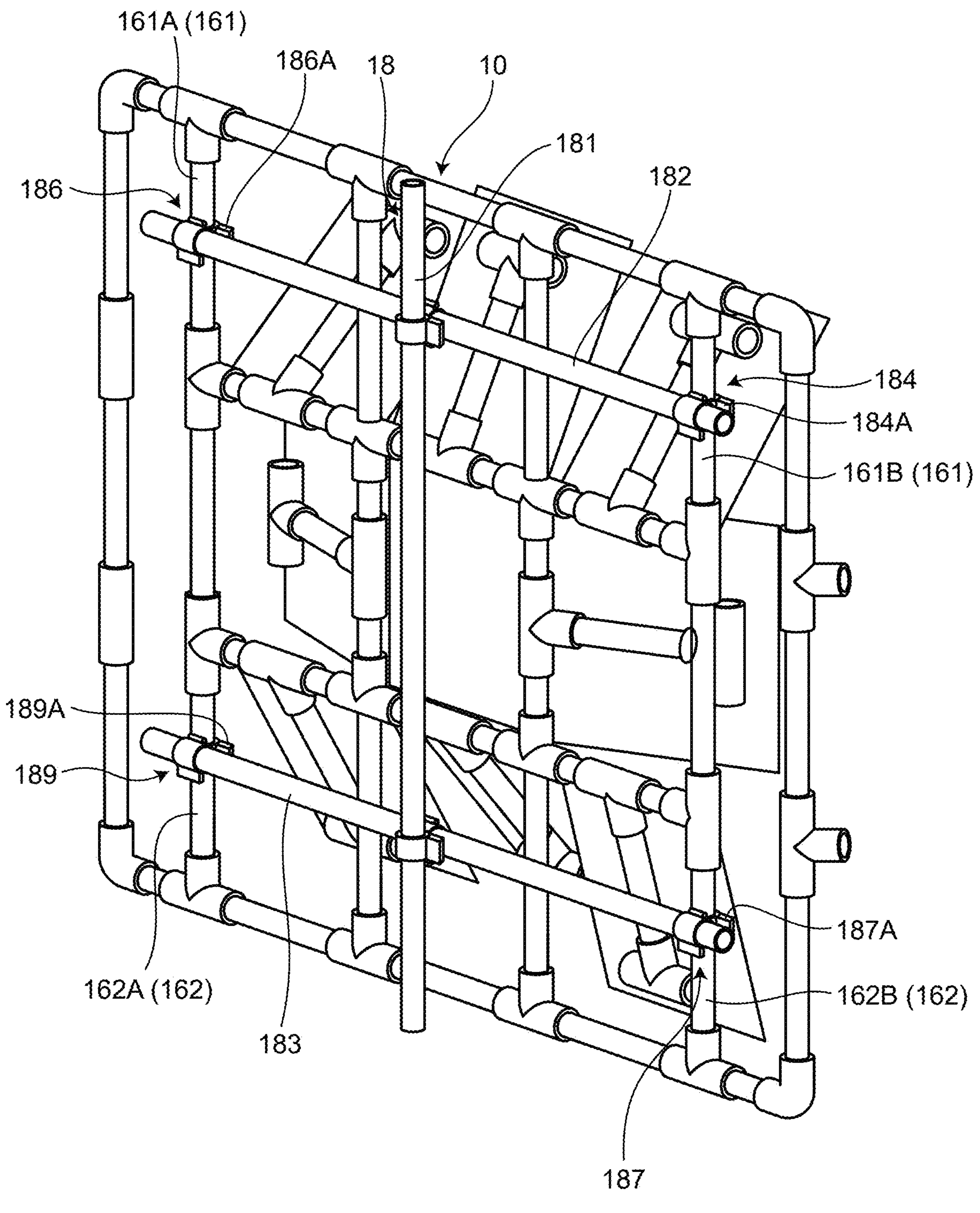
FIG. 16 is a perspective view illustrating a rear side of the subject device after the reinforcing member according to the embodiment is attached.

FIG. 16 is perspective view illustrating a rear side of the subject device 10 after the reinforcing member 18 according to the embodiment is attached. As illustrated in FIG. 16, one end of the fourth rod-shaped member 182 is fixed to the second rod-shaped member 161B by the fixing member 184 such that a longitudinal direction of the fourth rod-shaped member 182 and a longitudinal direction of the second rod-shaped member 161B are perpendicular to each other. Moreover, the other end of the fourth rod-shaped member 182 is fixed to the second rod-shaped member 161A by the fixing member 186 such that the longitudinal direction of the fourth rod-shaped member 182 and the longitudinal direction of the second rod-shaped member 161A are perpendicular to each other. Moreover, one end of the fourth rod-shaped member 183 is fixed to the second rod-shaped member 162B by the fixing member 187 such that the longitudinal direction of the fourth rod-shaped member 183 and the longitudinal direction of the second rod-shaped member 162B are perpendicular to each other. Moreover, the other end of the fourth rod-shaped member 183 is fixed to the second rod-shaped member 162A by the fixing member 189 such that the longitudinal direction of the fourth rod-shaped member 183 and the longitudinal direction of the second rod-shaped member 162A are perpendicular to each other. As described, in the imaging system 1, it is easier to maintain the posture of the subject device 10 when the subject device 10 is submerged in water by being equipped with the reinforcing member 18.

Figure 17:
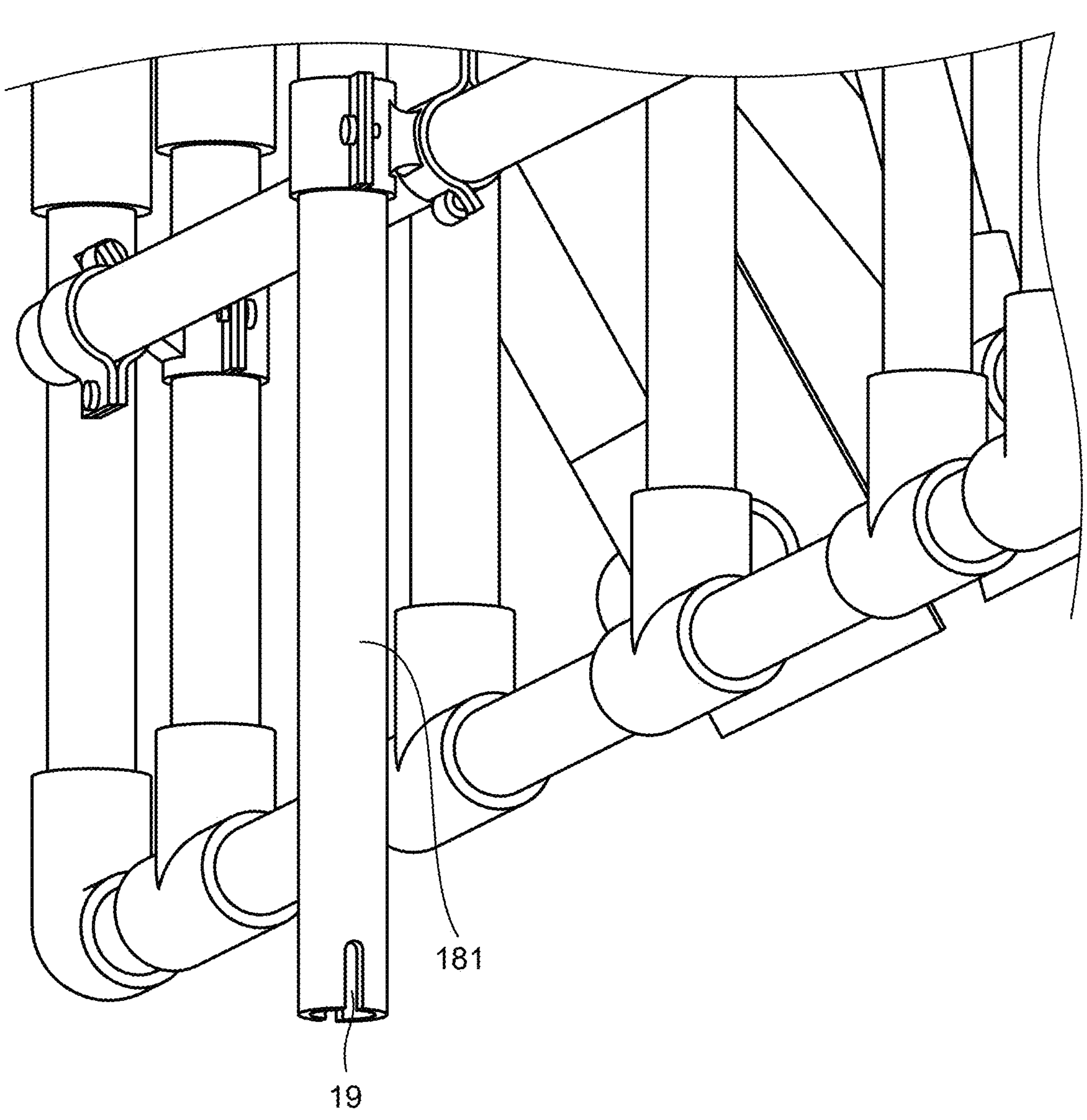
FIG. 17 is a perspective view of an essential part illustrating a joint portion of the reinforcing member according to the embodiment.

FIG. 17 is a perspective view of an essential part illustrating a joint portion of the reinforcing member 18 according to the embodiment. As illustrated in FIG. 17, the fourth rod-shaped member 181 is a pipe, and a distal end of the fourth rod-shaped member 181 has a U-shaped notch 19.

Figure 18:
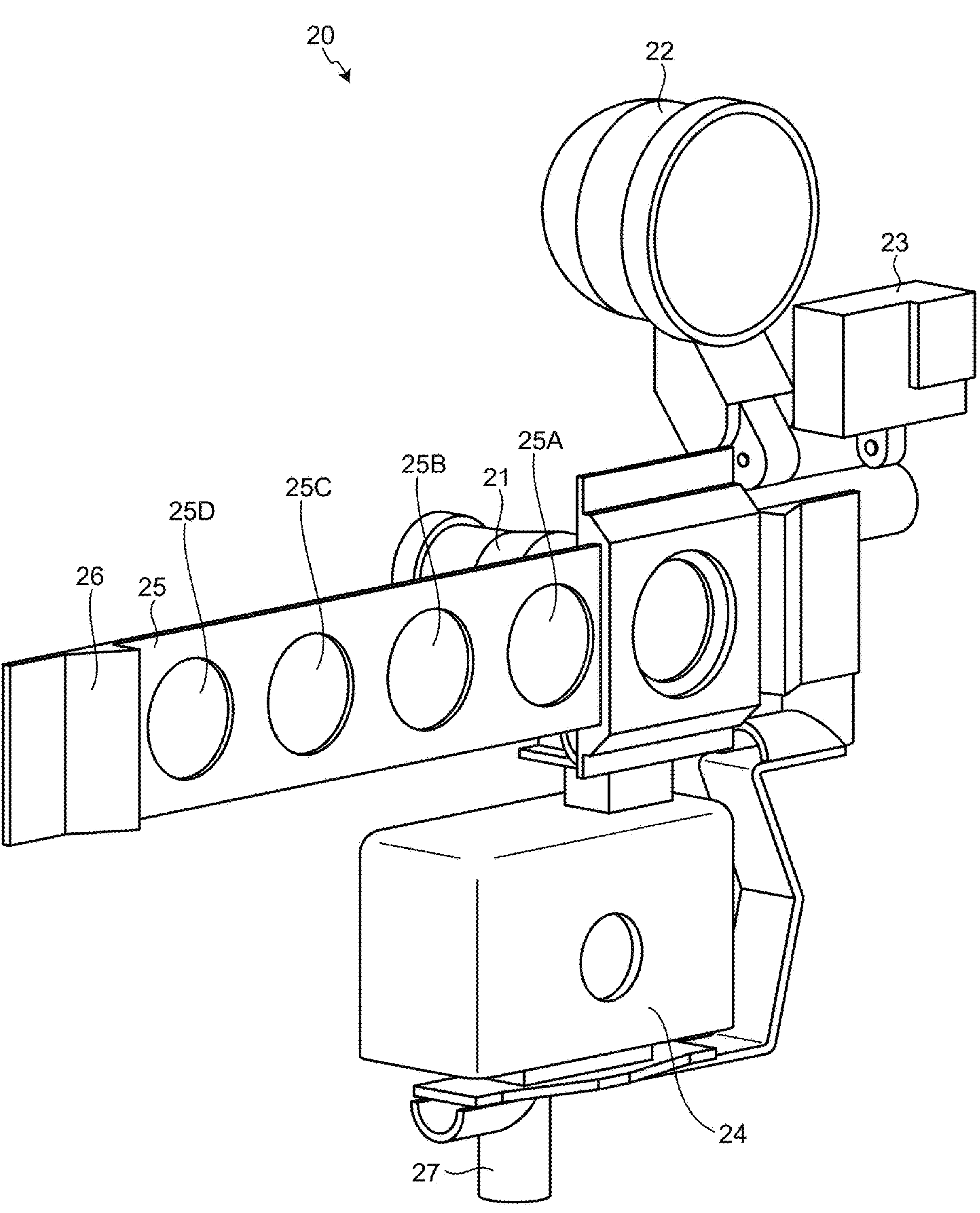
FIG. 18 is a perspective view illustrating the imaging device according to the embodiment.

Hereinafter, the imaging device 20 according to the embodiment will be explained in detail with reference to FIG. 18 to FIG. 20. FIG. 18 is a perspective view illustrating the imaging device 20 according to the embodiment. The imaging device 20 includes the light source 21, and multiple different color filters 25A to 25D corresponding to respective different colors. The color filters 25A to 25D are slidably arranged in front of the light source 21. Each of the color filters 25A to 25D may be, for example, a transparent, red, green, or black filter. The black filter 25D is used to acquire data captured without the light source 21. The imaging device 20 may also be provided with a handle 26 to facilitate sliding multiple different color filters 25A to 25D in front of the light source 21. As described, the imaging system 1 can facilitate capturing images while sequentially changing the color of the light emitted to the subject device 10 by slidably providing the multiple different color filters corresponding to the multiple different colors in front of the light source 21.

Moreover, as illustrated in FIG. 18, the imaging device 20 includes a video camera 22, an action camera 23, and an underwater camera 24. For example, the imaging device 20 may be equipped with a stereo camera that is capable of stereo view underwater. As described, the imaging system 1 can acquire reference information captured using the camera according to a shooting environment, by being equipped with multiple kinds of cameras. Moreover, the imaging system 1 can eliminate the need to press the shutter compared to when capturing still images, by providing the imaging device that can take moving images such as the video camera 22 and the action camera 23.

Figure 19:
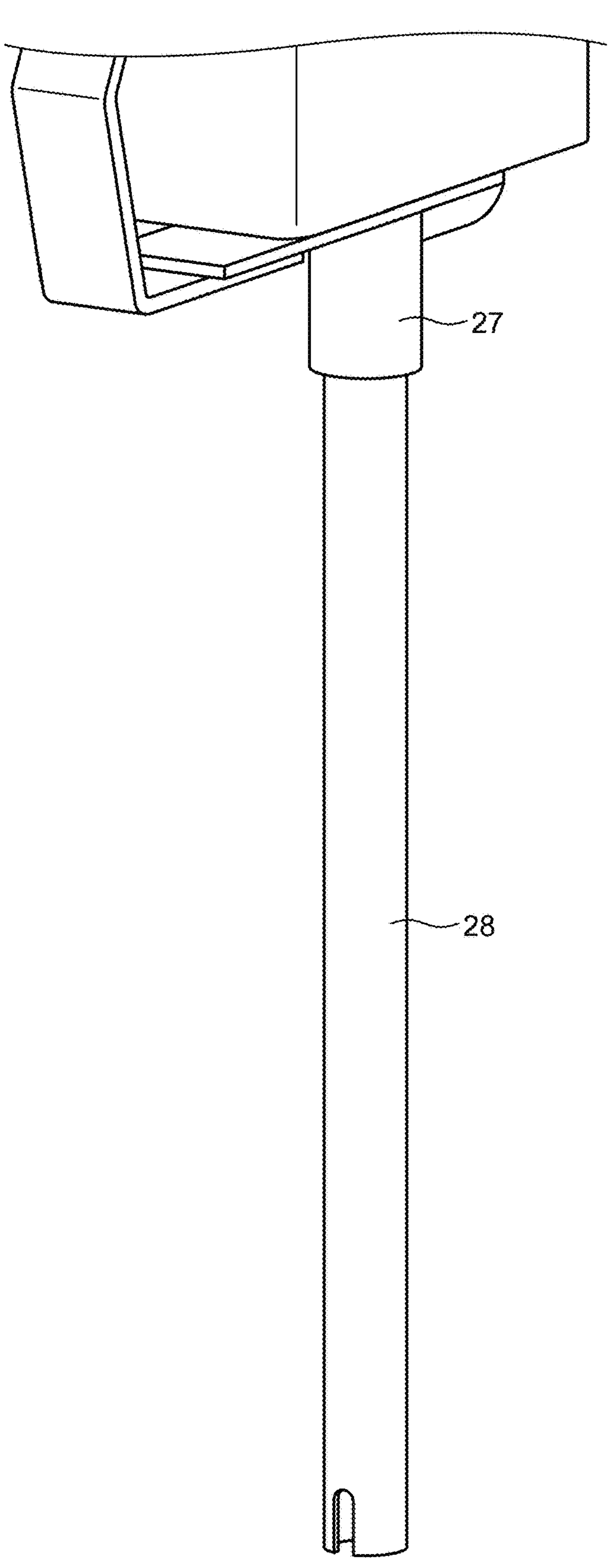
FIG. 19 is a perspective view illustrating a joint portion of the imaging device according to the embodiment.

FIG. 19 is a perspective view illustrating the joint portion of the imaging device 20 according to the embodiment. As illustrated in FIG. 19, the imaging device 20 has a rod-shaped member joined with the first joint member 30.

Figure 20:
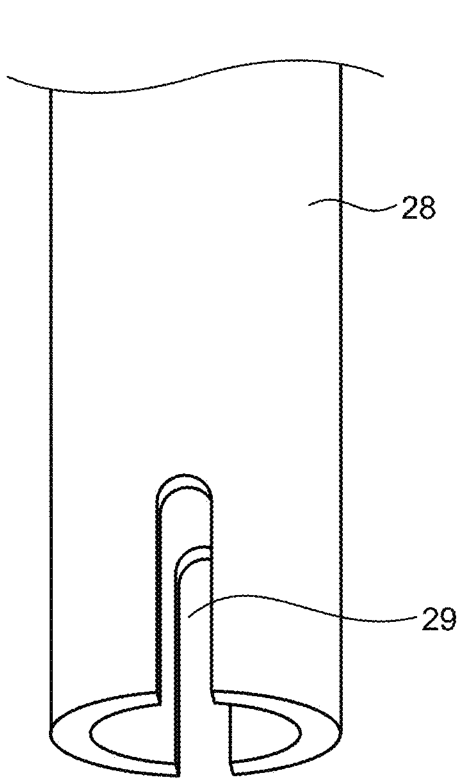
FIG. 20 is a perspective view of an essential part illustrating one end of the joint portion of the imaging device according to the embodiment.

FIG. 20 is a perspective view of an essential portion illustrating one end of the joint portion of the imaging device 20 according to the embodiment. As illustrated in FIG. 20, a rod-shaped member 28 is a tube, and a distal end of the rod-shaped member 28 has a U-shaped notch 29 in the same shape as the notch 19 illustrated in FIG. 17. Moreover, an inner diameter and an outer diameter of the rod-shaped member 28 may be identical to the inner diameter and the outer diameter of the fourth rod-shaped member 181.

Figure 21:
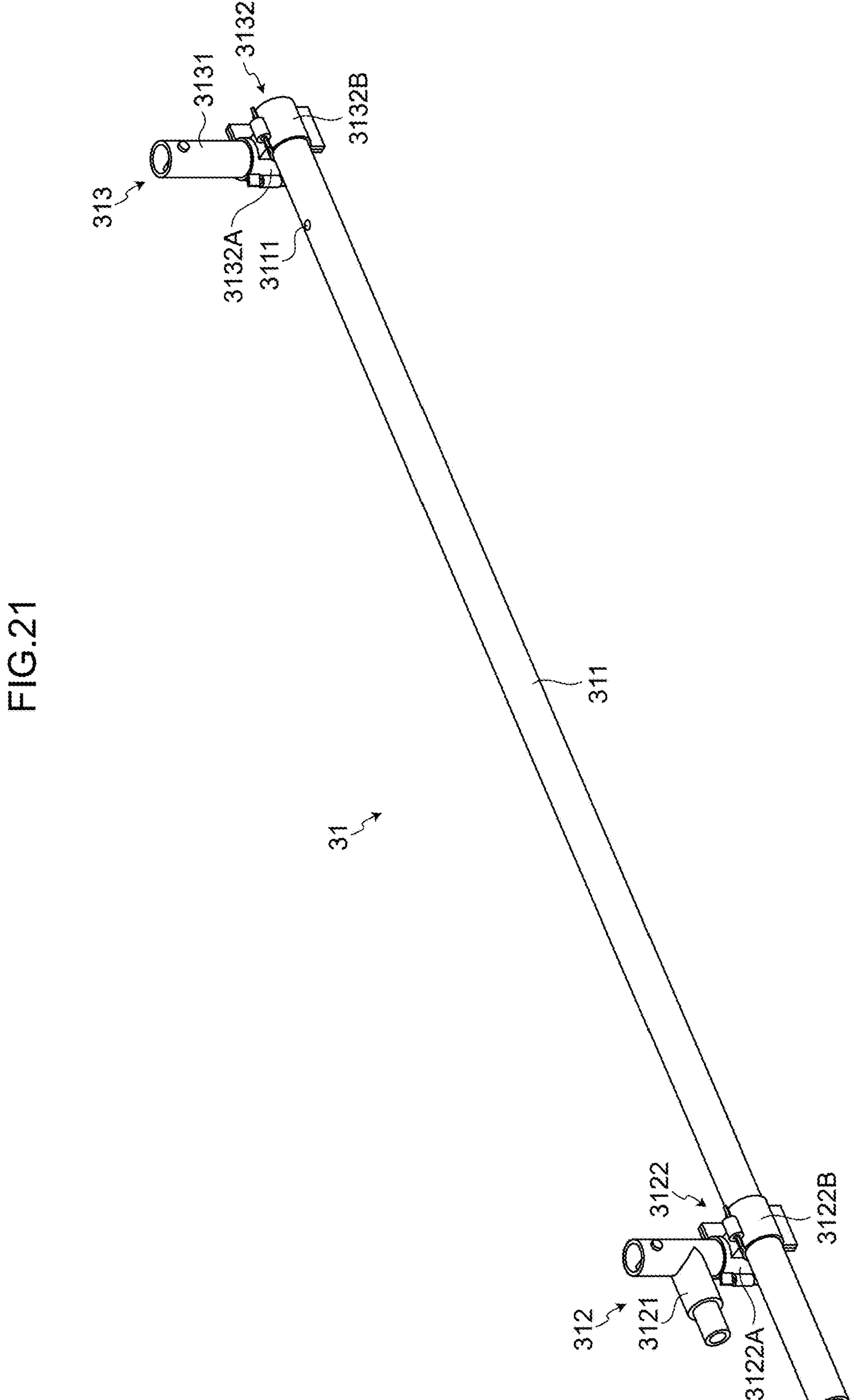
FIG. 21 is a perspective view illustrating a fifth rod-shaped member constituting a first joint member according to the embodiment.

Hereinafter, the first joint member 30 according to the embodiment will be explained in detail with reference to FIG. 21 to FIG. 29. The first joint member 30 is formed by connecting a fifth rod-shaped member 31, multiple sixth rod-shaped members 32, and a seventh rod-shaped member 33. FIG. 21 is a perspective view illustrating the fifth rod-shaped member 31 that constitutes the first joint member 30 according to the embodiment. The fifth rod-shaped member 31 includes a rod portion 311, a connecting member 312 for connecting to the subject device 10, and a connecting member 313 that can be connected to the imaging device 20. The connecting member 312 is arranged at one end of the rod portion 311. The connecting member 313 is arranged at an opposite end to the rod portion 311 out of both ends of the rod portion 311. The connecting member 313 is the same as the first connecting member 34 described above.

Figure 22:
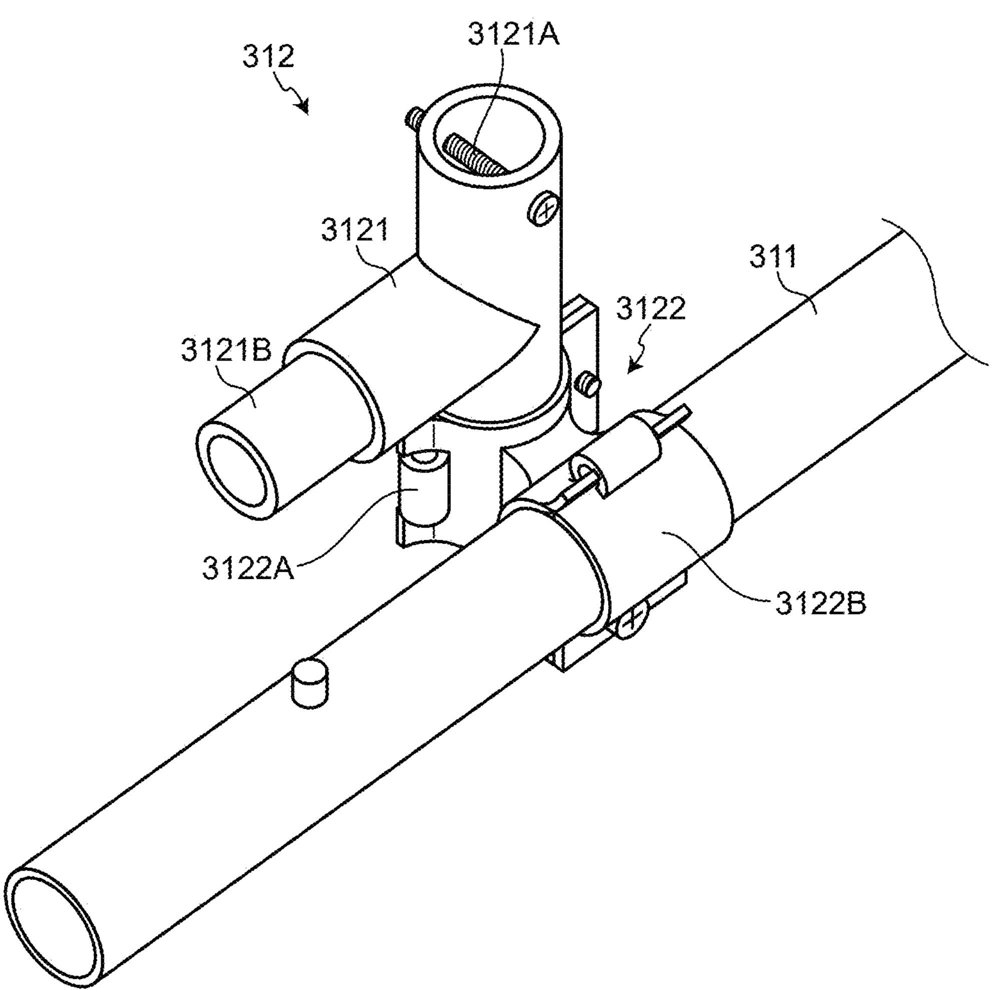
FIG. 22 is a perspective view of an essential part illustrating one end of the fifth rod-shaped member according to the embodiment.

FIG. 22 is a perspective view of an essential portion illustrating one end of the fifth rod-shaped member 31 according to the embodiment. As illustrated in FIG. 22, to one end of the fifth rod-shaped member 31, the connecting member 312 to be connected to the subject device 10 is arranged. The connecting member 312 has a joint 3121 and a fixing member 3122. The fixing member 3122 is a member to which a fixing member 3122B attachable to the rod portion 311 and a fixing member 3122A having an axis perpendicular to a longitudinal direction of the rod portion 311 are connected. The first fixing member 3122B is attached to a position apart from one end of the rod portion 311 by a predetermined distance. Moreover, one end of the joint 3121 in a longitudinal direction is fixed by the second fixing member 3122A. To the other end of the tube in the longitudinal direction of the joint 3121, a horizontal rod (for example, a screw) 3121A that penetrates through the tube in a diameter direction is arranged. Moreover, in a tube in a transverse direction of the joint 3121, a tube 3121B having an outer diameter equal to an inner diameter of the joint 3121 is press-fitted in. A distal end of the tube 3121B has a shape gradually becoming thin toward the distal end to facilitate easy insertion and removal.

As illustrated in FIG. 22, the connecting member 313 has a tube 3131 and a fixing member 3132. The fixing member 3132 has a structure same as that of the fixing member 3122. The fixing member 3132 has a first fixing member 3132B attachable to the rod portion 311, and a second fixing member 3132A having an axis perpendicular to the longitudinal direction of the rod portion 311, Moreover, in the rod portion 311, on an outer circumference on a side on which the connecting member 313 is arranged, a hole 3111 is provided.

Figure 23:
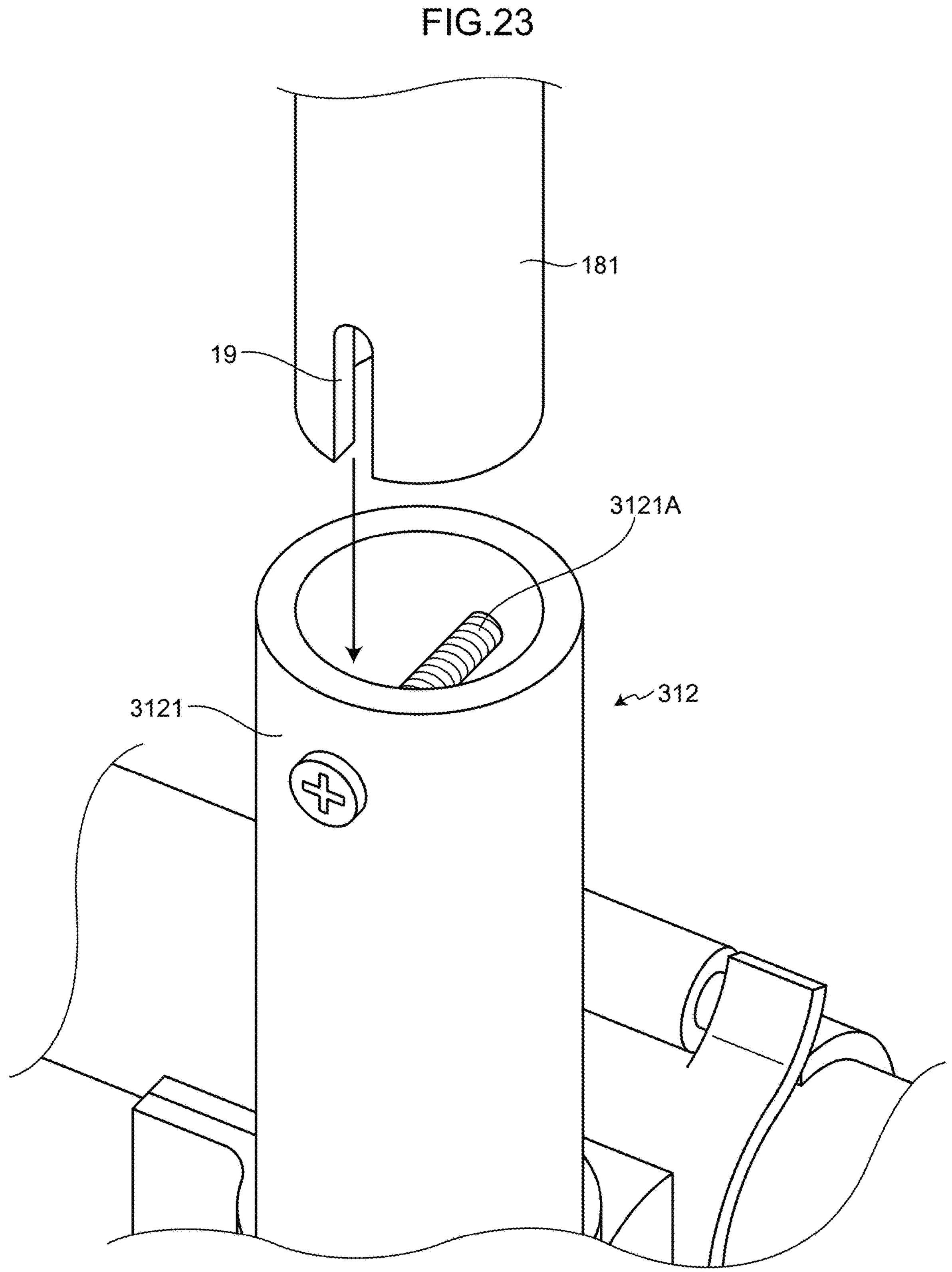
FIG. 23 is a perspective view of an essential part illustrating a joint portion of the reinforcing member before being joined and the fifth rod-shaped member.

FIG. 23 is a perspective view of an essential portion illustrating a joint portion of the reinforcing member 18 before being joined and the fifth rod-shaped member 31. As illustrated in FIG. 23, the U-shaped notch at a distal end of the fourth rod-shaped member 181 engages with the horizontal rod 3121A inside the tube in the longitudinal direction of the joint 3121. Thus, the subject device 10 and the first joint member 30 are joined.

FIG. 24 is a perspective view illustrating a sixth rod-shaped member constituting a first joining member according to the embodiment. As illustrated in FIG. 24, the sixth rod-shaped member 32 includes a rod portion 321 and a connecting member 322 for connecting to the imaging device 20. The connecting member 322 is arranged at one end of the rod portion 321. The connecting member 322 is the same as the first connecting member 34 described above. Moreover, the connecting member 322 has the same structure as the connecting member 313 illustrated in FIG. 21, That is, the connecting member 322 has a tube 3221 and a fixing member 3222. The fixing member 3222 has the same structure as the fixing member 3132 and the fixing member 3122. The fixing member 3222 includes a first fixing member 3222B attachable to the rod portion 321, and a second fixing member 3222A having an axis perpendicular to the longitudinal direction of the rod portion 321, Moreover, in the rod portion 321, on an outer circumference on a side on which the connecting member 322 is arranged, a hole 3211 similar to the hole 3111 in FIG. 21 is provided.

As illustrated in FIG. 24, in the rod portion 321, on the outer circumference of the opposite side to the side on which the connecting member 322 is arranged, a convex portion 3212 is arranged. In the rod portion 321, an end on the opposite side to the side on which the connecting member 322 is arranged is inserted in the first fixing member 3122B illustrated in FIG. 21. The convex portion 3212 illustrated in FIG. 24 engages with the hole 3111 illustrated in FIG. 21. Thus, the fifth rod-shaped member 31 and the sixth rod-shaped member 32 are joined. Moreover, the sixth rod-shaped member 32 and the sixth rod-shaped member 32 are joined. Specifically, in the rod portion 321, an end on the opposite side to the side on which the connecting member 322 is arranged is inserted into the first fixing member 3222B of the sixth rod-shaped member 32 to be joined. The convex portion 3212 illustrated in FIG. 24 engages with the hole 3211 of the sixth rod-shaped member 32 to be joined. Thus, the sixth rod-shaped member 32 and the sixth rod-shaped member 32 are joined.

Figure 25:
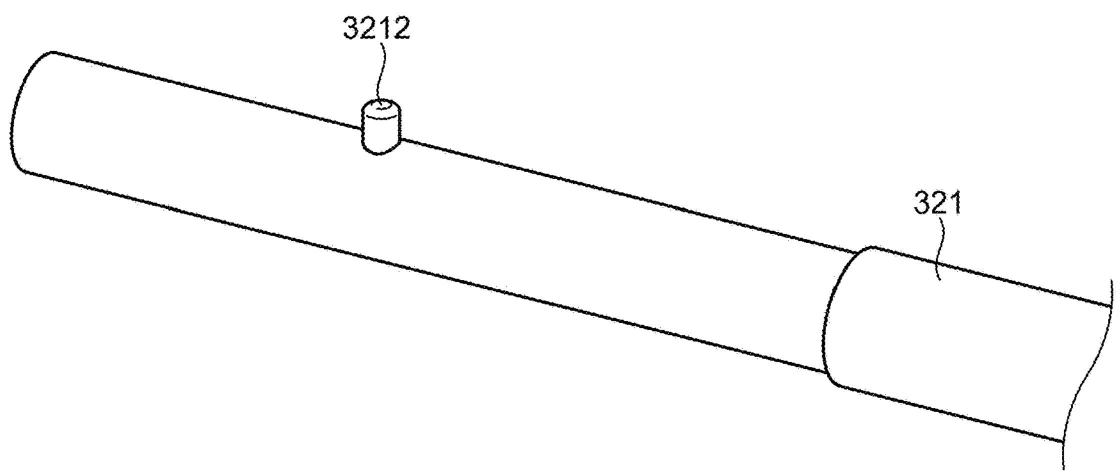
FIG. 25 is a perspective view of an essential part illustrating one end of the sixth rod-shaped member according to the embodiment.

FIG. 25 is a perspective view of an essential portion illustrating one end of the sixth rod-shaped member 32 according to the embodiment. As illustrated in FIG. 25, in the rod portion 321, on the outer circumference on the opposite side to the side on which the connecting member 322 is arranged, the convex portion 3212 is arranged.

Figure 26:
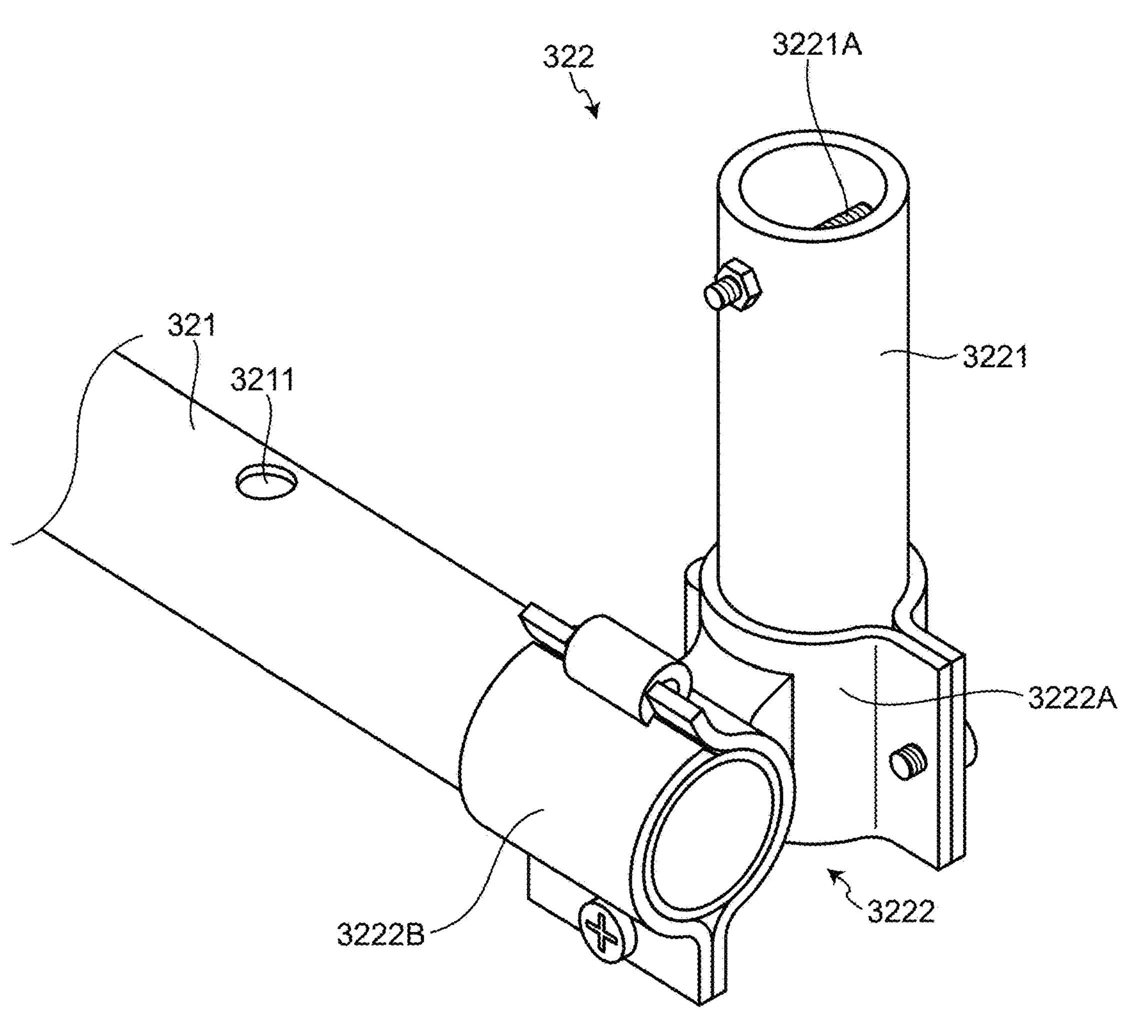
FIG. 26 is a perspective view of an essential part illustrating the other end of the sixth rod-shaped member according to the embodiment.

FIG. 26 is a perspective view of an essential portion illustrating the other end of the sixth rod-shaped member 32 according to the embodiment. As illustrated in FIG. 26, out of both ends of the sixth rod-shaped member 32, the connecting member 322 connectable to the imaging device 20 is arranged at an end on the opposite side to the portion at which the convex portion 3212 is arranged. The connecting member 322 includes the tube 3221 and the fixing member 3222. The first fixing member 3222B is attached to the end on the opposite side to the portion in which the convex portion 3212 is arranged out of both ends of the rod portion 321. Moreover, one end of the tube 3221 is fixed by the second fixing member 3222A. To the other end of the tube 3221, a horizontal rod 3221A that penetrates through the tube in a diameter direction is arranged. Furthermore, the hole 3211 is arranged at a position on the outer circumference of the rod portion 321, apart from the connecting member 322 by a predetermined distance.

Figure 27:
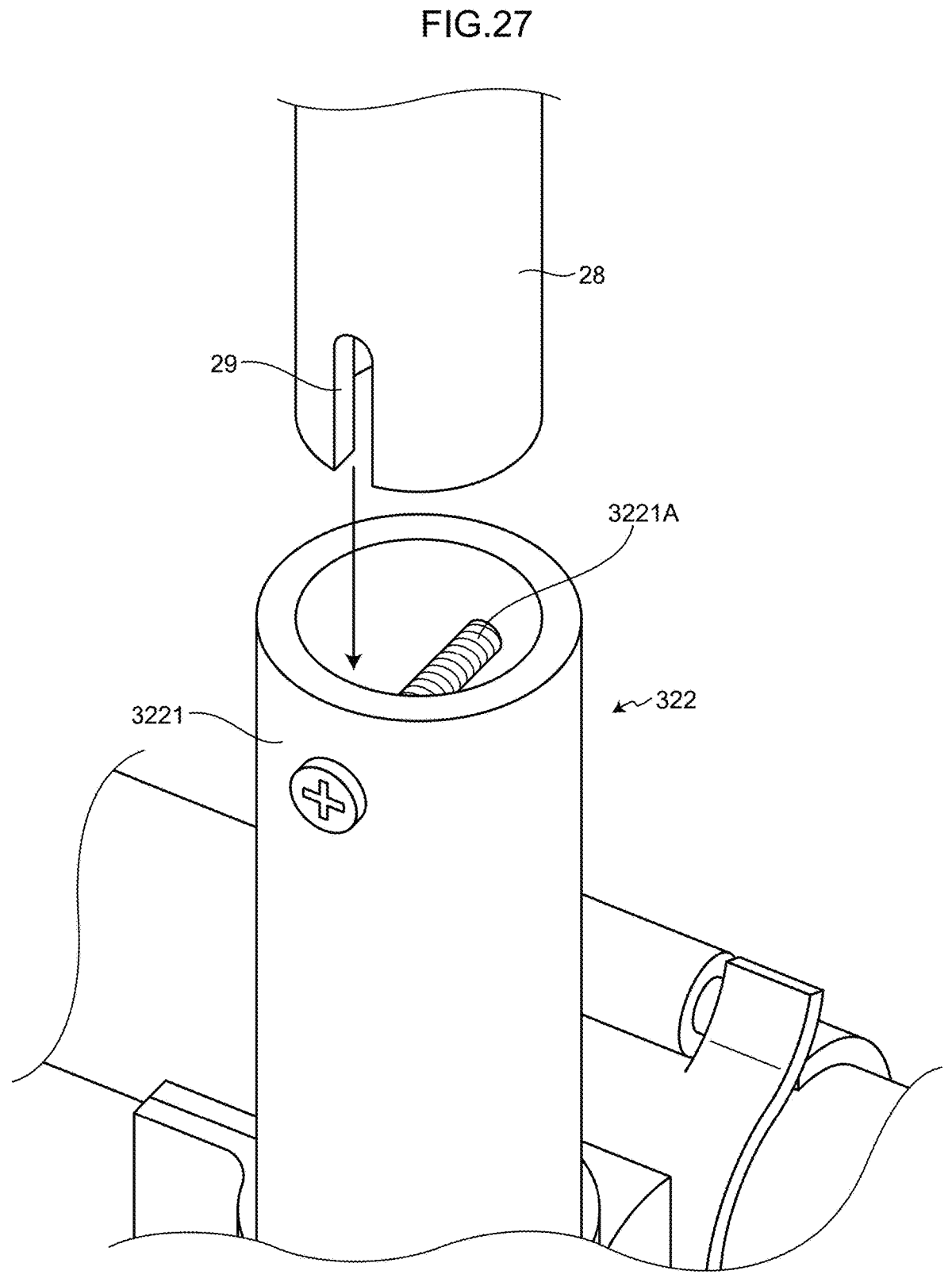

FIG. 27 is a perspective view of an essential portion illustrating a joint portion of the imaging device 20 before being joined and the sixth rod-shaped member 32 according to the embodiment. As illustrated in FIG. 27, the U-shaped notch 29 at a distal end of a rod portion 28 engages with the horizontal rod 3221A inside the tube 3221. Thus, the imaging device 20 and the first joint member 30 are joined.

Figure 28:
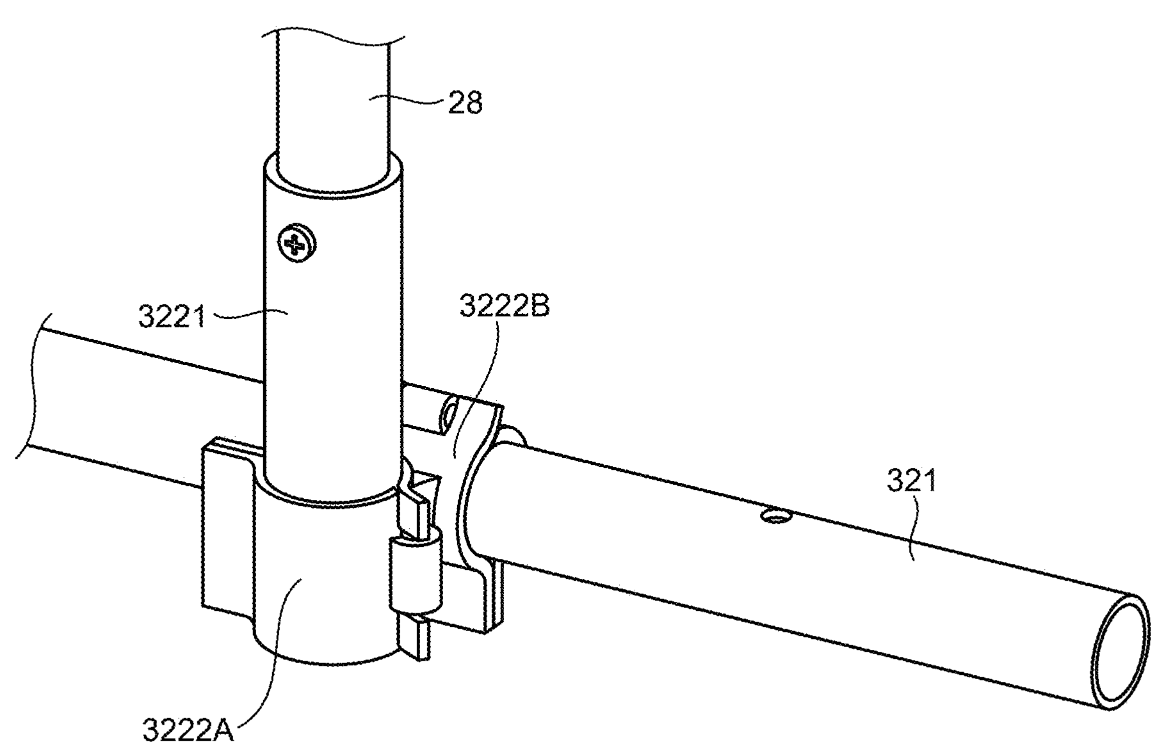
FIG. 28 is a perspective view of an essential part illustrating a joint portion between the imaging device after being joined and the sixth rod-shaped member according to the embodiment.

FIG. 28 is a perspective view of an essential portion of a joint portion between the imaging device 20 after being joined and the sixth rod-shaped member 32 according to the embodiment.

Figure 29:
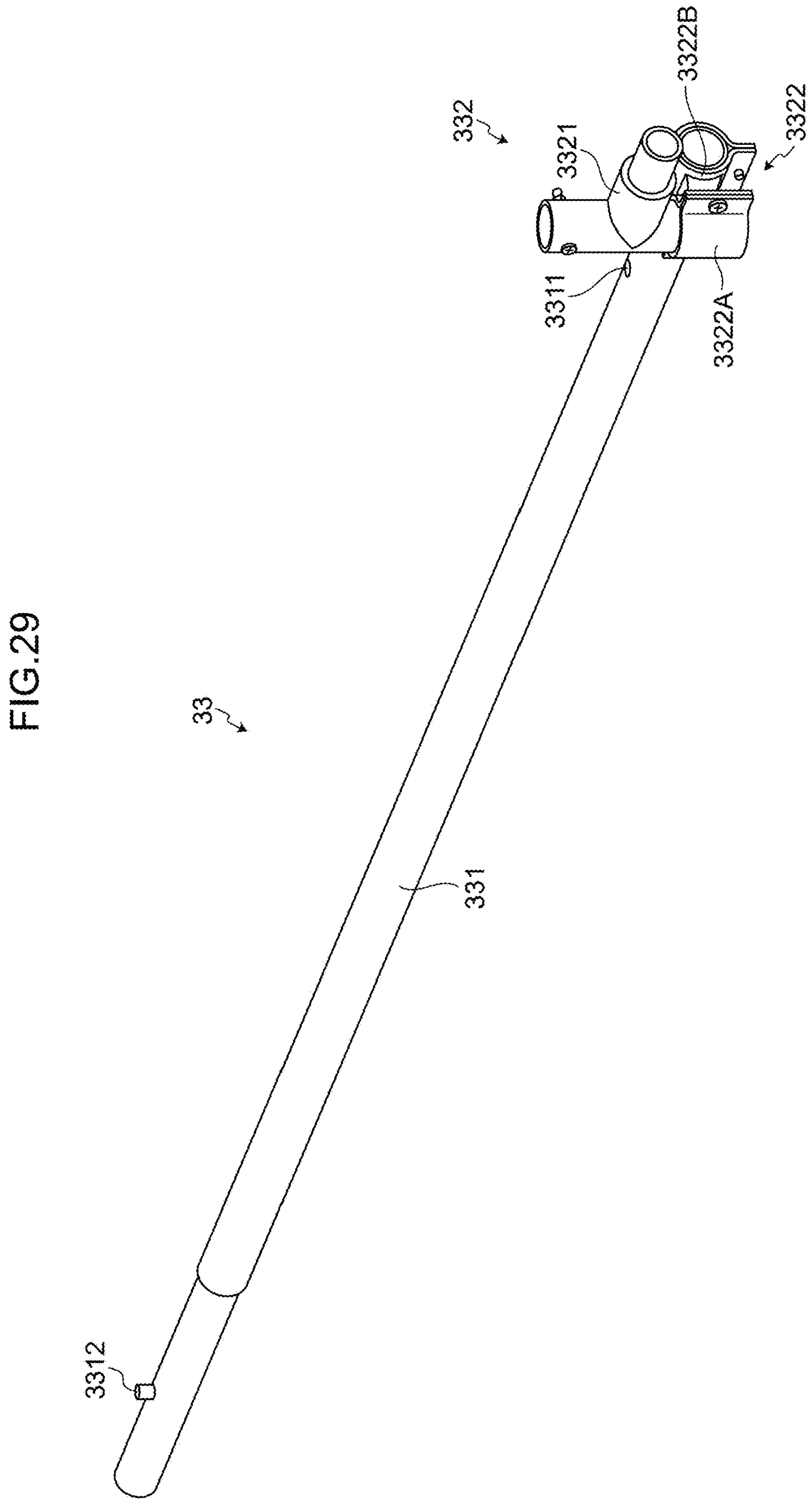
FIG. 29 is a perspective view illustrating a seventh rod-shaped member that constitutes the first joint member according to the embodiment.

FIG. 29 is a perspective view illustrating the seventh rod-shaped member 33 constituting the first joint member 30 according to the embodiment. As illustrated in FIG. 29, the seventh rod-shaped member 33 includes a rod portion 331, and a connecting member 332 connectable with the imaging device 20. The connecting member 332 is arranged at one end of the rod portion 331. The connecting member 332 has a joint 3321 and a fixing member 3322. The fixing member 3322 has the same structure as the fixing member 3122, the fixing member 3132, and the fixing member 3222. The fixing member 3322 includes the first fixing member 3322B attachable to the rod portion 331, and a second fixing member 3322A having an axis perpendicular to a longitudinal direction of the rod portion 331. Moreover, in the rod portion 331, on the outer circumference on which the connecting member 332 is arranged, a hole 3311 similar to the hole 3111 illustrated in FIG. 21 and the hole 3211 illustrated in FIG. 24 is arranged.

As illustrated in FIG. 29, in the rod portion 331, on the outer circumference of the opposite side to the side on which the connecting member 332 is arranged, a convex portion 3312 similar to the convex portion 3212 illustrated in FIG. 24 is arranged. In the rod portion, an end on the opposite side to the side on which the connecting member 332 is arranged is inserted into the first fixing member 3222B illustrated in FIG. 24. The convex portion 3312 illustrated in FIG. 29 engages with the hole 3211 illustrated in FIG. 24. Thus, the sixth rod-shaped member 32 and the seventh rod-shaped member 33 are joined.

Figure 30:
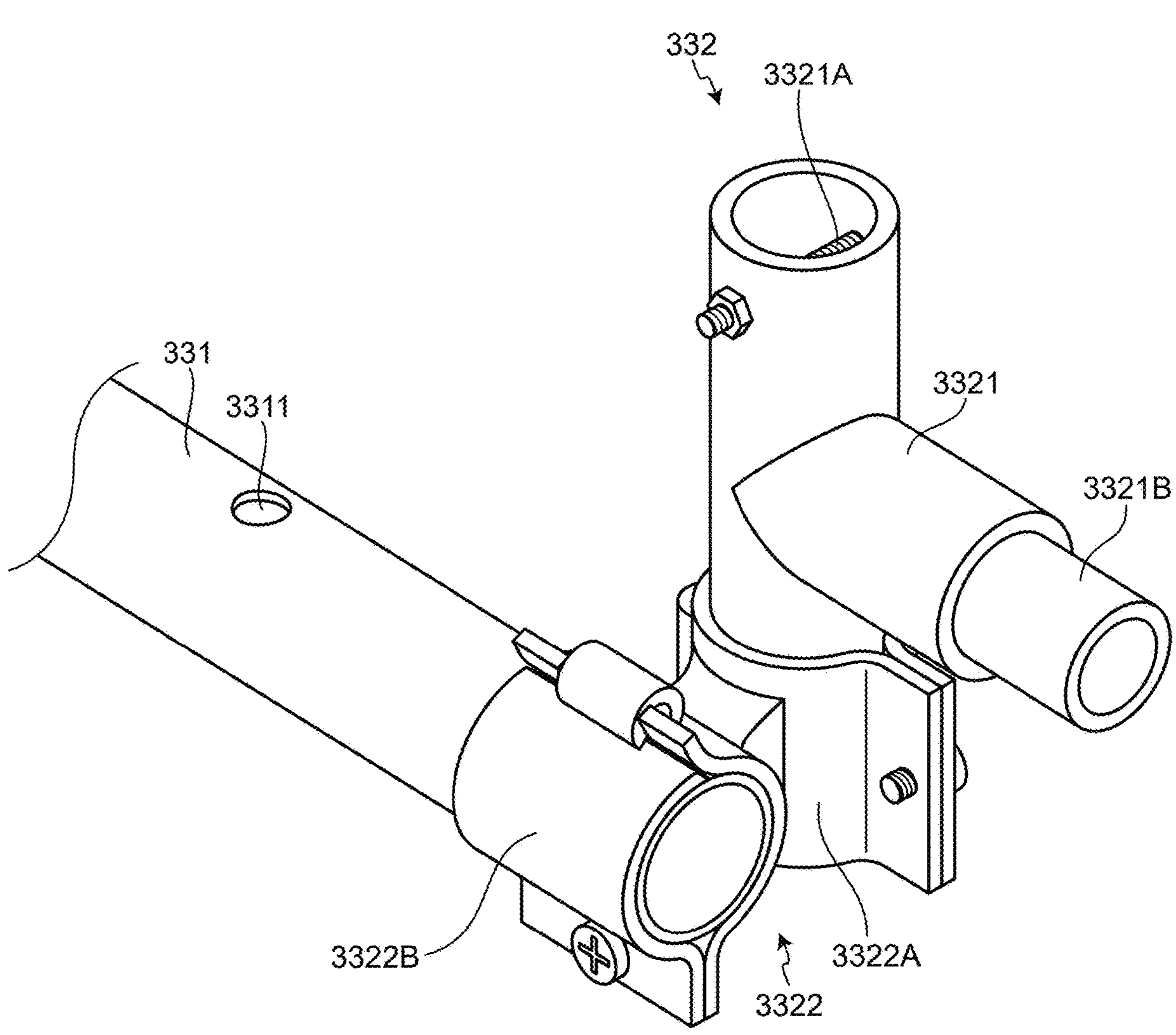
FIG. 30 is a perspective view of an essential part illustrating another end of the seventh rod-shaped member according to the embodiment.

FIG. 30 is a perspective view of an essential portion of the other end of the seventh rod-shaped member 33 according to the embodiment. As illustrated in FIG. 30, to one end of the seventh rod-shaped member 33, the connecting member 332 to connect with the imaging device 20 is arranged. The connecting member 332 has the joint 3321 and the fixing member 3322. The fixing member 3322 is a member to which the first fixing member 3322B attachable to the rod portion 331 and the second fixing member 3322A having an axis perpendicular to the longitudinal direction of the rod portion 331 are connected. The first fixing member 3322B is attached to one end of the rod portion 331. Moreover, one end of the tube in the longitudinal direction of the joint 3321 is fixed by the second fixing member 3322A. To the other end of the tube in the longitudinal direction of the joint 3321, the horizontal rod 3321A that penetrates through the tube in the diameter direction is arranged. Furthermore, to the tube in the transverse direction of the joint 3321, a tube 3321B having an outer diameter equal to the inner diameter of the tube of the joint 3321 is press-fitted in. A distal end of the tube 3321B has a shape gradually becoming thin toward the distal end to facilitate easy insertion and removal.

Figure 31:
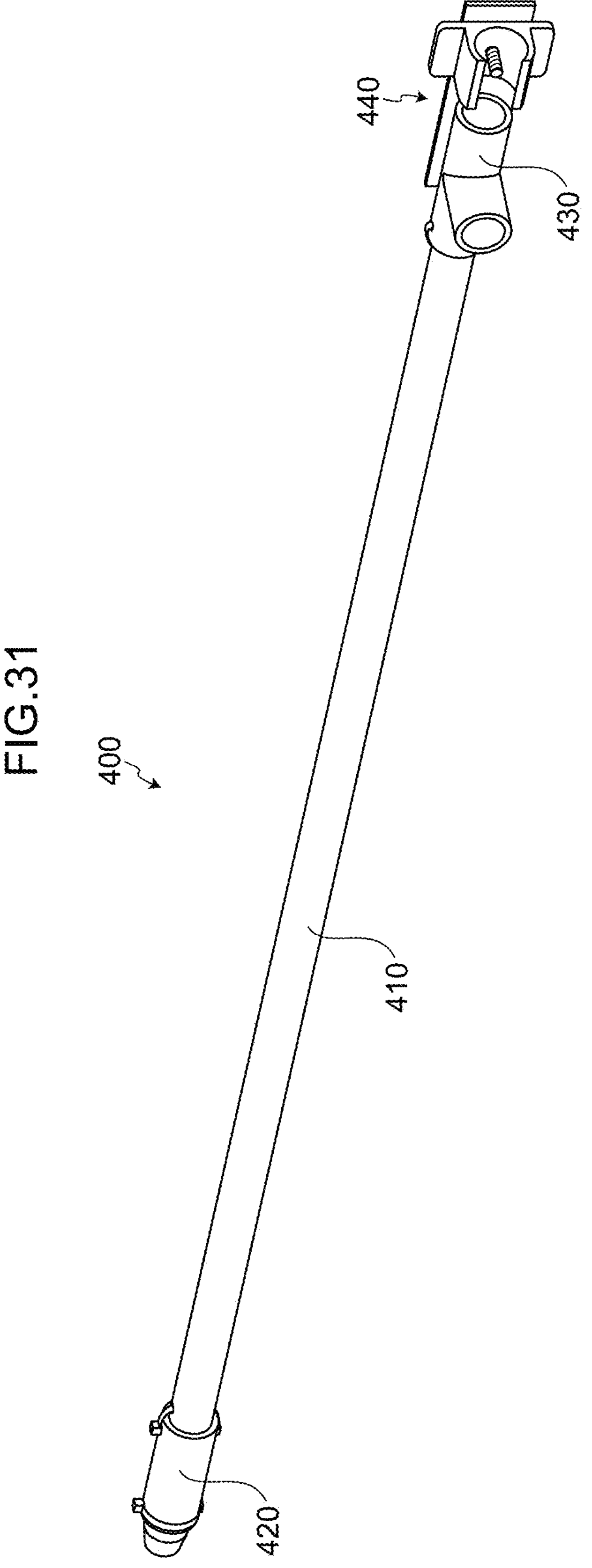
FIG. 31 is a perspective view illustrating an eighth rod-shaped member that constitutes a second joint member according to the embodiment.

Hereinafter, the second joint member 40 according to the embodiment will be explained in detail with reference to FIG. 31 to FIG. 41. FIG. 31 is a perspective view of an eighth rod-shaped member 400 constituting the second joint member 40 according to the embodiment. The second joint member 40 is formed by connecting the multiple eighth rod-shaped members. The second joint member 40 is formed by connecting the multiple eighth rod-shaped members with each other by a joint mechanism according to the embodiment. In the following embodiment, as an example of the eighth rod-shaped member, a hard polyvinyl chloride pipe (hereinafter, referred to as "PVC pipe") will be explained with reference to the drawings. The eighth rod-shaped member is not limited to the PVC pipe, and may be any member as long as it has a rod shape. For example, not limited to a pipe, the eighth rod-shaped member may have any form as long as it is relatively long compared to its diameter. For example, the eighth rod-shaped member does not need to be hollow, and may have an elongated cylindrical shape (for example, a round bar) or an elongated prismatic shape (for example, a square bar). Furthermore, a material of the eighth rod-shaped member is not limited to hard polyvinyl chloride. For example, the material of the eighth rod-shaped member may be a synthetic resin other than hard polyvinyl chloride, concrete, or wood. The material of the eighth rod-shaped member may also be metal. For example, the material of the eighth rod-shaped member may be steel, stainless steel, aluminum, or copper.

First, an overview of the joint mechanism according to the embodiment will be described with reference to FIG. 32 and FIG. 33. FIG. 32 is a perspective view illustrating the two eighth rod-shaped members before being joined by the joint mechanism according to the embodiment. In FIG. 32, the two eighth rod-shaped members are illustrated as the eighth rod-shaped member 400 and an eighth rod-shaped member 500. The eighth rod-shaped member 400 and the eighth rod-shaped member 500 have the same structure. In the following, an example is presented in which the joint mechanism according to the embodiment is applied to a joining device that includes the eighth rod-shaped member 400 and the eighth rod-shaped member 500.

AS illustrated in FIG. 32, the eighth rod-shaped member 400 has a thin tubular rod portion 310. Moreover, the eighth rod-shaped member 400 has a first joint 420 at one end of a rod portion 410. The first joint 420 is a tubular member that is used to join the eighth rod-shaped member and the eighth rod-shaped member for extension. The inner diameter of the first joint 420 is formed to match the outer diameter of the rod portion 410, and by inserting the rod portion 410 into the tube of the first joint 420, the first joint 420 is attached to one end of the rod portion 410. The inner diameter of the first joint 420 is formed to match the outer diameter of the rod portion 410, and by inserting the rod portion 410 into the tube of the first joint 420, the first joint 420 is attached to one end of the rod portion 410.

Furthermore, on an outer circumference of the eighth rod-shaped member 400, a through hole is formed. Specifically, in the eighth rod-shaped member 400, a hole that penetrates through the tube of the first joint 420 and the tube of the rod portion 410 is formed. More specifically, in the eighth rod-shaped member 400, out of both ends of the rod portion 410, the through hole is formed on the outer circumference at an end on a side on which the first joint 420 is arranged. Moreover, the through hole is formed in the first joint 420 at a position opposing the through hole formed in the rod portion 410 in a state in which the rod portion 410 is inserted in the first joint 420. In other words, the respective through holes are formed at positions such that the through hole formed in the rod portion 410 and the through hole formed in the first joint 420 overlap each other in a state in which the rod portion 410 is inserted in the first joint 420. Moreover, they are formed such that a position of the center of the through hole formed in the rod portion 410 coincides with a position of the center of the through hole formed in the first joint 420. Furthermore, they are formed such that the size of the through hole formed in the rod portion 410 matches the size of the through hole formed in the first joint 420.

Moreover, the eighth rod-shaped member 400 has a second joint 430 at the other end of the rod portion 410. The second joint 430 corresponds to the second connecting member 41 illustrated in FIG. 5. The other end of the rod portion 410 indicates an end on the opposite side to the end on which the first joint 420 is arranged out of both ends of the rod portion 410. The second joint 430 is a tubular member that is used to connect the eighth rod-shaped member 400 and the eighth rod-shaped member 400 for extension. In FIG. 32, a case in which the second joint 430 has a T shape with another tube formed on a central side surface of the tube in the longitudinal direction. The inner diameter of the second joint 430 is formed to match the outer diameter of the rod portion 410, and by inserting the rod portion 410 in the tube in the longitudinal direction of the second joint 430, the second joint 430 is attached to the other end of the rod portion 410.

Moreover, the eighth rod-shaped member 400 has a joining member 440 at the other end of the rod portion 410. The other end of the rod portion 410 indicates an end on the opposite side to the end on which the first joint 420 is arranged out of both ends of the rod portion 410. That is, the joining member 440 is arranged at the end on the same side as the side on which the second joint 430 is arranged out of the both ends of the rod portion 410. The joining member 440 is fixed to the eighth rod-shaped member 400 at its one end, and has a convex portion that is inserted in the hole of the other eighth rod-shaped member (not illustrated) formed at the other end.

The eighth rod-shaped member 500 includes a rod portion 510, a first joint 520, a second joint 530, and a joining member 540. As described above, the eighth rod-shaped member 400 and the eighth rod-shaped member 500 have the same structure, and the rod portion 510 corresponds to the rod portion 410, the first joint 520 corresponds to the first joint 420, the second joint 530 corresponds to the second joint 430, and the joining member 540 corresponds to the joining member 440.

Figure 33:
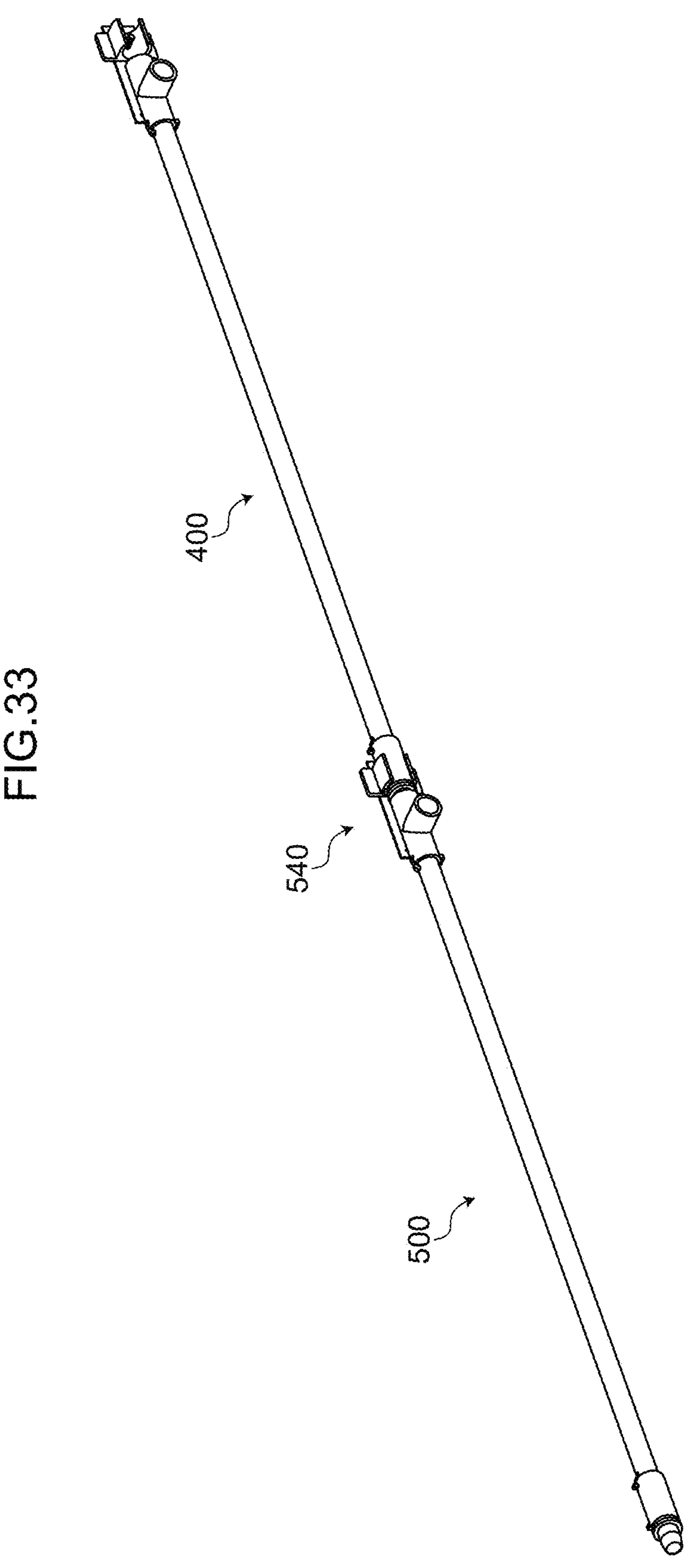
FIG. 33 is a perspective view illustrating two pieces of the eighth rod-shaped member after being joined by the joint mechanism according to the embodiment.

FIG. 33 is a perspective view illustrating the two pieces of the eighth rod-shaped member after joined by the joint mechanism according to the embodiment. FIG. 33 illustrates a state in which the end of the eighth rod-shaped member 400 illustrated in FIG. 32 on a side on which the first joint 420 is arranged is inserted to an end on which the second joint 530 of the eighth rod-shaped member 500 is arranged, and the eighth rod-shaped member 400 and the eighth rod-shaped member 500 are fixed by the joining member 540. That is, in the joining member 540, the convex portion formed in the eighth rod-shaped member 500 is inserted in the hole of the eighth rod-shaped member 400 in a state in which the end portion of the eighth rod-shaped member 400 is inserted in the end portion of the eighth rod-shaped member 500.

As explained using FIG. 32 and FIG. 33, the joint mechanism according to the embodiment includes one eighth rod-shaped member (the eighth rod-shaped member 500 in FIG. 32 and FIG. 33), another eighth rod-shaped member (the eighth rod-shaped member 400 in FIG. 32 and FIG. 33) in which the hole is formed on its outer circumference, and the joining member (the joining member 540 in FIG. 32 and FIG. 33) that is fixed to one of the eighth rod-shaped member at its one end, and in which the convex portion inserted in the hole of the other eighth rod-shaped member is formed at the other end. As described, the joint mechanism according to the embodiment can join one of the eighth rod-shaped member and the other one of the eighth rod-shaped member by performing a simple process to form a hole on the outer circumference to one of the eighth rod-shaped member, and by attaching a joining member to the other one of the eighth rod-shaped member. Thus, the joint mechanism according to the embodiment enables joining one of the eighth rod-shaped member and the other one of the eighth rod-shaped member without performing a special process, such as providing an engaging portion in advance to two pieces of tubes to be joined. For example, to provide an engaging portion on an outer circumference of a tube, it is necessary to shape (integrally process) the metal plate. That is, the joint mechanism according to the embodiment enables to join the eighth rod-shaped member and the eighth rod-shaped member of a typical shape easily. Therefore, the joint mechanism can improve versatility when the eighth rod-shaped member and the eighth rod-shaped member are joined.

Figure 34:
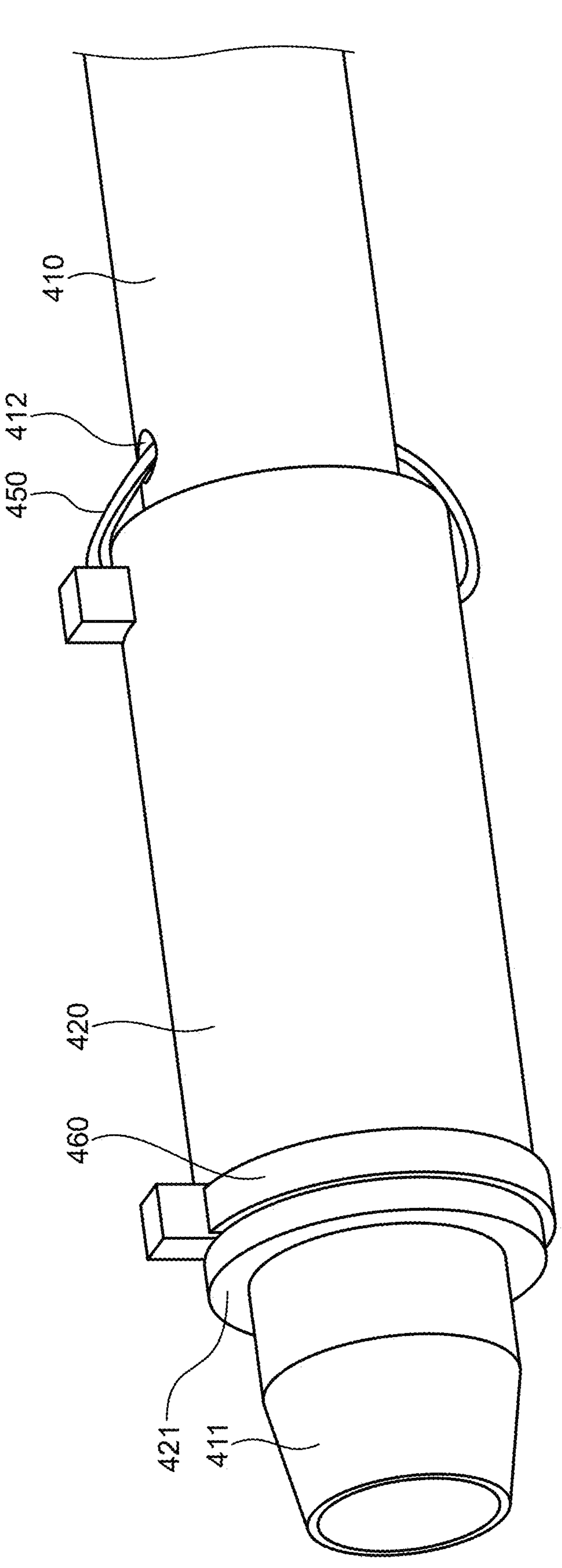
FIG. 34 is a perspective view of an essential part illustrating one end of the eighth rod-shaped member according to the embodiment.
Figure 35:
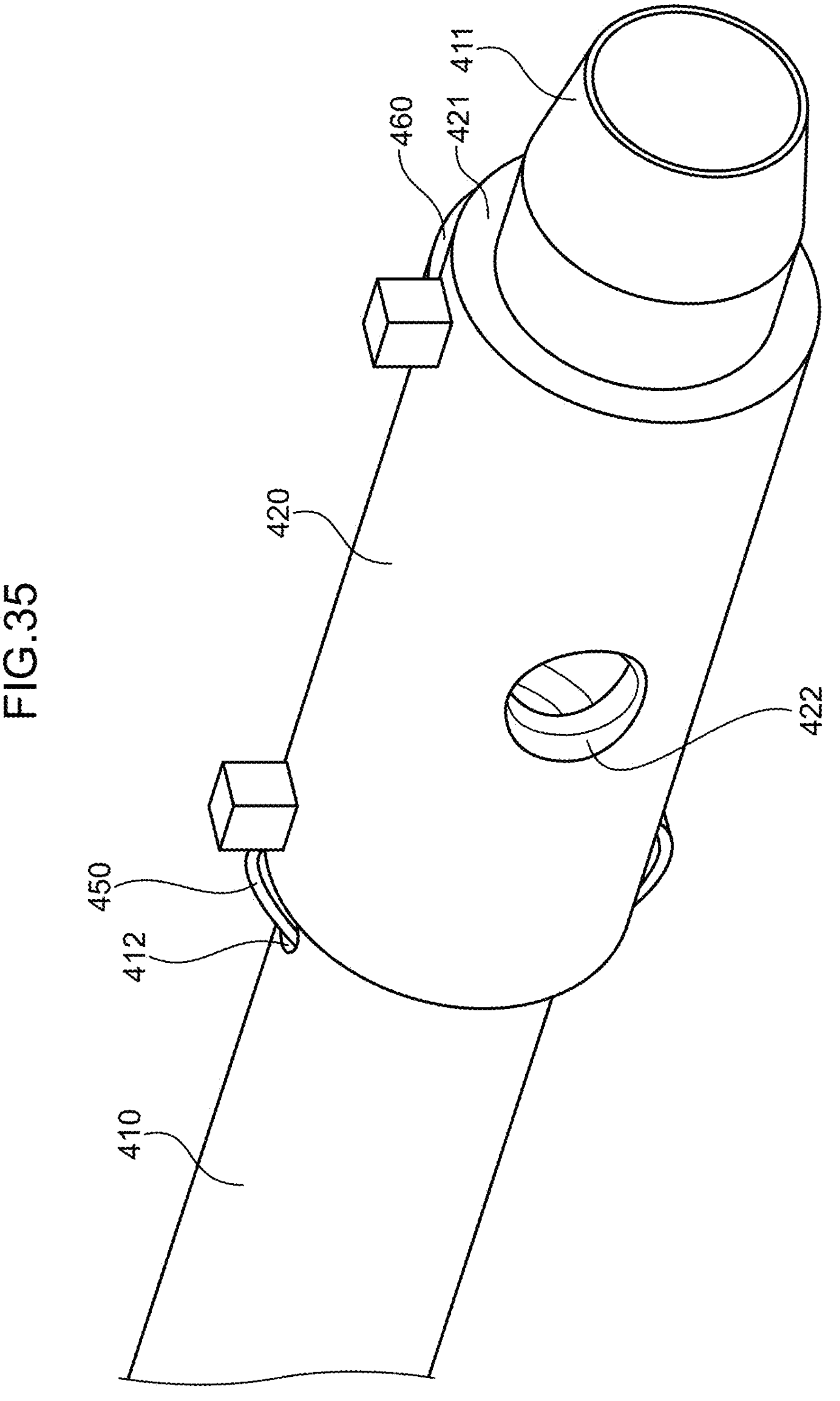
FIG. 35 is a perspective view of an essential part illustrating one end of the eighth rod-shaped member according to the embodiment.

Next, the joint mechanism according to the embodiment will be explained in detail with reference to FIG. 34 to FIG. 41. FIG. 34 and FIG. 35 are perspective views of an essential portion illustrating one end of the eighth rod-shaped member according to the embodiment. FIG. 34 is a perspective view of an essential portion illustrating one end of the eighth rod-shaped member before being joined by the joint mechanism explained in FIG. 32 on a side on which the first joint 420 is arranged.

As illustrated in FIG. 34, the eighth rod-shaped member 400 has an insertion port 411 connected to the end of the rod portion 410 on the side on which the first joint 420 is arranged. The insertion port 411 has a tubular shape with a diameter gradually becoming small toward the end of the rod portion 410. The center of a diameter of the insertion port 411 is formed to match the center of the diameter of the rod portion 410. The insertion port 411 is inserted in the second joint 530 of the eighth rod-shaped member 500. As described, the joint mechanism according to the embodiment is configured such that the diameter direction of the eighth rod-shaped member 400 is fixed with respect to the diameter direction of the eighth rod-shaped member 500 as the insertion port 411 of the eighth rod-shaped member 400 is inserted in the second joint 530 of the eighth rod-shaped member 500.

Furthermore, the first joint 420 is arranged at a position apart from the end of the rod portion 410 on which the first joint 420 is arranged by a predetermined distance in the longitudinal direction of the rod portion 410. In the rod portion 410, a portion corresponding to a length from the end of the rod portion 410 on the side on which the first joint 420 is arranged to a first distance in the longitudinal direction of the rod portion 410 (hereinafter, also referred to as "portion corresponding to the first distance in the rod portion 410") is inserted in the second joint 530 of the eighth rod-shaped member 500 together with the insertion port 411. Specifically, the insertion port 411 and the portion corresponding to the first distance in the rod portion 410 inserted in the second joint 530 of the eighth rod-shaped member 500 such that a cross section 421 of the tube of the first joint 420 and a cross section 532 (refer to FIG. 37) of the tube of the second joint 530 abut on each other. As described, with the joint mechanism according to the embodiment, as the insertion port 411 and the portion corresponding to the first distance in the rod portion 410 are inserted in the second joint 530 of the eighth rod-shaped member 500 such that the cross section 421 of the tube of the first joint 420 and the cross section 532 of the tube of the second joint 530 (refer to FIG. 37) abut on each other, the diameter direction of the eighth rod-shaped member 400 is fixed with respect to the diameter direction of the eighth rod-shaped member 500.

Moreover, on the outer circumference of the eighth rod-shaped member 400, a hole 412 and the hole 413 (not illustrated) are formed. Specifically, the hole 412 and the hole 413 are formed on the outer circumference of the rod portion 410. Moreover, the hole 412 and the hole 413 are formed to penetrate through thickness of the tube of the rod portion 410 in the diameter direction. That is, the hole 412 and the hole 413 are formed at positions symmetrical with respect to the center of a circular shape of the rod portion 410 on a cross section. Moreover, the hole 412 and the hole 413 are arranged at positions apart from the end of the rod portion 410 on the side on which the first joint 420 is arranged by a second distance in the longitudinal direction of the rod portion 410. The second distance is a longer distance than a distance obtained by summing the first distance and the length of the first joint 420.

Moreover, on the outer circumference of the first joint 420, a pair of a hole 423 (not illustrated) and a hole 424 (not illustrated) are formed. Specifically, the hole 423 and the hole 424 are formed to penetrate through the thickness of the tube of the first joint 420 in a diameter direction. That is, the hole 423 and the hole 424 are formed at positions symmetrical with respect to the center of a cross section of the circular shape of the first joint 420. Furthermore, the hole 423 and the hole 424 are formed on the outer circumference of an end closer from the hole 412 and the hole 413 of the rod portion 410 out of both ends of the first joint 420.

Moreover, on the outer circumference of the rod portion 410 covered by the first joint 420, a pair of a hole 414 (not illustrated) and a hole 415 (not illustrated) are formed. Specifically, the hole 414 and the hole 415 are formed to penetrate the thickness of the tube of the rod portion 410 in the diameter direction. That is, the hole 414 and the hole 415 are formed at positions symmetrical with respect to the center of the circular shape of a cross section of the rod portion 410. Furthermore, the hole 414 and the hole 415 are respectively formed at positions respectively opposing the hole 423 and the hole 424 that are formed in the first joint 420 in a state in which the first joint 420 is inserted in the rod portion 410. In other words, the respective holes are formed at positions such that the hole 423 and the hole 424 that are formed in the first joint 420 and the hole 414 and the hole 415 formed in the rod portion 410 overlap each other, respectively, in a state in which the rod portion. 410 is inserted in the first joint 420. Moreover, they are formed such that the positions of the center of the hole 414 and the hole 415 coincide with the positions of the center of the hole 423 and the hole 424 of the first joint 420 that covers the outer circumference of the rod portion 410. Furthermore, they are formed such that the sizes of the hole 414 and the hole 415 match the sizes of the hole 423 and the hole 424, respectively.

Moreover, a cable tie 450 is fastened in a state in which it is inserted through all of the hole 412, the hole 413, the hole 423, the hole 414, the hole 415, and the hole 424. Thus, out of both ends of the first joint 420, the end closer to the hole 412 and the hole 413 of the rod portion 410 is fixed to the rod portion 410.

Moreover, on the outer circumference of the first joint 420, a pair of a hole 425 (not illustrated) and a hole 426 (not illustrated) are formed. Specifically, the hole 425 and the hole 426 are formed to penetrate the thickness of the tube of the first joint 420 in the diameter direction. That is, the hole 425 and the hole 426 are formed at positions symmetrical with respect to the center of the circular shape of the first joint 420 on a cross section. Furthermore, the hole 425 and the hole 426 are formed on the outer circumference of an end farther from the hole 412 and the hole 413 of the rod portion 410 out of both ends of the first joint 420. That is, the hole 425 and the hole 426 are formed on the outer circumference of the end on the opposite side to a portion in which the hole 423 and the hole 424 are formed out of both ends of the first joint 420.

Moreover, on the outer circumference of the rod portion 410 covered by the first joint 420, a pair of a hole 416 (not illustrated) and a hole 417 (not illustrated) are formed. Specifically, the hole 416 and the hole 417 are formed to penetrate through the thickness of the tube of the first joint 420 in a diameter direction. That is, the hole 416 and the hole 417 are formed at positions symmetrical with respect to the center of the circular shape of a cross section of the rod portion 410. Furthermore, the hole 416 and the hole 417 are formed at positions in the rod portion 410 respectively opposing the hole 425 and the hole 426 formed in the first joint 420 in a state in which the rod 410 is inserted in the first joint 420. In other words, the respective holes are formed at positions such that the hole 425 and the hole 426 that are formed in the first joint 420 and the hole 416 and the hole 417 formed in the rod portion 410 overlap each other, respectively, in a state in which the rod portion 410 is inserted in the first joint 420. Moreover, they are formed such that the positions of the center of the hole 416 and the hole 417 coincide with the positions of the center of the hole 425 and the hole 426 of the first joint 420 that covers the outer circumference of the rod portion 410, Furthermore, they are formed such that the sizes of the hole 416 and the hole 417 match the sizes of the hole 425 and the hole 426, respectively.

Furthermore, a cable tie 460 is fastened in a state in which it is inserted through all of the hole 425, the hole 417, the hole 416, and the hole 426. Thus, out of both ends of the first joint 420, the end farther from the hole 412 and the hole 413 of the rod portion 410 is also fixed to the rod portion 410.

FIG. 35 is a perspective view of an essential portion of the end of the rod portion 310 on the side on which the first joint 420 is arranged in the eighth rod-shaped member 400 as seen from a far side in FIG. 34. As illustrated in FIG. 35, a hole 422 is formed on the outer circumference of the first joint 420. The hole 422 is formed to penetrate through the thickness of the tube of the first joint 420 in the diameter direction. Moreover, the hole 422 is formed not to penetrate through the thickness of the tube of the first joint 420 on the opposite side in the diameter direction. Furthermore, the hole 422 is formed at a central portion of the first joint 420 (a position approximately dividing the length of the first joint 420 into two equal parts) on the outer circumference of the first joint 420. Moreover, in the outer circumference of the first joint 420, the hole 422 is formed in the diameter direction of the first joint 420 perpendicular to a straight line passing through the center of the hole 423 and the hole 424. Furthermore, in the hole 422, a convex portion 545 (refer to FIG. 36 and FIG. 37) formed in the joining member 540 is inserted. Furthermore, the hole 422 is formed to have the diameter substantially identical to the diameter of the convex portion 545 so that the convex portion 545 can be inserted.

Moreover, a hole 418 (not illustrated) is formed on the outer circumference of the rod portion 410 covered by the first joint 420. It is formed such that a position of the center of the hole 418 coincides with the position of the center of the hole 422 of the first joint that covers the outer circumference of the rod portion 410. Furthermore, it is formed such that the size of the hole 418 matches the size of the hole 422. Moreover, the hole 418 is formed to penetrate through the thickness of the tube of the rod portion 410 in the diameter direction. Furthermore, the hole 418 is formed not to penetrate through the thickness of the tube of the rod portion on the opposite side in the diameter direction. Furthermore, the hole 418 is formed in a central portion of the rod portion 410 (that is, a position approximately dividing the length of the first joint 420 into two equal parts) covered by the first joint 420, on the outer circumference of the first joint 420. Moreover, in the outer circumference of the rod portion 410, the hole 418 is formed in the diameter direction of the rod portion 410 perpendicular to a straight line passing through the center of the hole 414 and the hole 415. Furthermore, in the hole 418, the convex portion 545 (refer to FIG. 36 and FIG. 37) formed in the joining member 540 is inserted. Furthermore, the hole 418 is formed to have the diameter substantially identical to the diameter of the convex portion 545 so that the convex portion 545 can be inserted.

Figure 36:
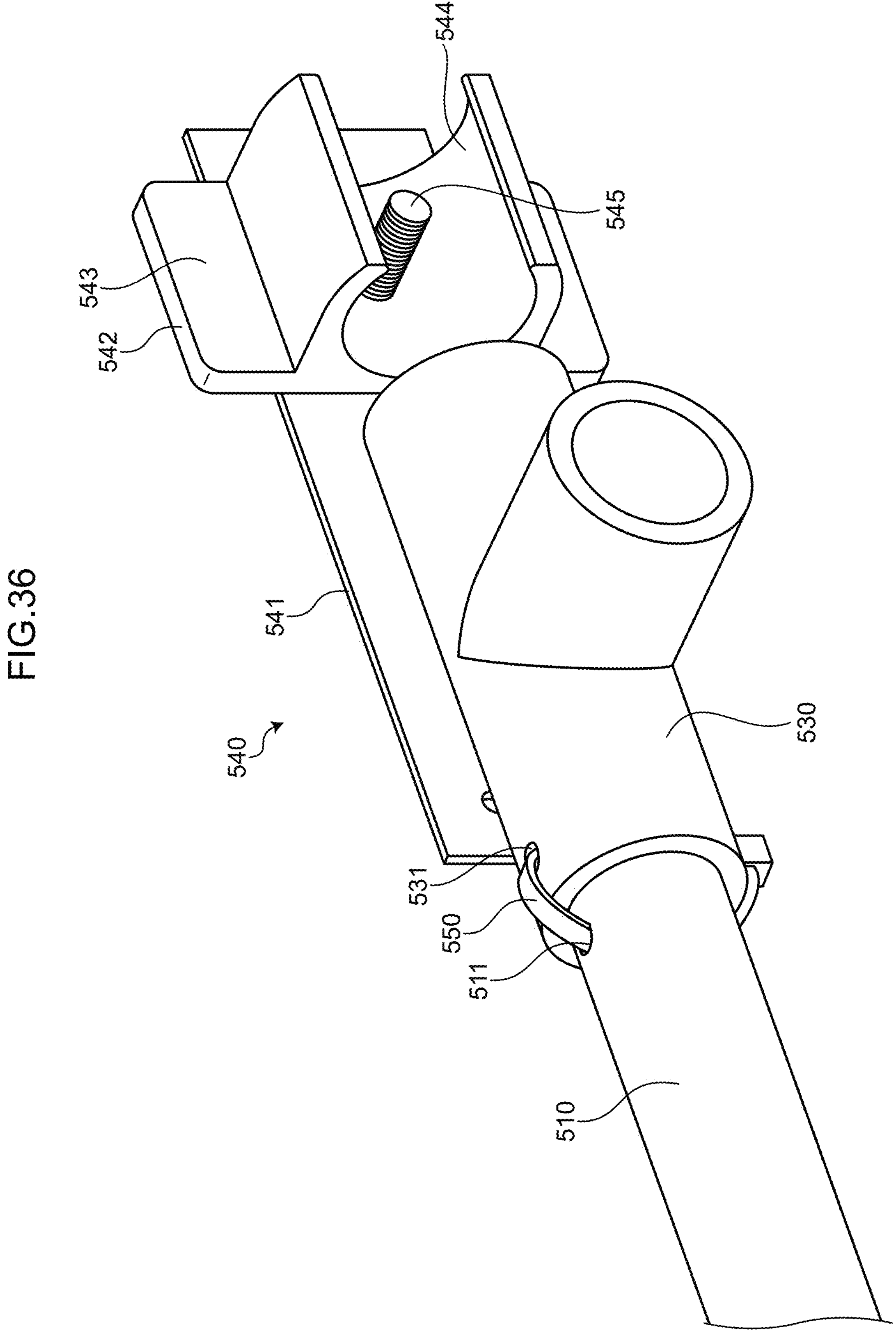
FIG. 36 is a perspective view of an essential part illustrating the other end of the eighth rod-shaped member according to the embodiment.

FIG. 36 to FIG. 39 are perspective view of an essential portion illustrating the other end of the eighth rod-shape member according to the embodiment. FIG. 36 is a perspective view of an essential portion illustrating the end on which the second joint 530 and the joining member 540 are arranged of the eighth rod-shaped member 500 before being joined by the joint mechanism explained in FIG. 32.

As illustrated in FIG. 36, the second joint 530 is arranged at a position to which the rod portion 510 is inserted in a tube of the second joint 530 in the longitudinal direction by a third distance along the longitudinal direction of the rod portion 510 from the end of the rod portion 510 on a side on which the second joint 530 is arranged.

Moreover, on an outer circumference of the rod portion 510, a pair of a hole 511 and a hole 512 (not illustrated) are formed. Specifically, the hole 511 and the hole 512 are formed to penetrate through the thickness of the tube of the rod portion 510 in the diameter direction. That is, the hole 511 and the hole 512 are formed at positions symmetrical with respect to the center of a circular shape of a cross section of the rod portion 410. Furthermore, the hole 511 and the hole 512 are arranged at positions apart from the end of the rod portion 410 on the side on which the second joint 530 is arranged by a fourth distance in the longitudinal direction of the rod portion 510. The fourth distance is a longer distance than the third distance.

Furthermore, on the outer circumference of the second joint 530, a pair of a hole 531 and a hole 533 (not illustrated) are formed. Specifically, the hole 531 and the hole 533 are formed to penetrate through the thickness of the tube of the second joint 530 in the diameter direction. That is, the hole 531 and the hole 533 are formed at positions symmetrical with respect to the center of a circular shape of a cross section of the second joint 530. Furthermore, the hole 531 and the hole 533 are arranged on the outer circumference of an end closer from the hole 511 and the hole 512 of the rod portion 510 out of both ends of the second joint 530 in the longitudinal direction.

Moreover, on the outer circumference of the rod portion 510 covered by the second joint 530, a pair of a hole 513 (not illustrated) and a hole 514 (not illustrated) are formed. Specifically, the hole 513 and the hole 514 are formed to penetrate through the thickness of the tube of the rod portion 510 in the diameter direction. That is, the hole 513 and the hole 514 are formed at positions symmetrical with respect to the center of a circular shape of a cross section of the rod portion 510. Furthermore, the hole 513 and the hole 514 are formed at positions in the rod portion 510 respectively opposing the hole 531 and the hole 533 formed in the second joint 530 in a state in which the rod portion 510 is inserted in the tube in the longitudinal direction of the second joint 530. In other words, the respective holes are formed at positions such that the hole 531 and the hole 533 that are formed in the second joint 530 and the hole 513 and the hole 514 formed in the rod portion 510 overlap each other, respectively, in a state in which the rod portion 510 is inserted in the tube in the longitudinal direction of the second joint 530. Moreover, they are formed such that the positions of the center of the hole 513 and the hole 514 coincide with the positions of the center of the hole 531 and the hole 533 of the second joint 530 that covers the outer circumference of the rod portion 510. Furthermore, they are formed such that the sizes of the hole 513 and the hole 514 match the sizes of the hole 531 and the hole 533, respectively.

Furthermore, the cable tie 550 is fastened in a state in which it is inserted through all of the hole 511, the hole 512, the hole 533, the hole 514, the hole 513, and the hole 531. Thus, out of both ends of the second joint 530, the end closer from the hole 511 and the hole 512 of the rod portion 510 is also fixed to the rod portion 510.

Moreover, the joining member 540 includes a thin planar plate-shaped member 541. Specifically, one end in the longitudinal direction of the plate-shaped member 541 is fixed to the outer circumference of the second joint 530. Moreover, to the other end in the longitudinal direction of the plate-shaped member 541, a supporting member 542 is fixed. The plate-shaped member 541 is deformable. That is, the plate-shaped member 541 is configured such that the other end side is bendable while one end is fixed.

Furthermore, the plate-shaped member 541 is fixed at a position in the diameter direction of the second joint 530 perpendicular to a straight line passing through the center of the hole 531 and the hole 533 in the outer circumference of the second joint 530. Moreover, the plate-shaped member 541 is fixed such that the diameter direction of the second joint 530 perpendicular to the straight line passing through the center of the hole 531 and the hole 533 and a normal direction of the plate-shaped member 541 coincide with each other. For example, the plate-shaped member 541 is a polypropylene plate. The plate-shaped member 541 is not limited to polypropylene, and any material may be used as long as it has preferable mechanical strength, such as tensile strength, impact strength, and compressive strength. For example, the plate-shaped member 541 may be made of a synthetic resin other than polypropylene.

Furthermore, the joining member 540 further includes a supporting member 542 that is formed in a shape that follows the outer circumference of the first joint 420 of the eighth rod-shaped member 400, and that supports the eighth rod-shaped member 400 as it is press-fitted into the first joint 420 of the eighth rod-shaped member 400. Moreover, the supporting member 542 includes a holding portion 544 formed in a shape that follows the outer circumference of the first joint 420 of the eighth rod-shaped member 400, and a plate-shaped insertion portion 543 continuous with the holding portion 544. Specifically, out of both ends of the plate-shaped member 541 in the longitudinal direction, an end on an opposite side to the end fixed to the outer circumference of the second joint 530 is fixed to the supporting member 542. More specifically, a surface of an end on the opposite side to an end fixed to the outer circumference of the second joint 530 out of both ends in the longitudinal direction of the plate-shaped member 541, and a surface of the insertion portion 543 are fixed to each other. Furthermore, the supporting member 542 is fixed to the plate-shaped member 541 such that a center axis in the longitudinal direction of the holding portion 544 and a center axis in the longitudinal direction of the eighth rod-shaped member 500 coincide with each other.

Moreover, in the joining member 540, a convex portion 545 that is inserted into the hole 422 and the hole 418 of the eighth rod-shaped member 400 is formed. The convex portion 545 is formed at a central portion of the holding portion 544 so as to protrude out in the diameter direction of the holding portion 544. More specifically, the convex portion 545 is a threaded part of a bolt that is inserted from the plate-shaped member 541 side, to penetrate through a hole 5411 (not illustrated) formed in the plate-shaped member 541 and a hole 547 (not illustrated) formed in the supporting member 542.

Figure 37:
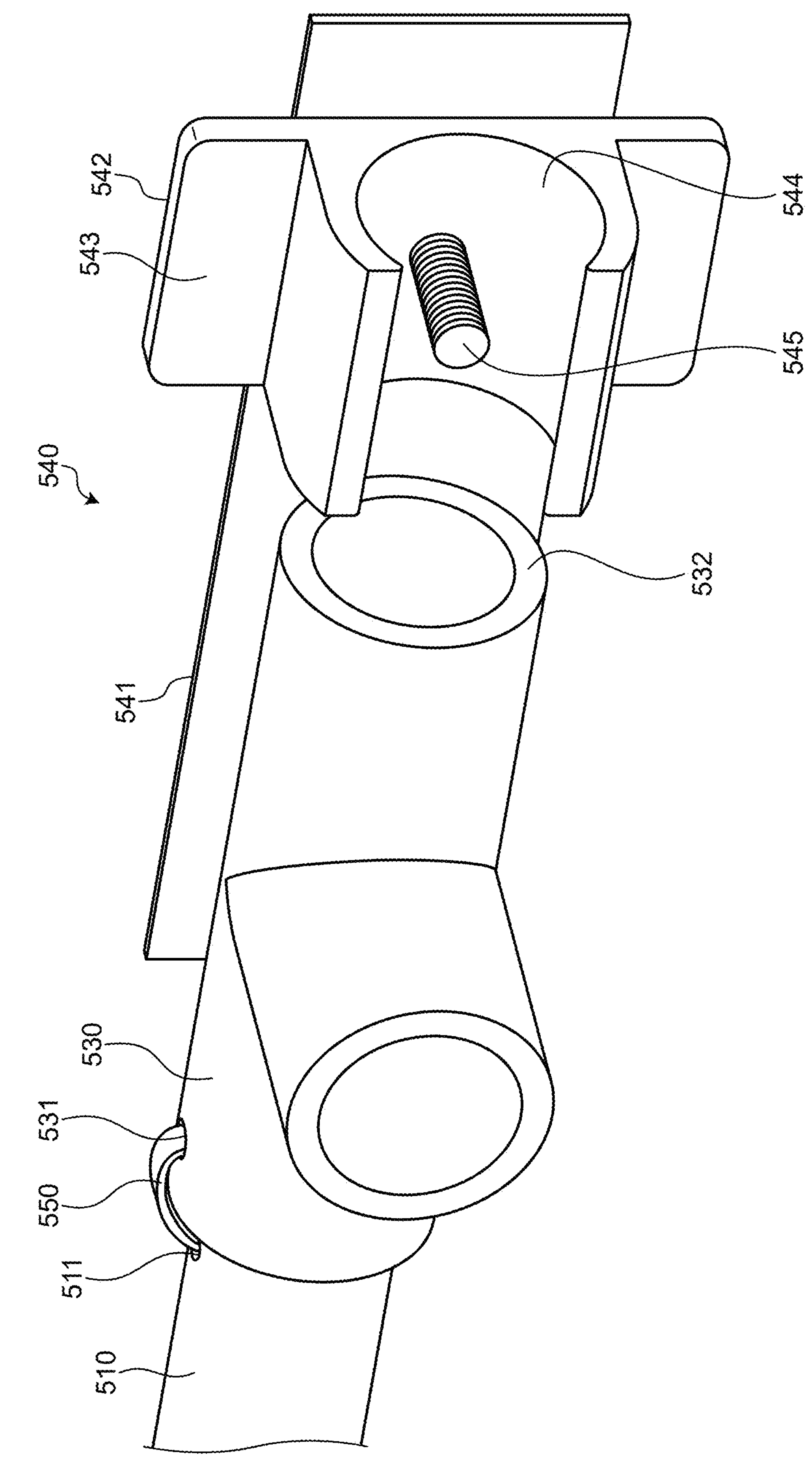
FIG. 37 is a perspective view of an essential part illustrating the other end of the eighth rod-shaped member according to the embodiment.

FIG. 37 is a perspective view of an essential portion of an end on a side on which the second joint 530 of the eighth rod-shaped member 500 illustrated in FIG. 36 and the joining member 540 are arranged as seen from a side of the supporting member 542. As illustrated in FIG. 37, the supporting member 542 is arranged at a position apart from the end of the rod portion 510 on a side on which the second joint 530 is arranged by a fifth distance in the longitudinal direction of the rod portion 510.

Moreover, the joining member 540 is configured such that the convex portion 545 is inserted into the hole 422 and the hole 418 illustrated in FIG. 35 in a state in which the cross section 421 of the tube of the first joint 420 illustrated in FIG. 34 and FIG. 35 and the cross section 532 of the tube of the second joint 530 illustrated in FIG. 37 abut on each other.

As explained using FIG. 34 to FIG. 37, the joining member (the joining member 540 in FIG. 36 and FIG. 37) according to the embodiment is configured such that the convex portion (the convex portion 545 in FIG. 36 and FIG. 37) is inserted into the hole (the hole 422 in FIG. 35) of the other one of the eighth rod-shaped members in a state in which an end portion (the cross section 532 in FIG. 37) of one of the eighth rod-shaped members and an end portion (the cross section 421 in FIG. 34 and FIG. 35) of the other one of the eighth rod-shaped members abut on each other. As described, the joint mechanism according to the embodiment can fix the diameter direction of the other one of the eighth rod-shaped members to the diameter direction of one of the eighth rod-shaped members by inserting the convex portion fixed to one of the eighth rod-shaped members into the hole of the other one of the eighth rod-shaped members in a state in which the two eighth rod-shaped members to be joined abut on each other. That is, the joint mechanism according to the embodiment can fix diameter directions of two eighth rod-shaped members to be joined to each other.

Furthermore, in the joining member according to the embodiment (the joining member 540 in FIG. 36 and FIG. 37), the convex portion (the convex portion 545 in FIG. 36 and FIG. 37) is inserted into the hole (the hole 422 in FIG. 35) of the other one of the eighth-rod-shaped members in a state in which either one of end portions (the insertion port 411 and the portion corresponding to the first distance of the eighth rod-shaped member 400 in FIG. 34 to FIG. 37) is inserted into the other end portion (the second joint 530 in FIG. 34 to FIG. 37) out of one of the eighth rod-shaped members (the eighth rod-shaped member 500 in FIG. 36 and FIG. 37) and the other one of the eighth rod-shaped members (the eighth rod-shaped member 400 in FIG. 34 and FIG. 35). As described, the joint mechanism according to the embodiment can fix the diameter direction of the other one of the eighth rod-shaped members to the diameter direction of one of the eighth rod-shaped members by inserting the convex portion fixed to one of the eighth rod-shaped members into the hole of the other one of the eighth rod-shaped members in a state in which one end portion is inserted in the other end portion out of the two eighth rod-shaped members to be joined. That is, the joint mechanism according to the embodiment can fix diameter directions of two pieces of the eighth rod-shaped members to be joined to each other.

Moreover, the joining member according to the embodiment (the joining member 540 in FIG. 36 and FIG. 37) further includes a supporting portion (the supporting member 542 in FIG. 36 and FIG. 37) that is formed in a shape following the outer circumference of the other one of the eighth rod-shaped members (the eighth rod-shaped member 400 in FIG. 45 and FIG. 35) and that supports the other one of the eighth rod-shaped members by being press-fitted into the other one of the eighth rod-shaped members. As described, the joint mechanism according to the embodiment can fix the longitudinal direction of one of the eighth rod-shaped members to the longitudinal direction of the other one of the eighth rod-shaped members by press-fitting the supporting member in the other one of the eighth rod-shaped members. That is, the joint mechanism according to the embodiment can fix longitudinal directions of two pieces of the eighth rod-shaped members to be joined to each other. In other words, the joint mechanism according to the embodiment can fix in a state in which axes of two pieces of the eighth rod-shaped members to be joined coincide with each other.

Figure 38:
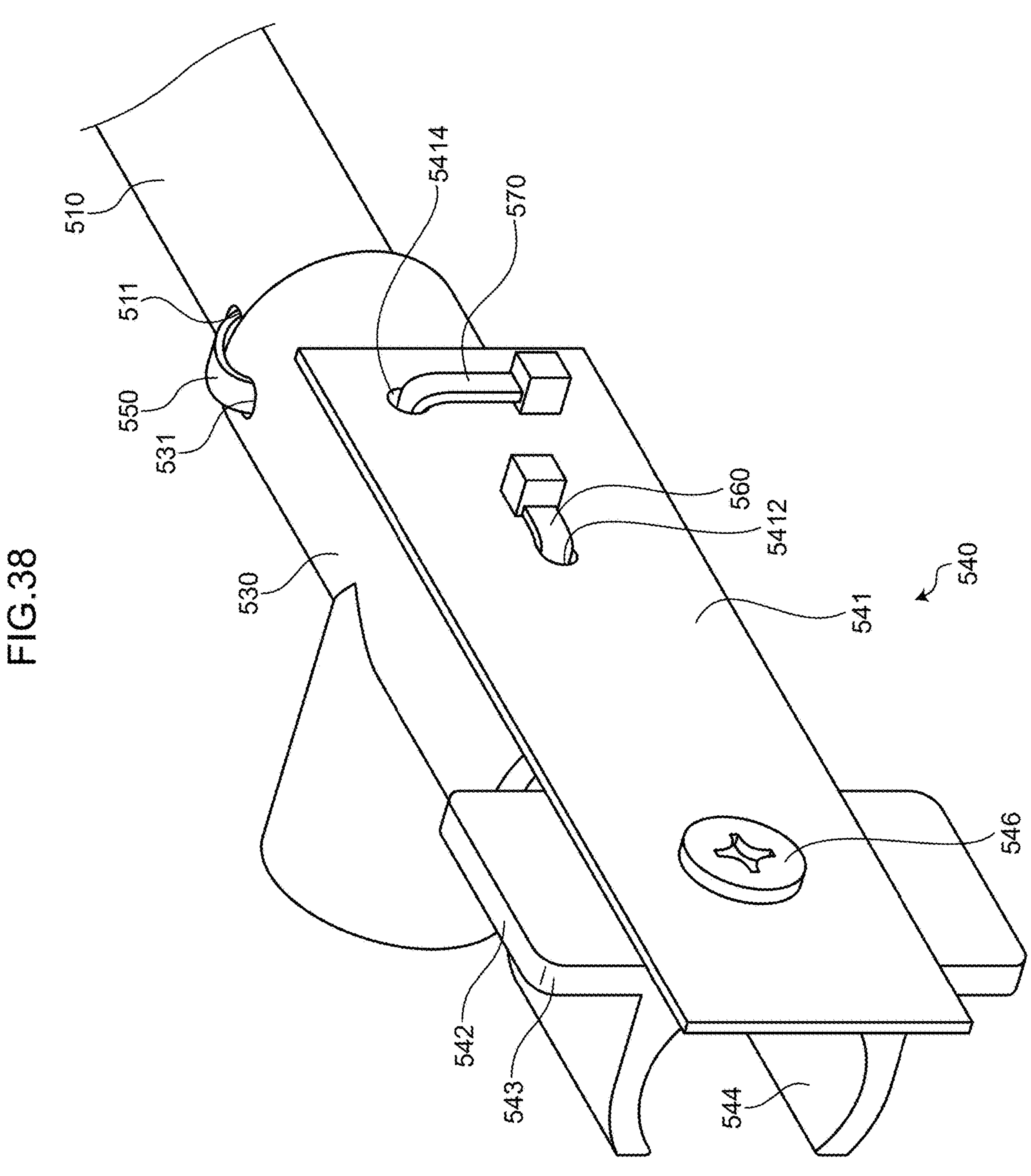
FIG. 38 is a perspective view of an essential part illustrating the other end of the eighth rod-shaped member according to the embodiment.
Figure 39:
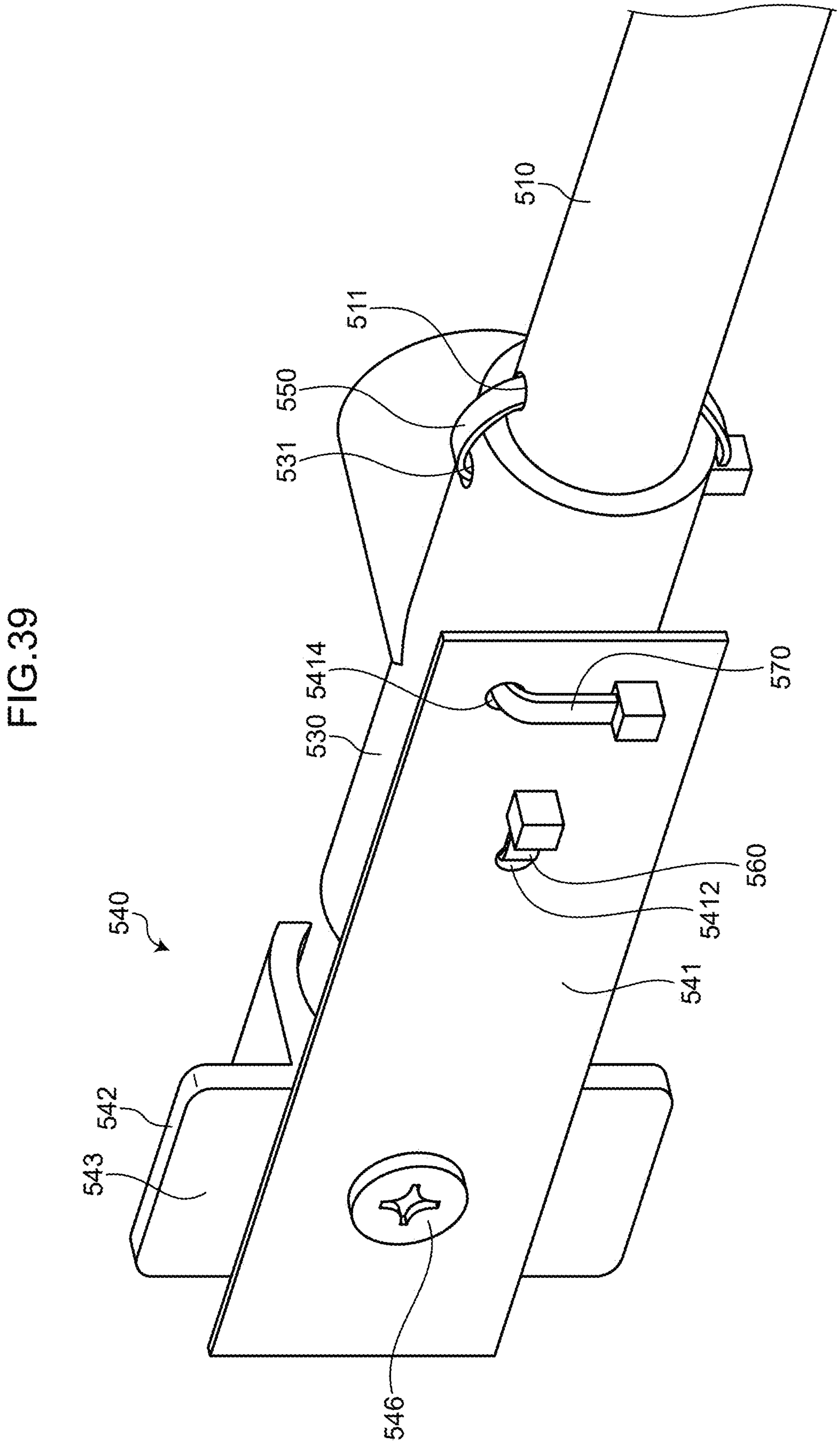
FIG. 39 is a perspective view of an essential part illustrating the other end of the eighth rod-shaped member according to the embodiment.

FIG. 38 is a perspective view of an essential portion of the end of the eighth rod-shaped member 500 illustrated in FIG. 37 on the side on which the second joint 530 and the joining member 540 are arranged as seen from a far side of FIG. 37. FIG. 39 is a perspective view of an essential portion of a rear side of the end of the eighth rod-shaped member 500 illustrated in FIG. 38 on the side on which the second joint 530 and the joining member 540 are arranged as seen from another angle.

As illustrated in FIG. 38 and FIG. 39, the hole 5411 (not illustrated) is formed at an end on the opposite side to the end fixed to the outer circumference of the second joint 530 out of both ends in the longitudinal direction of the plate-shaped member 541. The hole 5411 is formed to penetrate through the thickness of the plate-shaped member 541. Furthermore, in the supporting member 542, a hole 547 (not illustrated) that penetrates through the thickness of the insertion portion 543 and the thickness of the holding portion 544 is formed. The hole 547 is formed at a central position of a surface of the insertion portion 543. Moreover, in FIG. 38 and FIG. 39, a head 546 of a bolt inserted from the plate-shaped member 541 side penetrating through the hole 5411 (not illustrated) formed in the plate-shaped member 541 and the hole 547 (not illustrated) formed in the supporting member 542 is illustrated. Thus, the end fixed to the outer circumference of the second joint 530 and the end on the opposite side are fixed to the supporting member 542 out of both ends in the longitudinal direction of the plate-shaped member 541.

Furthermore, two holes of a hole 5412 and a hole 5413 (not illustrated) aligned in the longitudinal direction of the plate-shaped member 541 are formed at an end fixed to the outer circumference of the second joint 530 out of both ends in the longitudinal direction of the plate-shaped member 541. The hole 5412 is formed at a position apart from the hole 5411 by a sixth distance in the longitudinal direction of the plate-shaped member 541. The hole 5413 is formed at a position apart from the hole 5412 by a seventh distance in the longitudinal direction of the plate-shaped member 541. The hole 5412 and the hole 5413 are formed to penetrate through the thickness of the plate-shaped member 541. Moreover, on the outer circumference of the second joint 530, a hole 535 (not illustrated) and a hole 536 (not illustrated) are formed at positions corresponding to the hole 5412 and the hole 5413. Furthermore, the cable tie 560 is fastened in a state in which it is inserted through all of the hole 5412, the hole 535, the hole 536, and the hole 5413. Thus, out of both ends in the longitudinal direction of the plate-shaped member 541, the end on the opposite side to the end fixed to the supporting member 542 is fixed to the outer circumference of the second joint 530.

Moreover, out of both ends in the longitudinal direction of the plate-shaped member 541, at the end fixed to the outer circumference of the second joint 530, two holes of a hole 5414 and a hole 5415 (not illustrated) aligned in a transverse direction of the plate-shaped member 541 are formed. The hole 5414 is formed at a position apart from the hole 5413 by an eighth distance in the longitudinal direction of the plate-shaped member 541. The hole 5414 and the hole 5415 are formed to penetrate through the thickness of the plate-shaped member 541. Moreover, on in the outer circumference of the second joint 530, a hole 538 (not illustrated) and a hole 537 (not illustrated) are formed at positions respectively corresponding to the hole 5414 and the hole 5415. Moreover, the cable tie 570 is fastened in a state in which it is inserted through all of the hole 5414, the hole 538, the hole 537, and the hole 5415. Thus, out of both ends in the longitudinal direction of the plate-shaped member 541, the end on the opposite side to the end fixed to the supporting member 542 is fixed to the outer circumference of the second joint 530.

Figure 40:
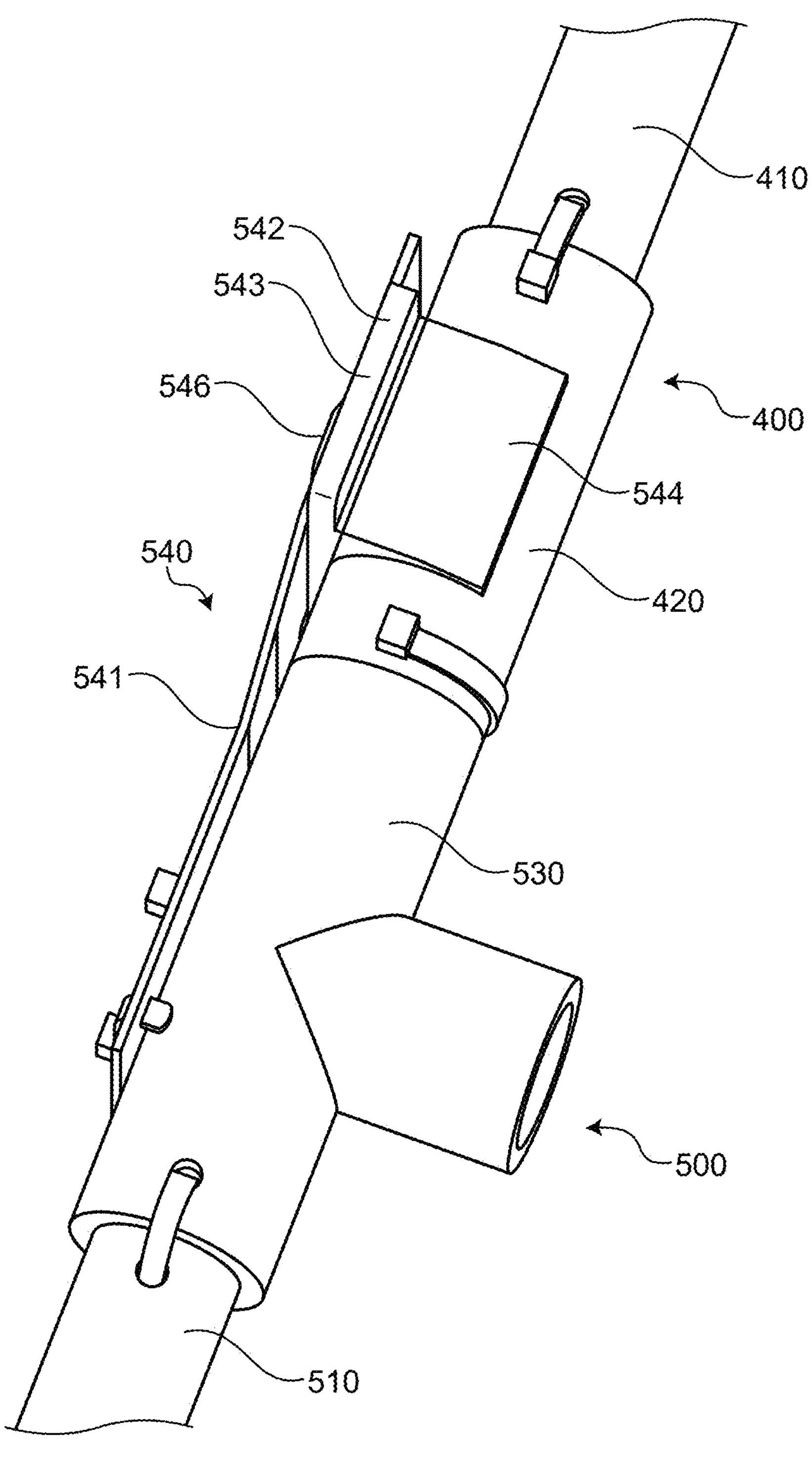
FIG. 40 is a perspective view of an essential part illustrating a joint portion of two pieces of the eighth rod-shaped members joined by the joint mechanism according to the embodiment.
Figure 41:
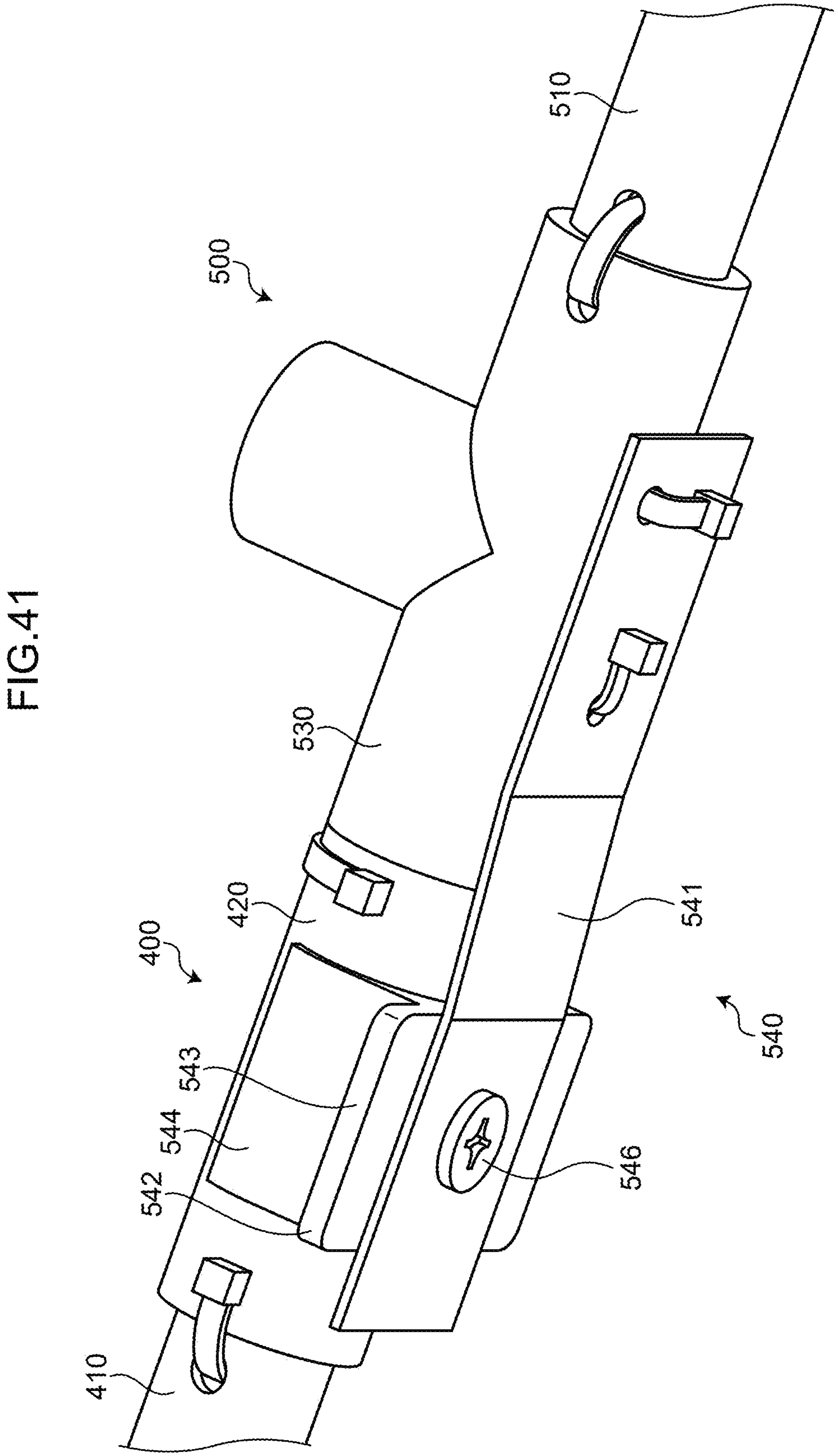
FIG. 41 is a perspective view of an essential part illustrating the joint portion of two pieces of the eighth rod-shaped members joined by the joint mechanism according to the embodiment.

Next, a structure of a joint portion of two pieces of the eight rod-shape members joined by the joint mechanism according to the embodiment will be explained with reference to FIG. 40 to FIG. 41. FIG. 40 to FIG. 41 are perspective view of an essential portion illustrating a joint portion of two pieces of the eighth rod-shaped members joined by the joint mechanism according to the embodiment. FIG. 40 to FIG. 41 are perspective view of an essential portion illustrating a joint portion of two pieces of the eighth rod-shaped members after being joined by the joint mechanism according to the embodiment explained in FIG. 33.

FIG. 40 and FIG. 41 illustrate a state in which the eighth rod-shaped member 400 and the eighth rod-shaped member 500 are joined by the joining member 540 in a state in which the end (the cross section 532 illustrated in FIG. 37) of the eighth rod-shaped member 500 and the end (the cross section 421 illustrated in FIG. 34 and FIG. 35) of the eighth rod-shaped member 400 abut on each other. Moreover, a state in which the eighth rod-shaped member 400 and the eighth rod-shaped member 500 are joined by the joining member 540 in a state in which the end portion of the eighth rod-shaped member 400 (the insertion port 411 and the portion corresponding to the first distance in the rod portion 410 illustrated in FIG. 34 and FIG. 35) is inserted in the end portion (the second joint 530 illustrated in FIG. 36 and FIG. 37) of the eighth rod-shaped member 500 and in a state in which the convex portion (the convex portion 545 illustrated in FIG. 36 and FIG. 37) of the eighth rod-shaped member 500 is inserted in the hole (the hole 422 in FIG. 35) of the eighth rod-shaped member 400 is illustrated.

Figure 42:
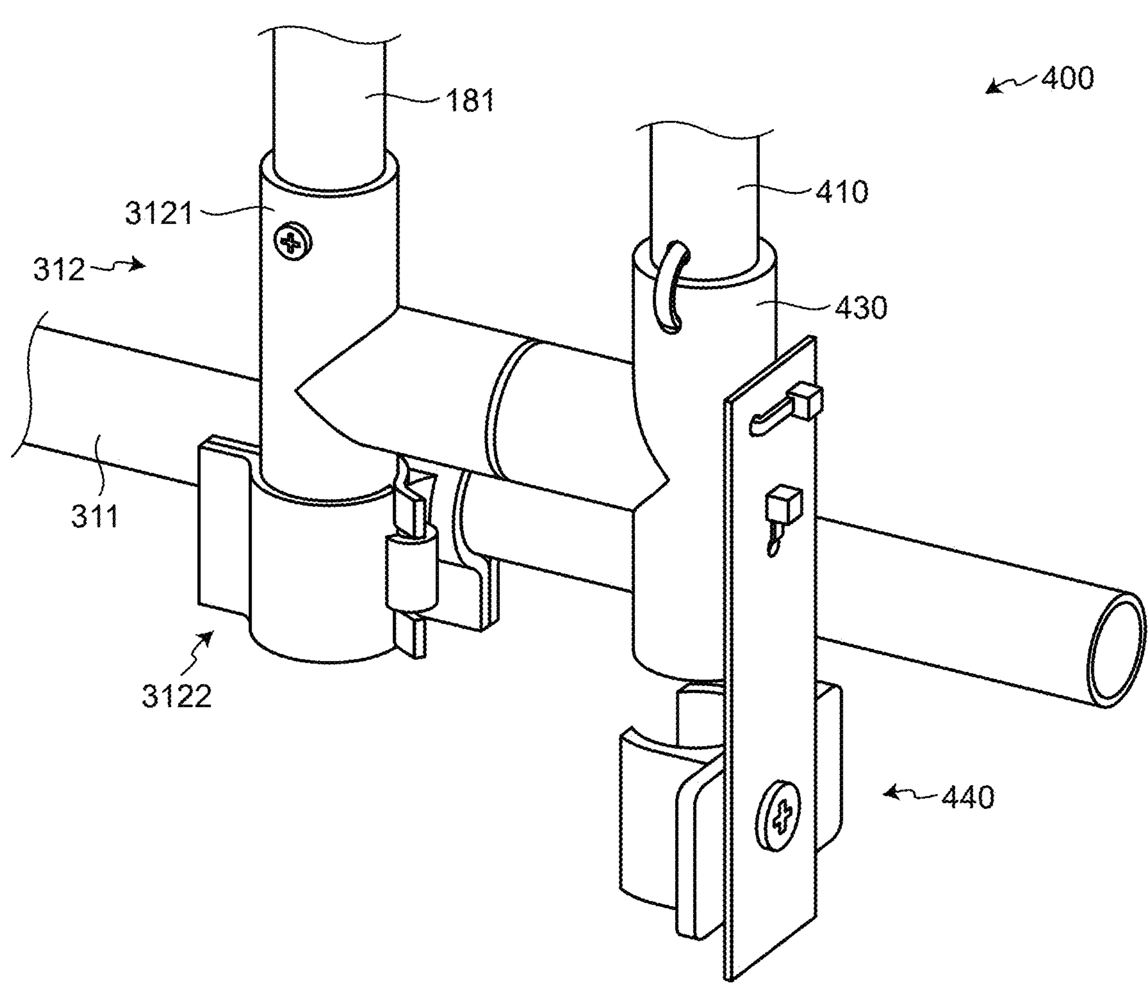
FIG. 42 is a perspective view of an essential part illustrating a joint portion of one end of the first joining member and the second joining member according to the embodiment.

Furthermore, as illustrated in FIG. 40 and FIG. 41, the holding portion 544 holds the tube of the first joint 420, and the convex portion (the convex portion 545 illustrated in FIG. 36 and FIG. 37) of the eighth rod-shaped member 500 is inserted in the hole (the hole 422 in FIG. 35) of the eighth rod-shaped member 400. As described, the supporting member 542 holds the eighth rod-shaped member 400, and the convex portion of the eighth rod-shaped member 500 is inserted in the hole of the eighth rod-shaped member 400. Thus, the joint mechanism according to the embodiment can fix the longitudinal direction of the eighth rod-shaped member 400 to the longitudinal direction of the eighth rod-shaped member 500. That is, the joint mechanism according to the embodiment can fix longitudinal directions of two pieces of the eighth rod-shaped members to be joined to each other. In other words, the joint mechanism according to the embodiment can fix two pieces of the eighth rod-shaped members to be joined in a state in which axes thereof coincide with each other, FIG. 42 is a perspective view of an essential portion illustrating one end of the first joint member 30 and a joint portion of the second joint member 40 according to the embodiment. FIG. 42 illustrates the end on side joined to the subject device 10 out of both ends of the first joint member 30 and a joint portion with the second joint member 40-2 illustrated in FIG. 4 and FIG. 5. As illustrated in FIG. 42, out of both ends of the first joint member 30, the end on the side on which the subject device 10 is joined and the second joint member 40-2 are connected such that the end of the tube in the transverse direction of the joint 3121 and the end of the tube in the transverse direction of the second joint 430 abut on each other. Specifically, a distal end of the tube 3121B illustrated in FIG. 22 is inserted into the tube in the transverse direction of the second joint 430 illustrated in FIG. 42 such that the cross section of the tube in the transverse direction of the joint 3121 and the cross section of the tube in the transverse direction of the second joint 430 abut on each other. Thus, out of both ends of the first joint member 30, the end on the side on which the subject device 10 is joined and the second connecting member 41-2 corresponding to a predetermined depth of the second joint member 40-2 are joined. Moreover, the distal end of the tube 3121B is formed easy to be removed to an appropriate degree so that removal and insertion are possible during an experiment to change the depth. During an experiment, when measurement of one depth is finished, a tube 3212B inserted in the tube in the transverse direction of the second joint 430 is removed, and changing the depth, the distal end of the tube 3121B illustrated in FIG. 22 is inserted to the transverse direction of the second joint 430 corresponding to a different depth of the second joint member 40-2. Thus, out of both ends of the first joint member 30, the end on the side on which the subject device 10 is joined and the second connecting member 41-2 corresponding to a different depth of the second joint member 40-2 are joined.

Figure 43:
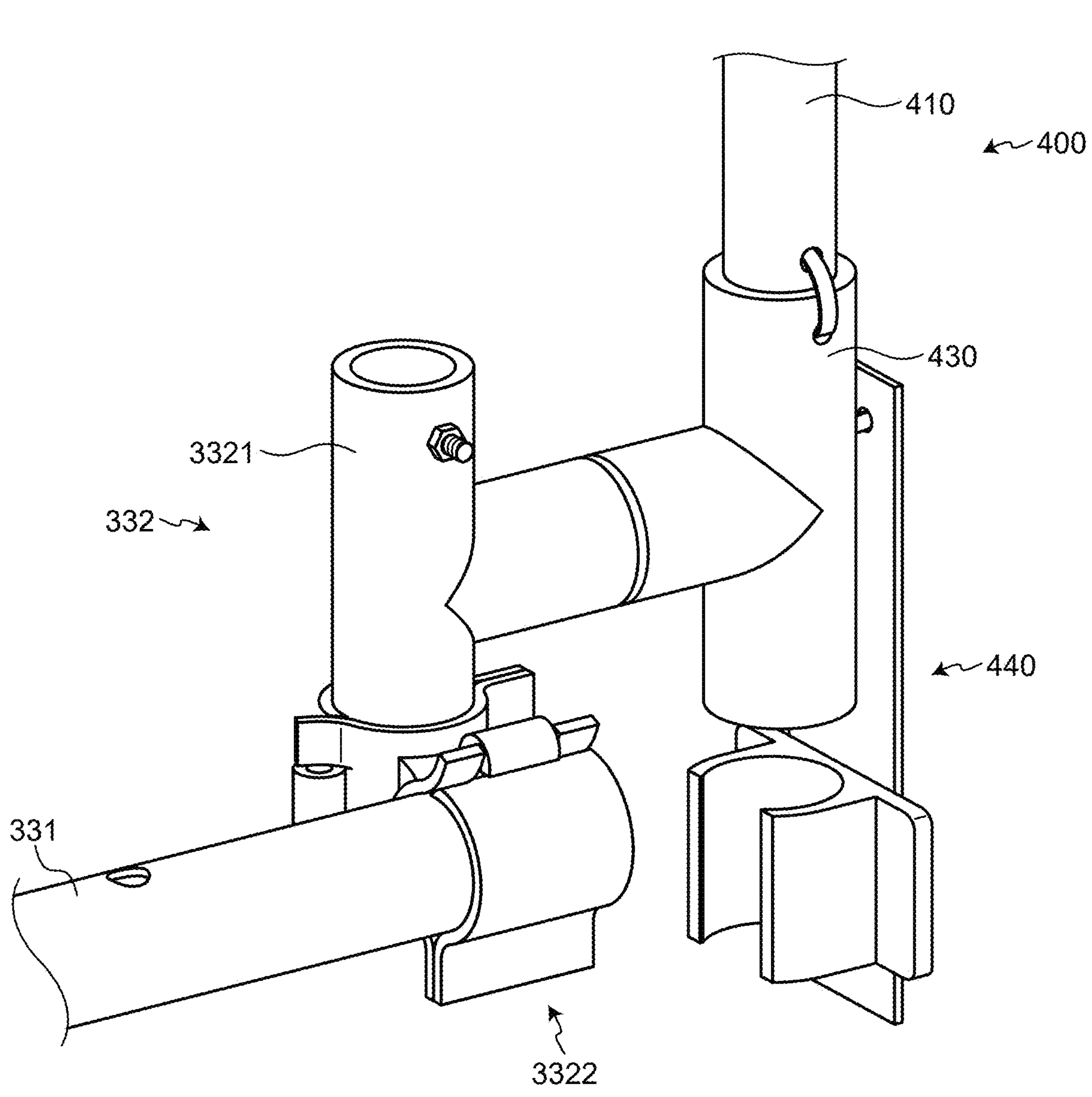
FIG. 43 is a perspective view of an essential part illustrating a joint portion of the other end of the first joining member and the second joining member according to the embodiment.

FIG. 43 is a perspective view of an essential portion illustrating a joint portion between the other end of the first joint member 30 and the second joint member 40 according to the embodiment. FIG. 43 illustrates the joint portion between the end on the opposite side to the end on which the subject device 10 is joined out of both ends of the first joint member 30 and the second joint member 40-1 illustrated in FIG. 4 and FIG. 5. As illustrated in FIG. 43, out of both ends of the first joint member 30, the end on the opposite side to the end on which the subject device 10 is joined and the second joint member 40-1 are connected such that the end of the tube in the transverse direction of the joint 3321 and the end of the tube in the transverse direction of the second joint 430 abut on each other. Specifically, the distal end of the tube 3321B illustrated in FIG. 30 is inserted to the tube in the transverse direction of the second joint 430 illustrated in FIG. 43 such that the cross section of the tube in the transverse direction of the joint 3321 and the cross section of the tube in the transverse direction of the second joint 430 abut on each other. Thus, the end on the opposite side to the end on which the subject device 10 is joined out of both ends of the first joint member 30 and the second connecting member 41-1 corresponding to a predetermined depth of the second joint member 40-1 are joined. Moreover, the distal end of the tube 3321B is formed easy to be removed to an appropriate degree so that removal and insertion are possible during an experiment to change the depth. In an experiment, when measurement of one depth is finished, the tube 3212B that has been inserted in the tube in the transverse direction of the second joint 430 is removed, and changing the depth, the distal end of the tube 3121B illustrated in FIG. 30 is inserted to the transverse direction of the second joint 430 corresponding to a different depth of the second joint member 40-1. Thus, out of both ends of the first joint member 30, the end on the opposite side to the side on which the subject device 10 is joined and the second connecting member 41-1 corresponding to a different depth of the second joint member 40-1 are joined.

As above, some of embodiments of the present application have been explained in detail based on the drawings, these are only examples, and it is possible to 10 implement the present invention in other forms to which various modifications and improvements are applied based on the knowledge of those skilled in the art, including the aspects described in the section of disclosure of the invention.

REFERENCE SIGNS LIST

1 IMAGING SYSTEM
10 SUBJECT DEVICE
11 PLATE GROUP
12 SUPPORTING MEMBER
20 IMAGING DEVICE
21 LIGHT SOURCE
25 COLOR FILTER
30 FIRST JOINT MEMBER
40 SECOND JOINT MEMBER

The invention claimed is:

1. An imaging system that includes a subject device, the subject device comprising a plate group constituted of a plurality of plates arranged at a position opposing a light source for imaging; and a supporting member that supports the plate group, wherein the plate group is constituted of plates arranged in a planar manner, and includes at least one rotating plate that is a plate rotatable around one side as a rotation axis, the supporting member axially supports one side corresponding to the rotation axis of the rotating plate, and the plate group includes a fixed plate that is a plate, a surface of which is fixed in one direction.

2. The imaging system according to claim 1, wherein the one side corresponding to the rotation axis is one side closest to a center of the plate group out of respective sides of the rotating plate.

3. The imaging system according to claim 1, wherein the subject device further includes a restricting member that restricts a rotation range of the rotating plate.

4. The imaging system according to claim 3, wherein the restricting member is a string-shaped member, and a length of a string of the restricting member corresponds to a maximum rotation angle of the rotating plate.

5. The imaging system according to claim 1, wherein the subject device further includes a rod-shaped member that joins the supporting member and the rotating plate, the supporting member has a first tube at a position along the rotation axis, the rotating plate has a second tube that is fixed along one side corresponding to the rotation axis, and the rod-shaped member joins the supporting member and the rotating plate as one end of the rod-shaped member is press-fitted in the first tube, and another end of the rod-shaped member is press-fitted in the second tube.

6. The imaging system according to claim 5, wherein the second tube is held on a surface on an opposite side to a surface facing the light source out of respective surfaces of the rotating plate.

7. The imaging system according to claim 5, wherein the rotating plate has an I-shaped member held on a surface on an opposite side to a surface facing the light source out of respective surfaces of the rotating plate.

8. The imaging system according to claim 1, wherein out of the respective surfaces of each of the plates, a surface on a side facing the light source is covered with any one of a scale of a specific kind of fish, a model of a scale of the fish, a mimic skin, a color chart, and a checkerboard.

9. The imaging system according to claim 1, further comprising an imaging device that images the subject device, wherein the imaging device includes the light source; and a plurality of different color filters corresponding to respective different colors, and each of the plurality of different color filters is arranged slidably in front of the light source.

10. The imaging system according to claim 9, wherein the imaging device includes a stereo camera that is capable of stereo vision underwater.

11. The imaging system according to claim 9, wherein the imaging device includes an action camera, an underwater camera, and a video camera.

12. The imaging system according to claim 9, further comprising a first joining member that joins the subject device and the imaging device, wherein the first joining member has the subject device connected to one end, and has a first connecting member connectable with the imaging device between the one end and the other end at predetermined intervals.

13. The imaging system according to claim 12, further comprising a second joining member that joins with any one of one end and another end of the first joining member at predetermined intervals between one end and another end.

14. The imaging system according to claim 1, wherein the plate group is constituted of $N^2$ plates arranged in an $N \times N$ grid, where N is a positive integer equal to or greater than 2.

15. The imaging system according to claim 1, wherein the fixed plate is positioned in a center of the plate group, and the rotating plate is arranged around the fixed plate.

16. The imaging system according to claim 1, wherein an incident direction of light irradiated from the light source to the fixed plate coincides with a normal direction of the fixed plate.

17. The imaging system according to claim 1, wherein each of the rotating plates has a surface having a different angle from an incident direction of light irradiated from the light source.

18. The imaging system according to claim 1, wherein each of the plates included in the plate group has a square shape of a same size.

19. The imaging system according to claim 1, wherein each of the plates included in the plate group is removable.

20. The imaging system according to claim 1, wherein the subject device further includes a reinforcing member configured to reinforce the subject device.

* * * * *